(12) United States Patent
Wang et al.

(10) Patent No.: US 12,456,757 B2
(45) Date of Patent: Oct. 28, 2025

(54) NONAQUEOUS ELECTROLYTE SOLUTION, SECONDARY BATTERY CONTAINING SAME, AND ELECTRICAL DEVICE

(71) Applicant: CONTEMPORARY AMPEREX TECHNOLOGY (HONG KONG) LIMITED, Hong Kong (CN)

(72) Inventors: Hansen Wang, Fujian (CN); Pan Wan, Fujian (CN); Chengyong Liu, Fujian (CN); Bobing Hu, Fujian (CN); Shengyuan Huang, Fujian (CN); Rupeng Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/033,545

(22) Filed: Jan. 22, 2025

(65) Prior Publication Data

US 2025/0253406 A1 Aug. 7, 2025

Related U.S. Application Data

(63) Continuation of application No. PCT/CN2023/074932, filed on Feb. 8, 2023.

(51) Int. Cl.
*H01M 10/0569* (2010.01)
*H01M 4/131* (2010.01)
(Continued)

(52) U.S. Cl.
CPC ....... *H01M 10/0569* (2013.01); *H01M 4/131* (2013.01); *H01M 4/48* (2013.01);
(Continued)

(58) Field of Classification Search
None
See application file for complete search history.

(56) References Cited

U.S. PATENT DOCUMENTS

| 2013/0108932 A1 | 5/2013 | Onozaki et al. |
| 2015/0132663 A1 | 5/2015 | Noguchi et al. |
| 2024/0105998 A1* | 3/2024 | Xu .......... H01M 4/625 |

FOREIGN PATENT DOCUMENTS

| CN | 108780922 A | 11/2018 |
| CN | 109449490 A | 3/2019 |

(Continued)

OTHER PUBLICATIONS

Zhao et al., "Fluorinated ether electrolyte with controlled solvation structure for high voltage lithium metal batteries", Nature Communications, (2022) 13:2575, https://doi.org/10.1038/s41467-022-29199-3 (Year: 2022).*

(Continued)

*Primary Examiner* — Ula C Ruddock
*Assistant Examiner* — Anna Korovina
(74) *Attorney, Agent, or Firm* — XSENSUS LLP

(57) ABSTRACT

This application discloses a nonaqueous electrolyte solution, a secondary battery containing the nonaqueous electrolyte solution, and an electrical device. The nonaqueous electrolyte solution includes: a compound A including a saturated five-membered ring or six-membered ring and at least one fluorine-containing substituent, where the ring contains 1 or 2 oxygen atoms as ring atoms, and a ring carbon atom connected to the oxygen atom in the ring is not directly replaced by fluorine; and a compound B including a saturated five-membered ring or six-membered ring that contains 1 or 2 oxygen atoms as ring atoms, where at least one ring carbon atom connected to the oxygen atom in the ring is directly replaced by at least one fluorine atom.

18 Claims, 2 Drawing Sheets

(51) Int. Cl.
- *H01M 4/48* (2010.01)
- *H01M 4/66* (2006.01)
- *H01M 10/0567* (2010.01)
- *H01M 10/0568* (2010.01)
- *H01M 4/02* (2006.01)

(52) U.S. Cl.
CPC ....... *H01M 4/661* (2013.01); *H01M 10/0567* (2013.01); *H01M 10/0568* (2013.01); *H01M 2004/021* (2013.01); *H01M 2004/027* (2013.01); *H01M 2300/0034* (2013.01); *H01M 2300/0037* (2013.01)

(56) References Cited

FOREIGN PATENT DOCUMENTS

| CN | 111261942 A | | 6/2020 | |
|---|---|---|---|---|
| JP | H0536401 A | * | 2/1993 | |
| JP | 2015195180 A | * | 11/2015 | |
| WO | WO-2019236550 A1 | * | 12/2019 | ........ H01M 10/0567 |
| WO | 2022/130064 A1 | | 6/2022 | |

OTHER PUBLICATIONS

Jin et al., "A New Class of Phosphates as Co-Solvents for Non-flammable Lithium Ion Batteries Electrolytes", ECS Electrochemistry Letters, 1 (4) A55-A58 (2012) (Year: 2012).*

Dahn, et al., (Cycling Performance of NMC811 Anode-Free Pouch Cells with 65 Different Electrolyte Formulations, 2021 J. Electrochem. Soc. 168 120508) (Year: 2021).*

Zhao et al, (Designs of Anode-Free Lithium-Ion Batteries, Batteries 2023, 9(7), 381; https://doi.org/10.3390/batteries9070381) (Year: 2023).*

Ogiwara, JP-2015195180 Machine Translation (Year: 2015).*

Yoshida, JPH 0536401 Machine Translation (Year: 1993).*

International Search Report and Written Opinion mailed on Sep. 22, 2023, received for PCT Application PCT/CN2023/074932, filed on Feb. 8, 2023, 14 pages including English Translation.

\* cited by examiner

NONAQUEOUS ELECTROLYTE SOLUTION, SECONDARY BATTERY CONTAINING SAME, AND ELECTRICAL DEVICE

CROSS-REFERENCE TO RELATED APPLICATION

This application is a continuation of International Application No. PCT/CN2023/074932, filed Feb. 8, 2023, the entire contents of which is incorporated herein by reference in its entirety.

TECHNICAL FIELD

This application relates to a nonaqueous electrolyte solution, and the nonaqueous electrolyte solution includes a lithium salt and two fluorinated epoxy compounds. Optionally, the nonaqueous electrolyte solution further includes an additive that produces an excellent flame retardant effect without significantly affecting the long-term cycle performance and low-temperature performance of a corresponding secondary battery. In addition, this application further relates to a secondary battery containing the nonaqueous electrolyte solution and an electrical device containing the secondary battery.

BACKGROUND

In recent years, lithium-ion secondary batteries have been applied more extensively in many fields, including energy storage power systems such as hydro, thermal, wind, and solar power stations, and other fields such as electric tools, electric bicycles, electric motorcycles, and electric vehicles, military equipment, and aerospace. The significant development of the lithium-ion secondary batteries gives rise to higher requirements on the low-temperature cycle performance, low-temperature capacity retention rate, safety performance, and other performance metrics of the secondary batteries.

Currently, an effective means to improve the low-temperature cycle performance and safety performance of the lithium secondary battery is to make improvement on the electrolyte solution of the battery. However, many problems still occur in improving the electrolyte solution of the lithium secondary battery currently, and lithium secondary batteries still need to be improved.

SUMMARY

This application addresses the above subject-matter. An objective of this application is to provide a novel nonaqueous electrolyte solution. The nonaqueous electrolyte solution significantly improves a capacity release ability and a cycle life of a secondary battery at low temperature while achieving a high energy density and longevity, and improves safety of the secondary battery at the same time.

To achieve the above objectives, a first aspect of this application provides a nonaqueous electrolyte solution, including:
- a compound A, including a saturated five-membered ring or six-membered ring that contains 1 or 2 oxygen atoms as ring atoms, where the compound A includes at least one fluorine-containing substituent, and a ring carbon atom connected to the oxygen atom in the five-membered ring or six-membered ring is not directly replaced by fluorine; and
- a compound B, including a saturated five-membered ring or six-membered ring that contains 1 or 2 oxygen atoms as ring atoms, where at least one ring carbon atom connected to the oxygen atom in the five-membered ring or six-membered ring is directly replaced by at least one fluorine atom; and optionally, each ring carbon atom connected to the oxygen atom is directly replaced by at least one fluorine atom, optionally by two fluorine atoms.

The nonaqueous electrolyte solution formed by using the mutually coordinating compound A and compound B as a solvent in the secondary battery can not only significantly prolong the cycle life of the secondary battery at room temperature, but also significantly increase the capacity retention rate of the secondary battery discharged at low temperature and the longevity of the secondary battery cycled at low temperature.

In any embodiment, the compound A includes 1 to 3 fluorine-containing substituents, and optionally includes only 1 fluorine-containing substituent.

In the compound A, if the number of fluorine atoms in the substituent on the saturated five-membered ring or six-membered ring containing 1 or 2 oxygen atoms as ring atoms is excessive, the excessive fluorine atoms will impair the capability of the oxygen atoms in dissociating the lithium salt. In addition, even if the oxygen atoms can dissolve a part of the lithium salt, a high ionic conductivity is not definitely ensured in the case of excessive fluorine atoms, thereby possibly being severely detrimental to the low-temperature discharge performance. Therefore, the compound A includes 1 to 3 fluorine-containing substituents, and optionally includes only one fluorine atom and the fluorine atom does not directly substitute for an atom or group attached to the ring carbon atom adjacent to the oxygen atoms.

In any embodiment, in the compound A, substituents on the five-membered ring or the six-membered ring include hydrogen, fluorine, —R, —OR, and unsubstituted or —R- or —OR-substituted phenyl, where R represents a $C_1$ to $C_6$ alkyl or a $C_1$ to $C_6$ fluoroalkyl, optionally a $C_1$ to $C_4$ alkyl or a $C_1$ to $C_4$ fluoroalkyl, and further optionally methyl or fluoromethyl.

In the compound A, the substituent needs to avoid being excessively long, so as to ensure that the melting point, boiling point, and viscosity of the substituent are relatively low, and in turn, ensure the capacity release performance at low temperature. Therefore, optionally, R represents a $C_1$ to $C_4$ alkyl or a $C_1$ to $C_4$ fluoroalkyl, and further optionally methyl or fluoromethyl.

In any embodiment, the compound A is represented by a chemical formula I:

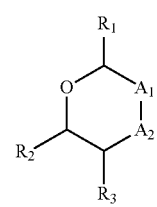

Formula I

In the formula above, $A_1$ represents oxygen, a direct bond, or $CHR_4$.

$A_2$ represents oxygen, a direct bond, or $CHR_5$.

$R_1$ and $R_2$ each independently represent hydrogen, —R, —OR, or unsubstituted or —R- or —OR-substituted phenyl.

$R_3$, $R_4$, and $R_5$ each independently represent hydrogen, fluorine, —R, —OR, or unsubstituted or —R- or —OR-substituted phenyl.

Each R represents a $C_1$ to $C_6$ alkyl or a $C_1$ to $C_6$ fluoroalkyl, optionally a $C_1$ to $C_4$ alkyl or a $C_1$ to $C_4$ fluoroalkyl, and further optionally methyl or fluoromethyl.

Optionally, R, $R_1$, $R_2$, $R_3$, $R_4$, and $R_5$ each independently represent hydrogen, fluorine, methyl, monofluoromethyl, difluoromethyl, trifluoromethyl, monofluoromethoxyl, phenyl, methylphenyl, or methoxyphenyl, and $R_1$ and $R_2$ are not fluorine.

$A_1$ and $A_2$ are not both direct bonds and are not both oxygen.

When $A_1$ is oxygen, $R_5$ is not fluorine. When $A_2$ is oxygen, $R_3$ and $R_4$ are not fluorine.

$R_1$, $R_2$, $R_3$, $R_4$, and $R_5$ include at least 1 fluorine-containing substituent in total, optionally include 1 to 3 fluorine-containing substituents in total, and further optionally include only 1 fluorine-containing substituent.

In any embodiment, the compound A includes the following compounds:

I-1
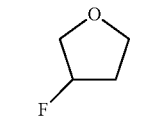

I-2
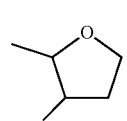

I-3
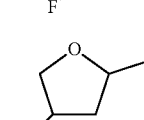

I-4
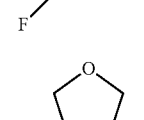

I-5
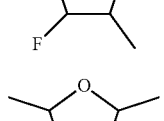

I-6
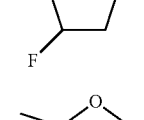

I-7
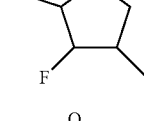

-continued

I-8
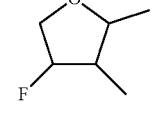

I-9
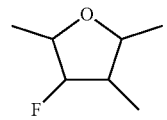

I-10
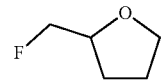

I-11
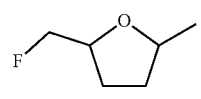

I-12
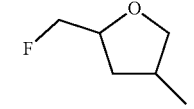

I-13
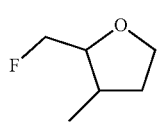

I-14
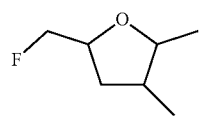

I-15
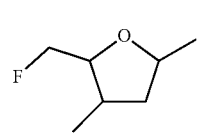

I-16
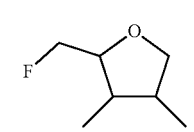

I-17
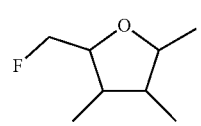

I-18
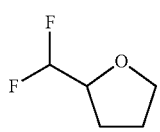

I-19
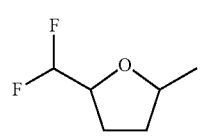

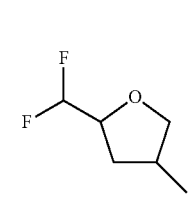

-continued

| | |
|---|---|
| I-20 | |
| I-21 | |
| I-22 | |
| I-23 | |
| I-24 | |
| I-25 | |
| I-26 | |
| I-27 | |
| I-28 | |
| I-29 | |

-continued

| | |
|---|---|
| I-30 | |
| I-31 | |
| I-32 | |
| I-33 | |
| I-34 | |
| I-35 | |
| I-36 | |
| I-37 | |
| I-38 | |
| I-39 | |
| I-40 | |
| I-41 | |

I-42 
I-43 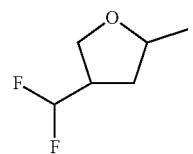
I-44 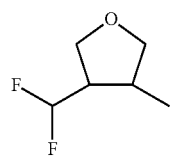
I-45 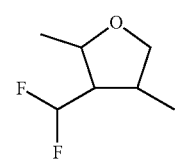
I-46 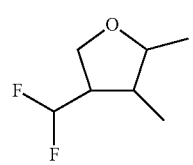
I-47 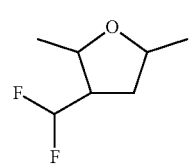
I-48 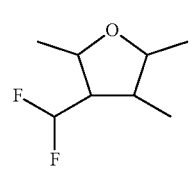
I-49 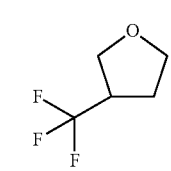
I-50 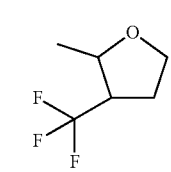
I-51 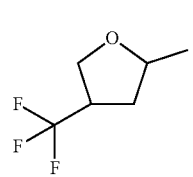
I-52 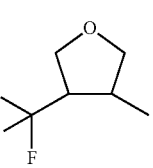
I-53 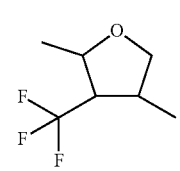
I-54 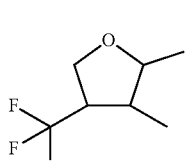
I-55 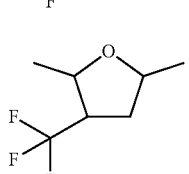
I-56 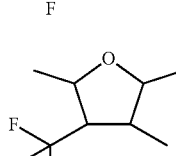
I-57 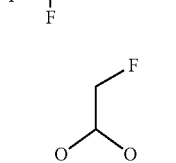
I-58 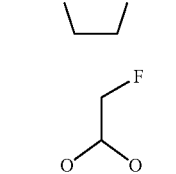
I-59 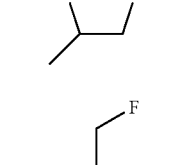
I-60 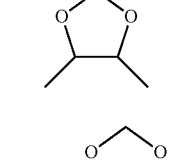
I-61 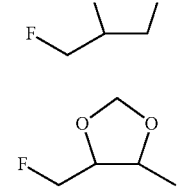

-continued
I-62 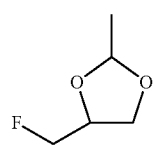
I-63 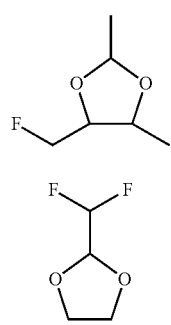
I-64 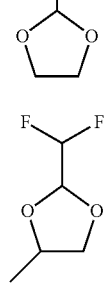
I-65 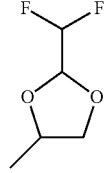
I-66 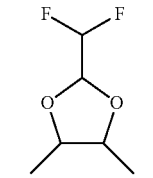
I-67 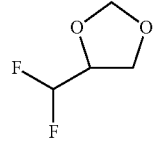
I-68 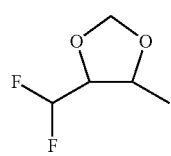
I-69 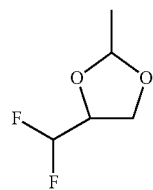
I-70 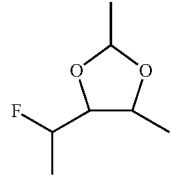
-continued
I-71 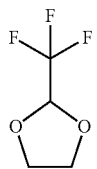
I-72 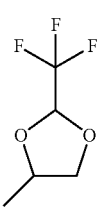
I-73 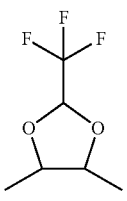
I-74 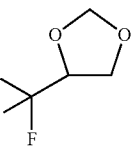
I-75 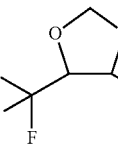
I-76 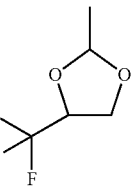
I-77 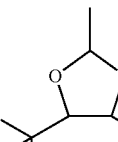
I-78 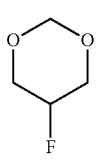

-continued
I-79
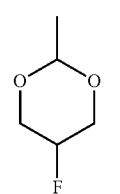
I-80
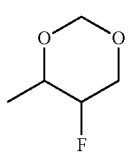
I-81
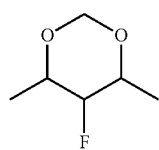
I-82
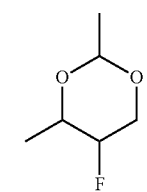
I-83
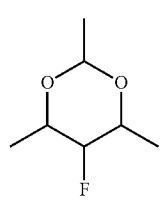
I-84
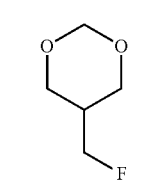
I-85
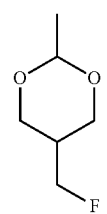
I-86
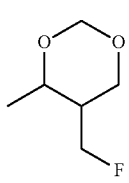
-continued
I-87
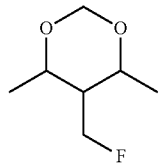
I-88
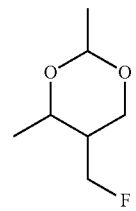
I-89
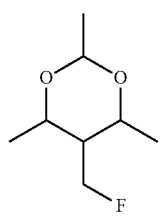
I-90
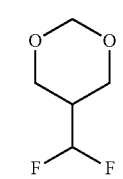
I-91
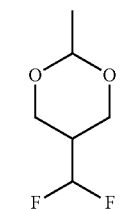
I-92
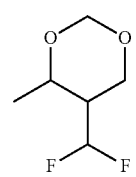
I-93
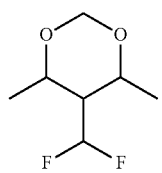
I-94
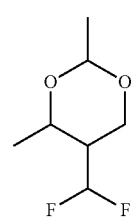

-continued
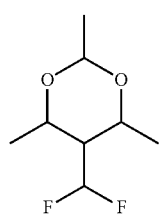
I-95
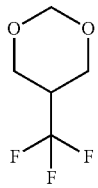
I-96
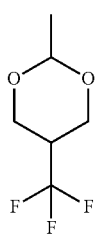
I-97
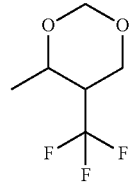
I-98
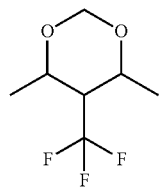
I-99
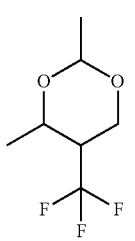
I-100
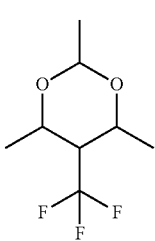
I-101
-continued
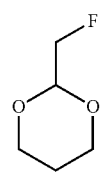
I-102
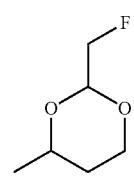
I-103
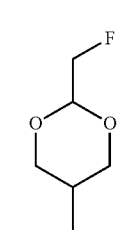
I-104
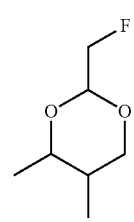
I-105
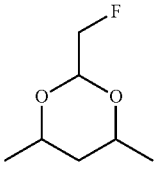
I-106
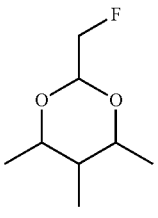
I-107
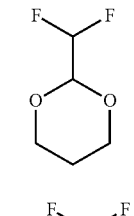
I-108
I-109

-continued
I-110
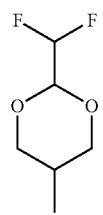
I-111
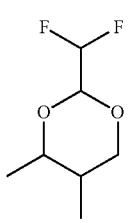
I-112
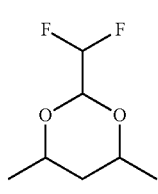
I-113
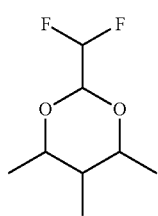
I-114
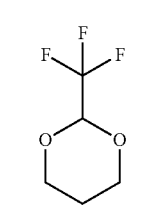
I-115
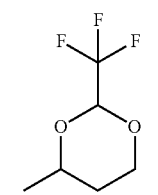
I-116
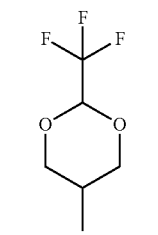
-continued
I-117
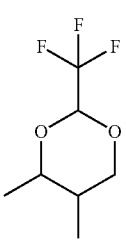
I-118
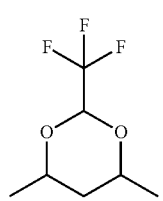
I-119
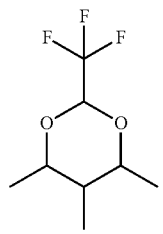
I-120
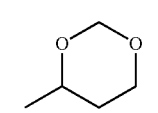
I-121
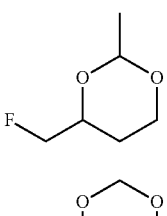
I-122
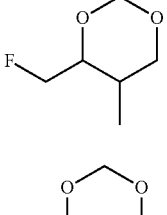
I-123
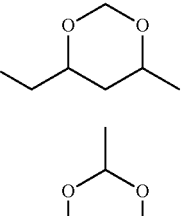
I-124
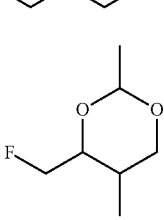
I-125

I-126 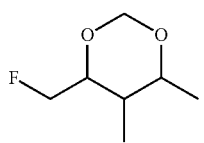
I-127 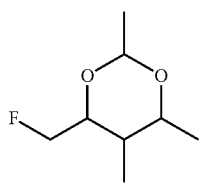
I-128 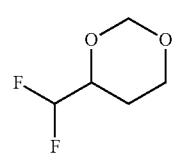
I-129 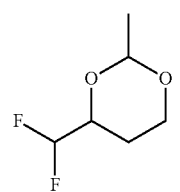
I-130 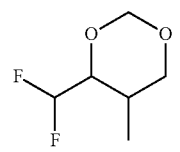
I-131 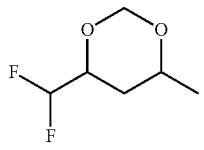
I-132 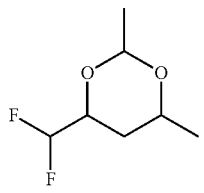
I-133 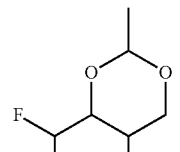
I-134 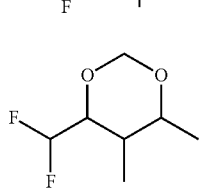
I-135 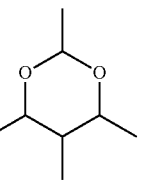
I-136 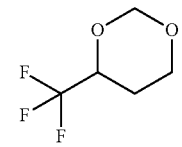
I-137 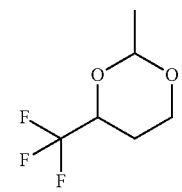
I-138 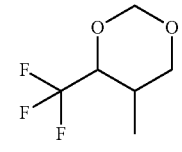
I-139 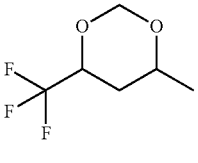
I-140 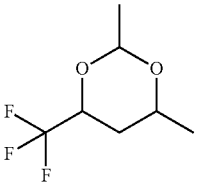
I-141 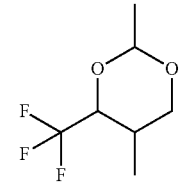
I-142 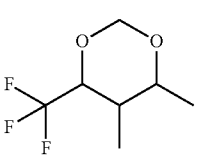
I-143 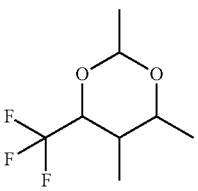

-continued
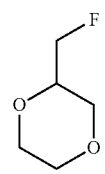 I-144
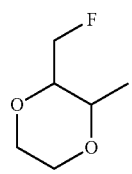 I-145
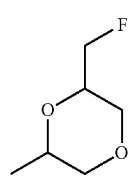 I-146
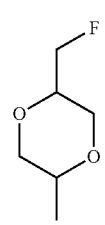 I-147
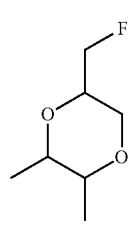 I-148
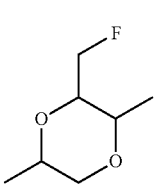 I-149
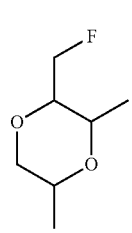 I-150
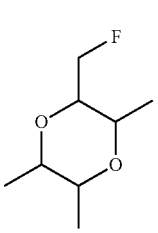 I-151
-continued
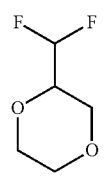 I-152
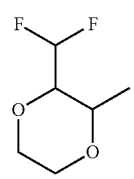 I-153
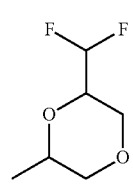 I-154
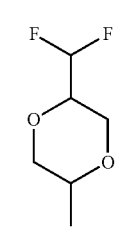 I-155
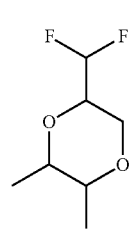 I-156
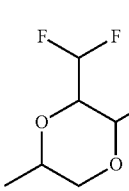 I-157
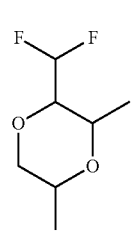 I-158
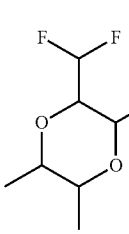 I-159

-continued
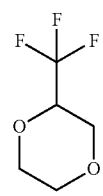
I-160
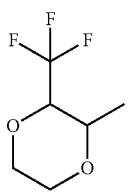
I-161
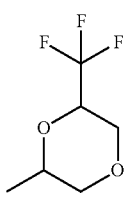
I-162
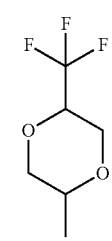
I-163
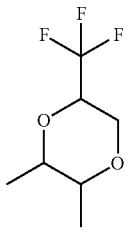
I-164
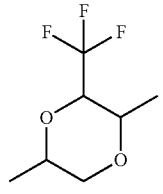
I-165
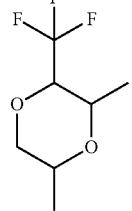
I-166
-continued
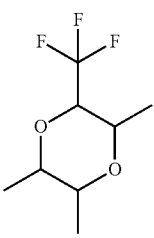
I-167
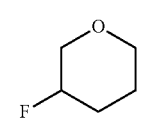
I-168
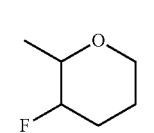
I-169
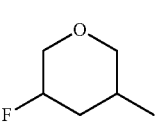
I-170
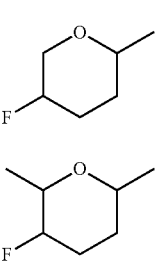
I-171
I-172
I-173
I-174
I-175
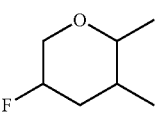
I-176
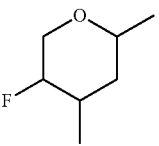
I-177

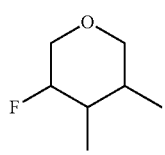 I-178
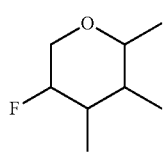 I-179
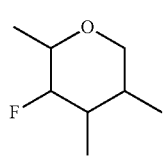 I-180
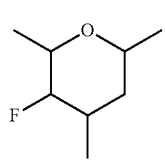 I-181
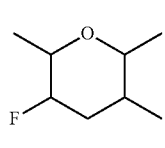 I-182
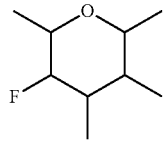 I-183
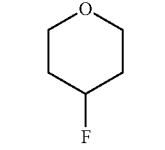 I-184
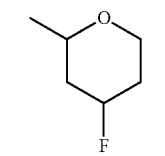 I-185
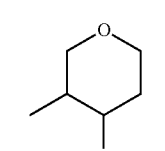 I-186
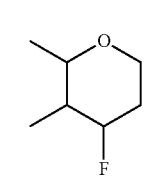 I-187
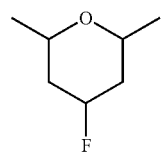 I-188
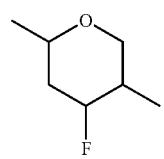 I-189
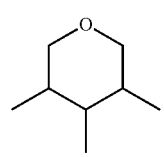 I-190
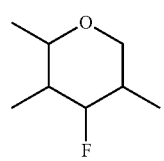 I-191
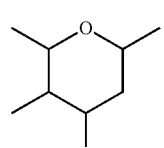 I-192
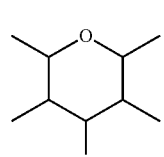 I-193
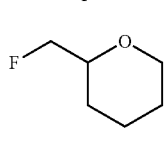 I-194
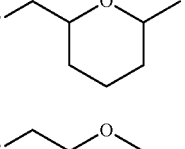 I-195
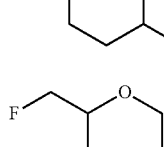 I-196
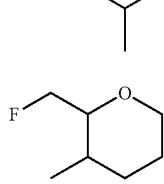 I-197
I-198

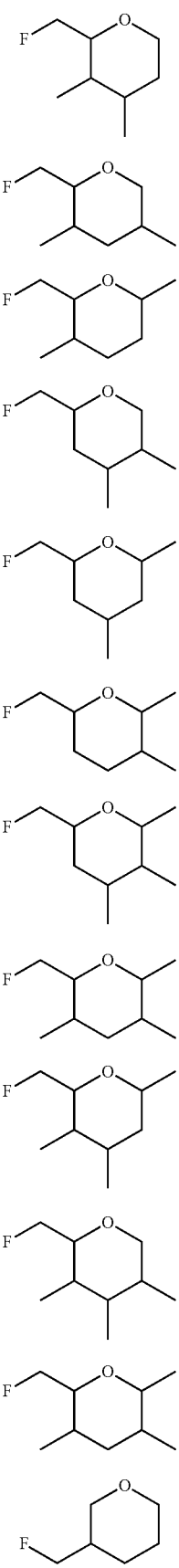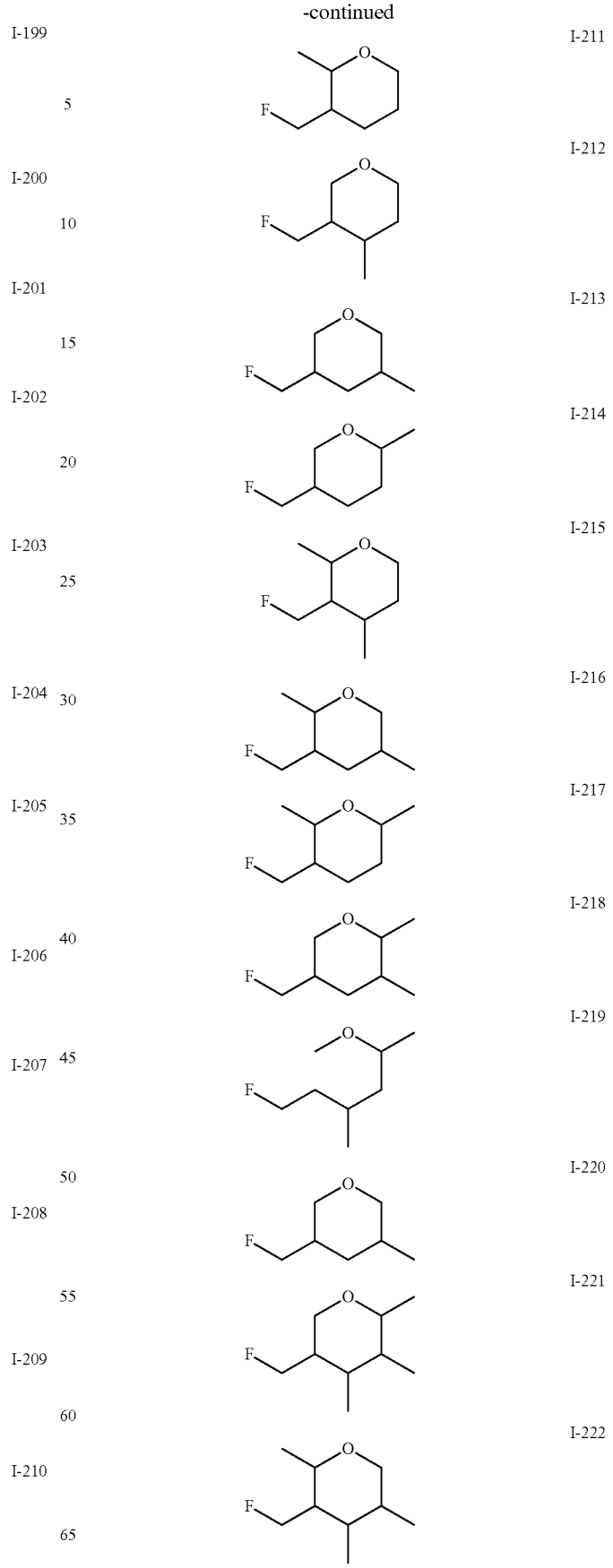

I-223 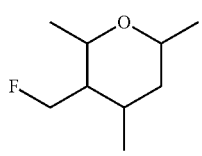
I-224 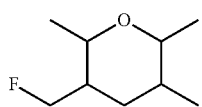
I-225 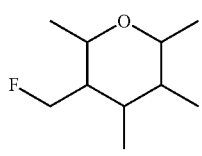
I-226 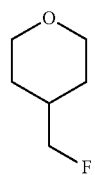
I-227 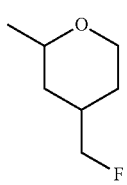
I-228 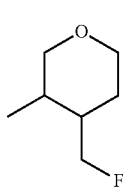
I-229 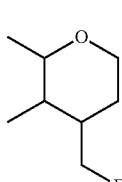
I-230 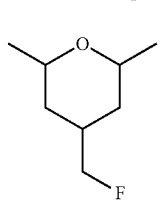
I-231 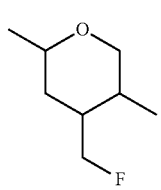
I-232 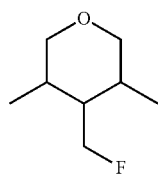
I-233 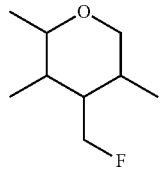
I-234 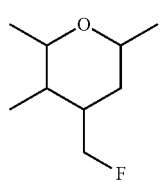
I-235 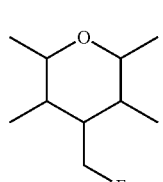
I-236 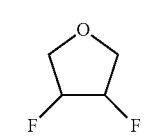
I-237 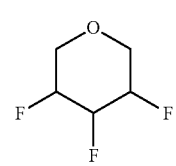
I-238 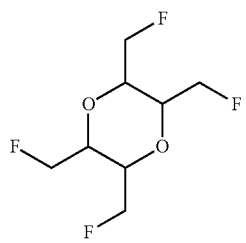
I-239 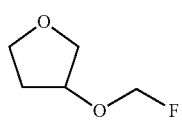
I-240 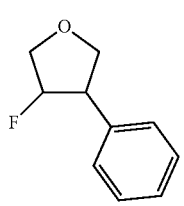

-continued

I-241

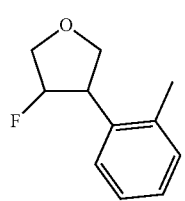

I-242

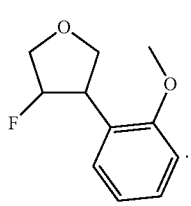

Optionally, the compound A includes compounds I-1, I-57, I-78, I-144, and I-184.

The compound A is optionally the above compounds because such components optimally contribute to both excellent oxidation resistance and the lithium salt dissociation ability that facilitates release of capacity at low temperature.

In any embodiment, the compound B is represented by a chemical formula II:

Formula II

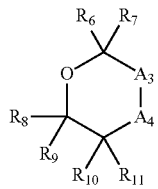

In the formula above, $A_3$ represents oxygen, a direct bond, or $CR_{12}R_{13}$.

$A_4$ represents oxygen, a direct bond, or $CR_{14}R_{15}$.

$A_3$ and $A_4$ are not both oxygen and are not both direct bonds.

$R_6$, $R_7$, $R_8$, $R_9$, $R_{10}$, $R_{11}$, $R_{12}$, $R_{13}$, $R_{14}$, and $R_{15}$ each independently represent hydrogen, fluorine, $C_1$ to $C_5$ alkyl, or $C_1$ to $C_5$ fluoroalkyl, and optionally hydrogen, fluorine, or methyl.

At least one of $R_6$, $R_7$, $R_8$, or $R_9$ is fluorine. Optionally, at least one of $R_6$ or $R_7$ is fluorine and at least one of $R_8$ or $R_9$ is fluorine. Further optionally, $R_6$, $R_7$, $R_8$, and $R_9$ are all fluorine.

In the compound B, when the substituent is alkyl or fluoroalkyl, the alkyl chain needs to avoid being excessively long. If the alkyl chain is excessively long, the viscosity of the compound will increase and impair the low-temperature performance. Therefore, optionally, the number of carbon atoms in the substituent in compound B is less than or equal to 1.

In any embodiment, the compound B includes the following compounds:

II-1

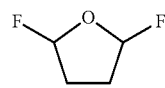

II-2

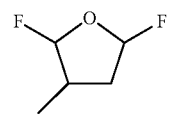

II-3

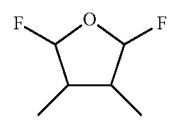

II-4

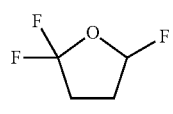

II-5

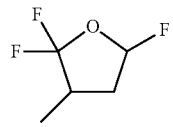

II-6

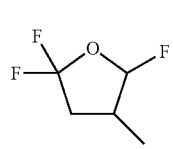

II-7

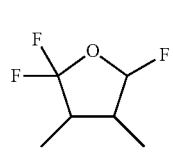

II-8

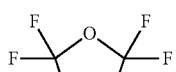

II-9

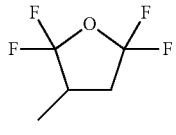

II-10

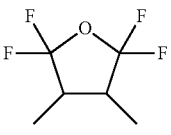

II-11

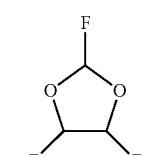

II-12

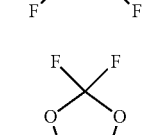

-continued
II-13
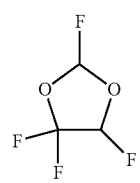
II-14
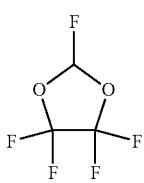
II-15
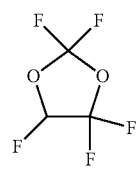
II-16
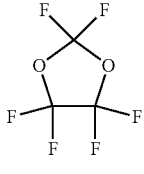
II-17
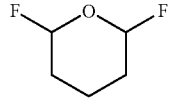
II-18
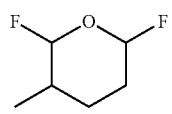
II-19
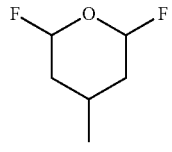
II-20
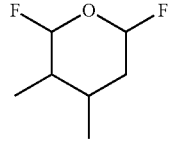
II-21
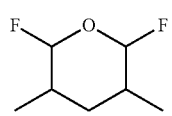
II-22
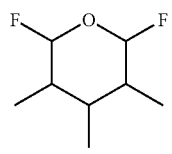
-continued
II-23
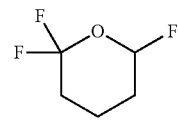
II-24
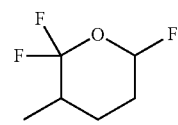
II-25
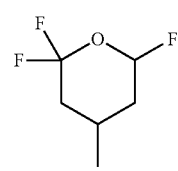
II-26
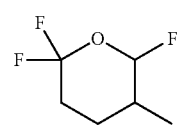
II-27
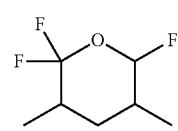
II-28
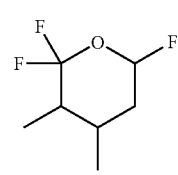
II-29
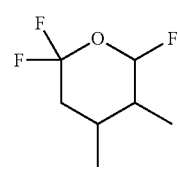
II-30
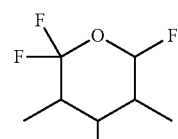
II-31
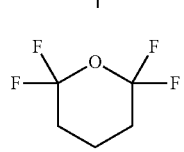
II-32
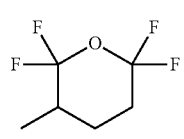
II-33
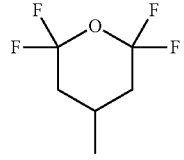

II-34

II-35

II-36

II-37

II-38

II-39

II-40

II-41

II-42

II-43

II-44

II-45

II-46

II-47

II-48

II-49

II-50

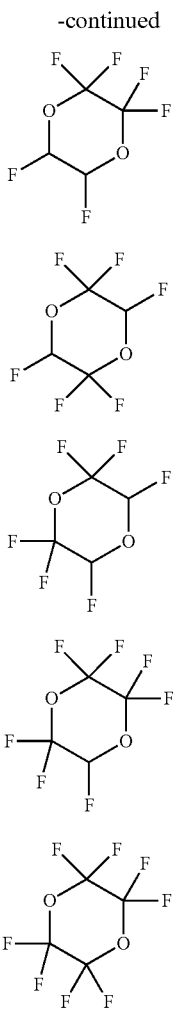

II-51

II-52

II-53

II-54

II-55

Optionally, the compound B includes compounds II-8, II-9, II-10, II-16, II-31, II-32, II-33, II-34, II-35, II-36, II-47, II-48, and II-55.

Compound B is optionally the above compounds because all the hydrogen atoms on the alpha carbon adjacent to the ring oxygen atom in a ring of such components are replaced by fluorine atoms. Theoretically, it is fundamentally impossible for such components to undergo oxidative decomposition. Therefore, such components can significantly promote the stability of the electrolyte solution. In addition, the molecular structure of such components is relatively small, thereby being conducive to maintaining a low viscosity of the electrolyte solution at low temperature.

In any embodiment, a mass ratio of the compound A to the compound B in the nonaqueous electrolyte solution ranges from 0.20 to 6.00, optionally 0.20 to 5.00, further optionally 0.40 to 2.50, and still further optionally 0.80 to 1.25.

If the mass percent of the compound A is excessively high, the oxidation resistance of the nonaqueous electrolyte solution will be slightly reduced, thereby being detrimental cycle stability. If the mass percent of the compound B is excessively high, the solubility of the lithium salt in the mixed solvent will be reduced, thereby being detrimental to ion transport and cycle stability.

In any embodiment, the nonaqueous electrolyte solution further includes one or more salts containing an alkali metal or an alkaline earth metal, and optionally includes one or more lithium salts. Further optionally, the lithium salt includes lithium bis(fluorosulfonyl)imide (LiFSI), lithium hexafluorophosphate (LiPF$_6$), lithium tetrafluoroborate (LiBF$_4$), lithium hexafluoroarsenate (LiAsF$_6$), lithium bis (trifluoromethanesulfonyl)imide (LiTFSI), lithium trifluoromethanesulfonate (LiOTF), lithium difluorophosphate (LiDFP), lithium dioxalatoborate (LiBOB), lithium difluoro (oxalato) borate (LiDFOB), lithium difluorobis(oxalato) phosphate, lithium tetrafluoro (oxalato)phosphate, or a combination thereof. Still further optionally, the lithium salt is lithium bis(fluorosulfonyl)imide.

The above lithium salt, optionally lithium bis(fluorosulfonyl)imide, can decompose on the surface of the negative electrode to form a solid electrolyte interface (SEI) film constituent rich in inorganic fluorine, thereby being conducive to the long-term cycling capability of the secondary battery. Moreover, the lithium salt is of relatively high dissociation ability, and contributes to a relatively high ionic conductivity of electrolyte solution and a relatively low viscosity of the electrolyte solution, thereby enhancing the capability of releasing the capacity under low-temperature conditions.

In any embodiment, a concentration range of a lithium salt in the nonaqueous electrolyte solution is 0.3 to 6 mol/L, optionally 0.5 to 5 mol/L, further optionally 1.0 to 3.0 mol/L, and still further optionally 1.5 to 2.5 mol/L.

By controlling the concentration of the lithium salt in the nonaqueous electrolyte solution to fall within the above range, the concentration is neither so high as to decrease the ionic conductivity and increase the viscosity nor so low as to affect the stability of the electrolyte solution to the positive and negative electrodes, and at the same time, contributes to long-term cycle performance and low-temperature performance of the secondary battery.

In any embodiment, the nonaqueous electrolyte solution further includes an additive C containing a phosphate ester group and an alkoxy chain. A total number of carbon atoms in each alkoxy chain falls within a range of 1 to 20, and optionally 1 to 6. According to this application, the alkoxy chain in the molecule of the additive C needs to avoid being excessively long. The total number of carbon atoms of all alkoxy groups in each alkoxy chain is preferably 1 to 20, and optionally 1 to 6. With the increase in the length of the chain and in the number of the alkoxy groups, the compatibility of the additive C is higher, and the boiling point of the additive C is higher, but the viscosity is increased, and in turn, the ionic conductivity is decreased, thereby impairing the cycle performance of the battery. Therefore, the total number of carbon atoms in the alkoxy chain is optionally not more than 6.

The additive C produces an excellent flame retardant effect. In the molecule of the additive C, the alkoxy group is an ethoxy group, and the substitutive fluorine atom is located only at the terminal of the molecule of the additive C but not attached to the carbon atom directly adjacent to the oxygen atom, thereby making it convenient to complex lithium ions in the lithium salt, and facilitating the lithium salt to dissolve to form a homogeneous solution. In addition, the viscosity is not high, thereby improving the thermal stability of the lithium salt in the electrolyte solution, and improving the safety performance of the battery during thermal shock. Moreover, after being fluorinated, the additive C is more excellent in flame retardance.

Therefore, in any embodiment, a molecule of an additive C includes a phosphate ester group and at least one of the following groups: a $C_1$ to $C_4$ alkyl, a $C_1$ to $C_4$ fluoroalkyl, a $C_1$ to $C_4$ ethoxyalkyl ether, a $C_1$ to $C_4$ ethoxy ethoxyalkyl ether, a $C_1$ to $C_4$ ethoxy fluoroalkyl ether, or a $C_1$ to $C_4$ ethoxy-ethoxy fluoroalkyl ether, where the fluoro in the $C_1$ to $C_4$ fluoroalkyl means monofluoro, difluoro, or trifluoro substitution by one, two, or three fluorine atoms, respectively, located at a terminal of a molecule of the additive C and not attached to a carbon atom directly adjacent to an oxygen atom.

In any embodiment, the additive C is represented by a chemical formula III:

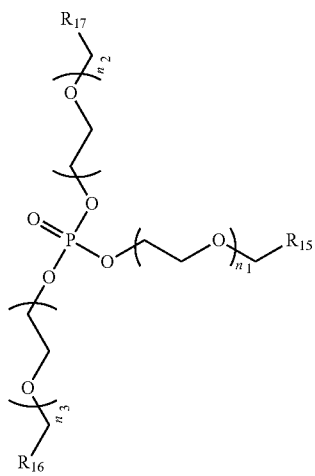

III

In the formula above, $n_1$, $n_2$, and $n_3$ represent 0, 1, and 2 respectively, and $n_1$, $n_2$, and $n_3$ are not all 0.

$R_{16}$, $R_{17}$ and $R_{18}$ each independently represent hydrogen, $C_1$ to $C_4$ alkyl, $C_1$ to $C_4$ monofluoroalkyl, $C_1$ to $C_4$ difluoroalkyl, or $C_1$ to $C_4$ trifluoroalkyl, where the fluoro in the $C_1$ to $C_4$ monofluoroalkyl, the $C_1$ to $C_4$ difluoroalkyl, or the $C_1$ to $C_4$ trifluoroalkyl means fluorine substitution by one, two, or three fluorine atoms, respectively, located at a terminal of a molecule of the additive C; and optionally, the $C_1$ to $C_4$ alkyl is methyl or ethyl.

Optionally, $R_{16}$, $R_{17}$, and $R_{18}$ each independently represent —CH$_2$CH$_2$OCH$_2$CH$_2$OCH$_3$, —CH$_2$CH$_2$OCH$_2$CH$_2$OCH$_2$CH$_3$, —CH$_2$CH$_2$OCH$_2$CH$_2$OCH$_2$CF$_3$, —CH$_3$, —CH$_2$CH$_3$, —CH$_2$CH$_2$OCH$_2$CH$_2$OCH$_2$CHF$_2$, —CH$_2$CH$_2$OCH$_2$CH$_2$OCH$_2$F, —CH$_2$CF$_3$, —CH$_2$CH$_2$F, —CH$_2$CHF$_2$, —CH$_2$CH$_2$OCH$_3$, —CH$_2$CH$_2$OCH$_2$CH$_3$, —CH$_2$CH$_2$OCH$_2$F, —CH$_2$CH$_2$OCH$_2$CHF$_2$, or —CH$_2$CH$_2$OCH$_2$CF$_3$.

In any embodiment, the additive C includes the following compounds:

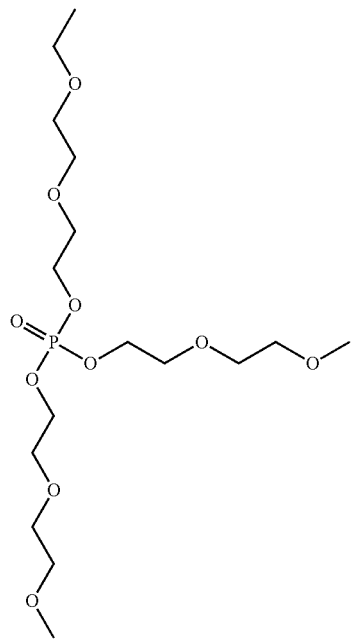

III-2

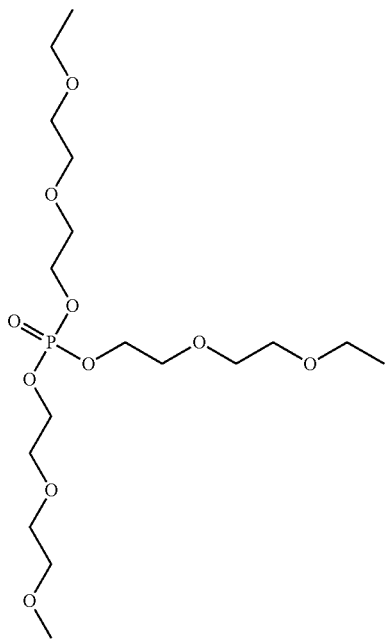

III-3

III-1

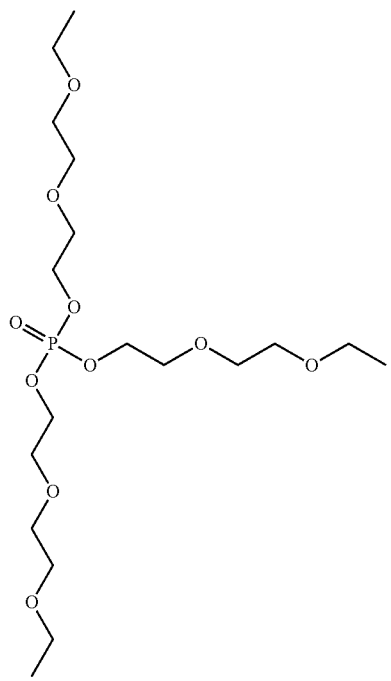
III-4
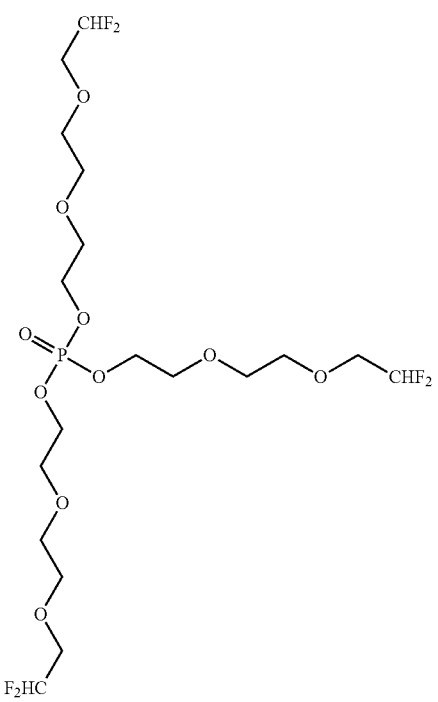
III-6
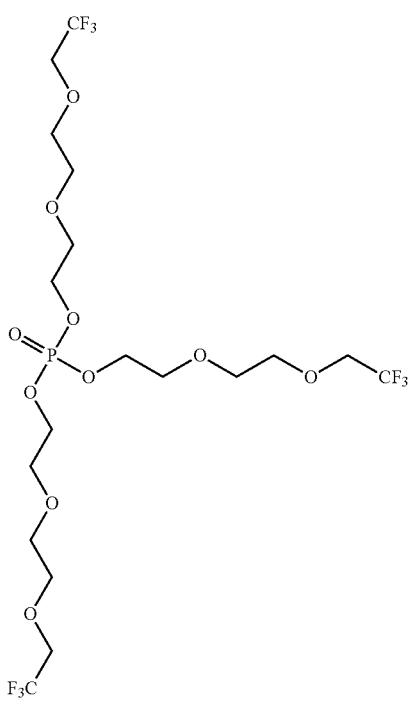
III-5
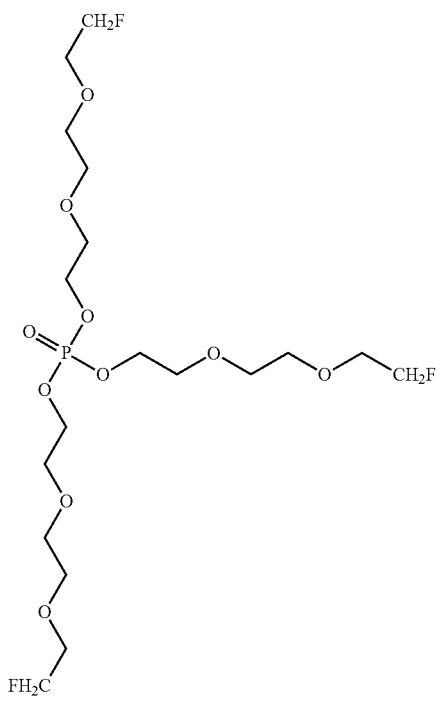
III-7

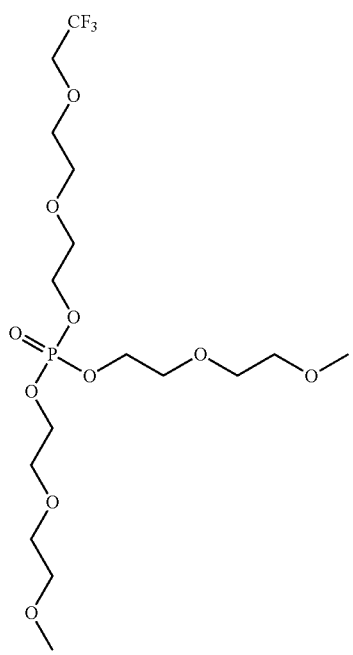
III-8
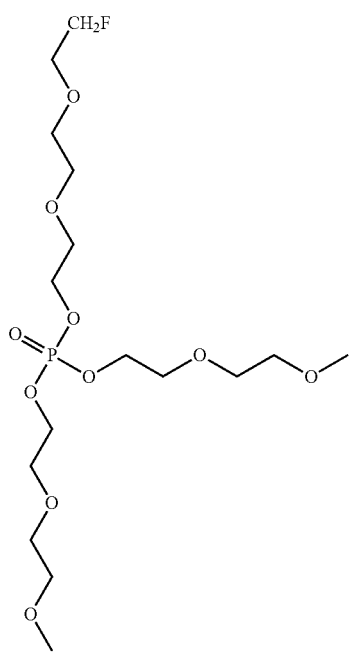
III-10
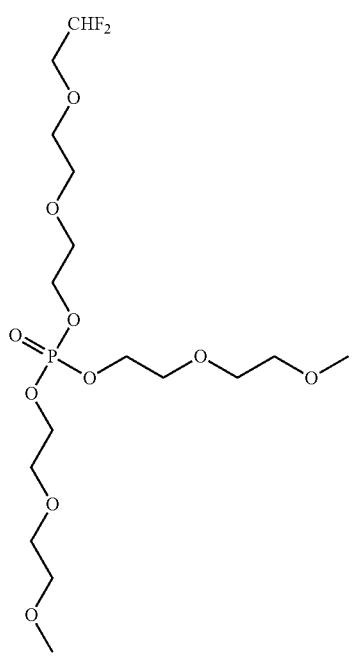
III-9
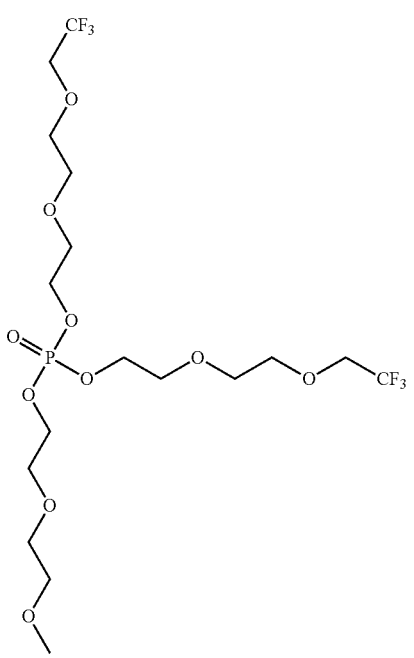
III-11

III-12
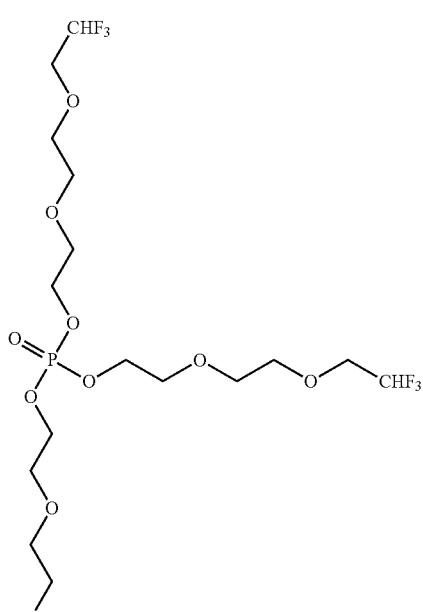
III-13
III-14
III-15
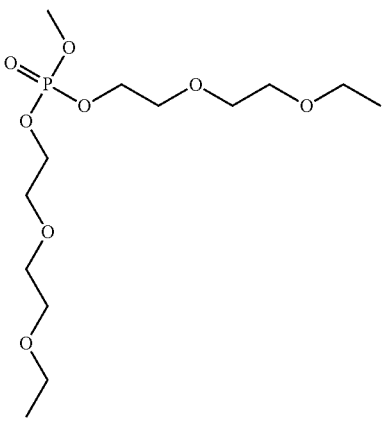
III-16
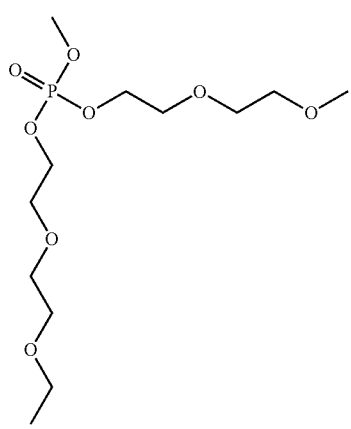
III-17
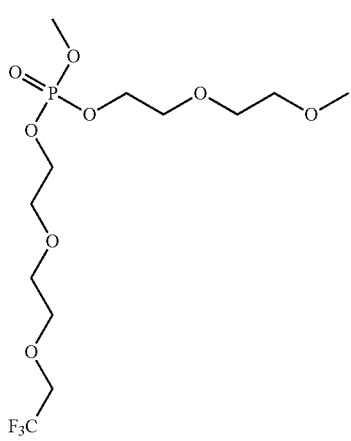

III-18
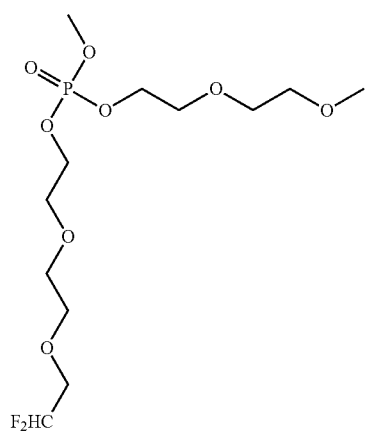
III-19
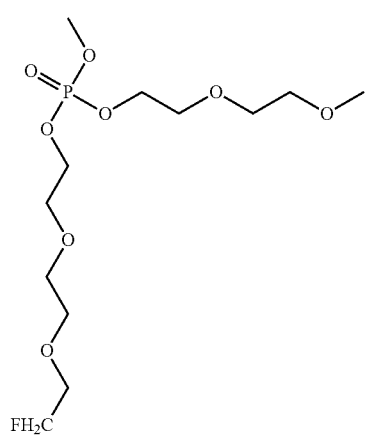
III-20
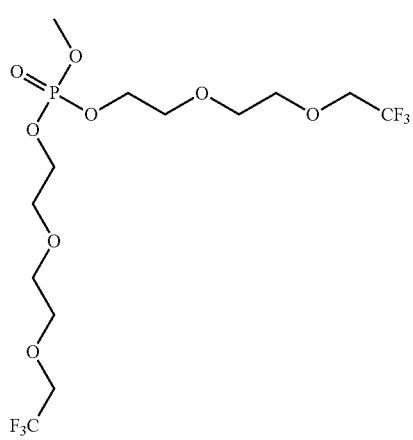
III-21
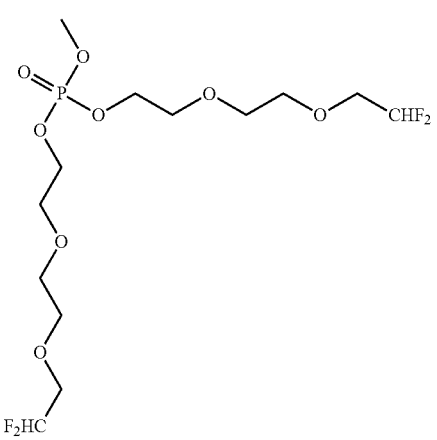
III-22
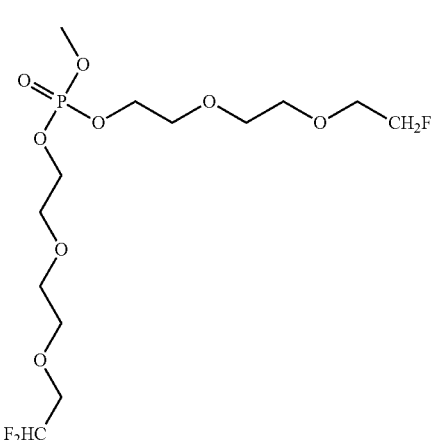
III-23
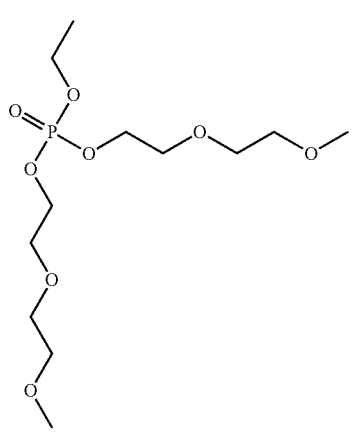

III-24
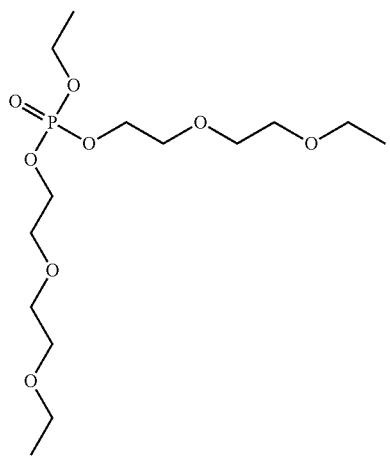
III-25
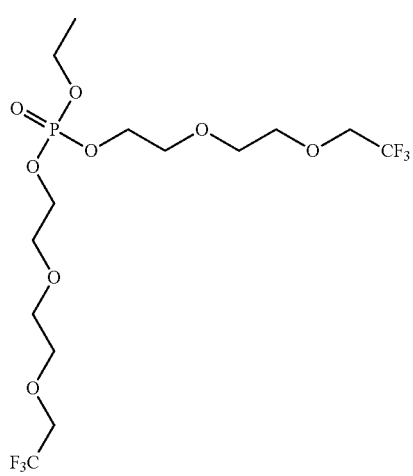
III-26
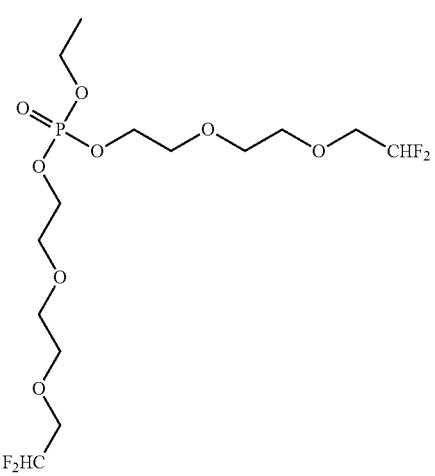
III-27
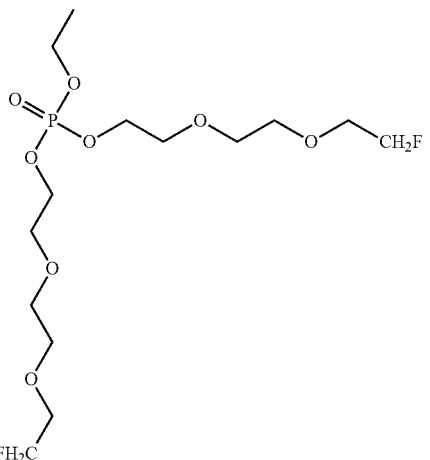
III-28
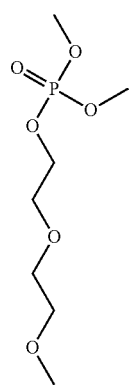
III-29
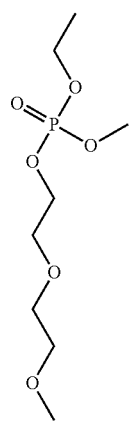

III-30
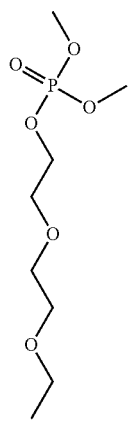
III-31
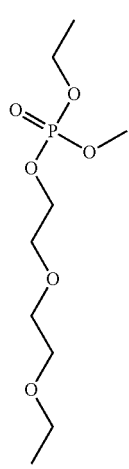
III-32
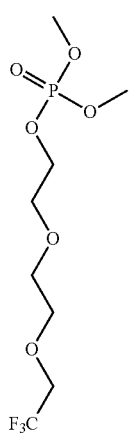
III-33
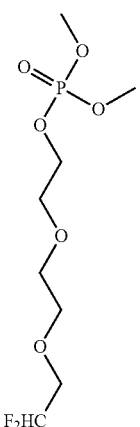
III-34
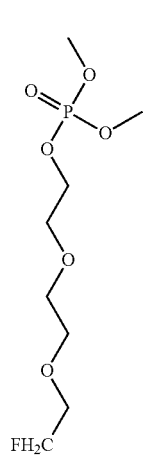
III-35
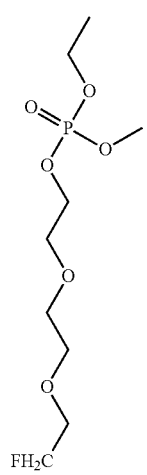

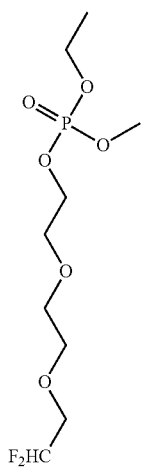
III-36
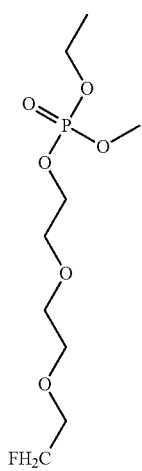
III-37
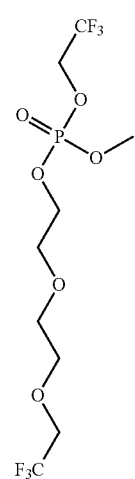
III-38
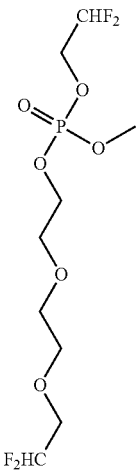
III-39
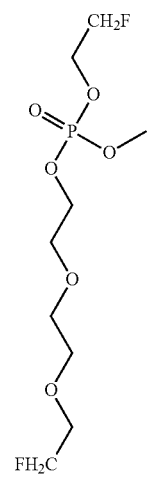
III-40
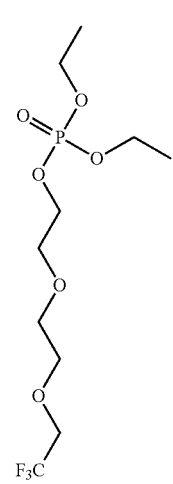
III-41

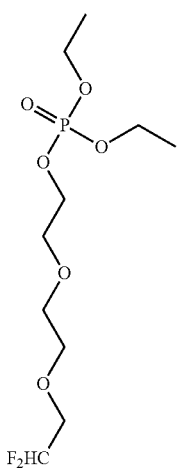
III-42
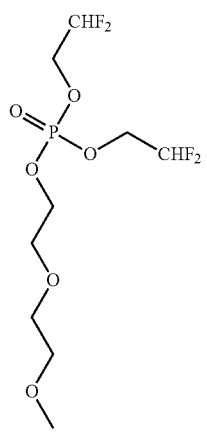
III-45
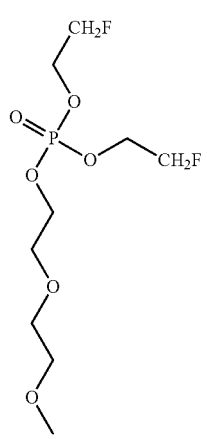
III-43
III-46
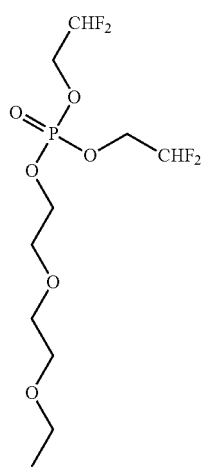
III-44
III-47

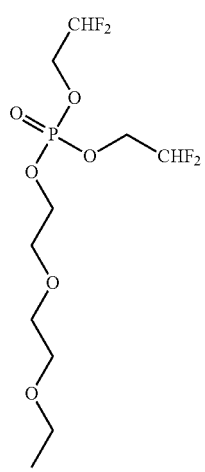
III-48
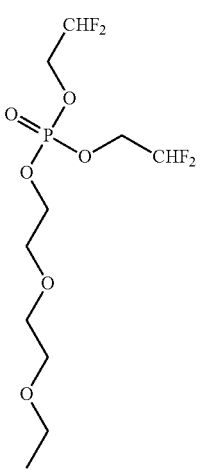
III-49
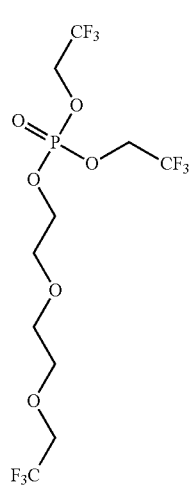
III-50
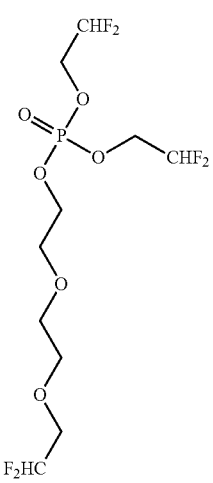
III-51
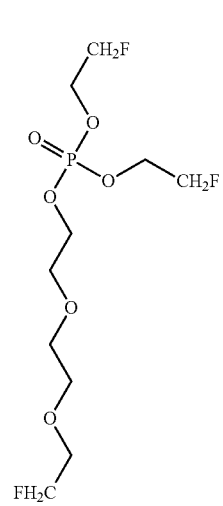
III-52
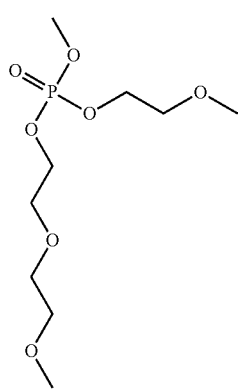
III-53

III-54
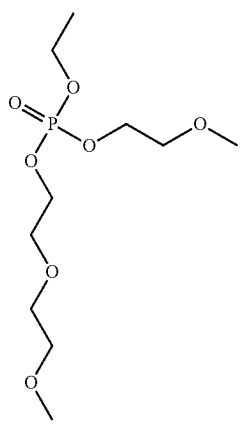
III-55
III-56
III-57
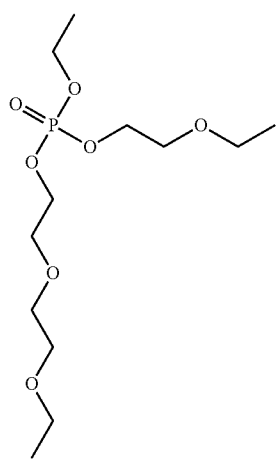
III-58
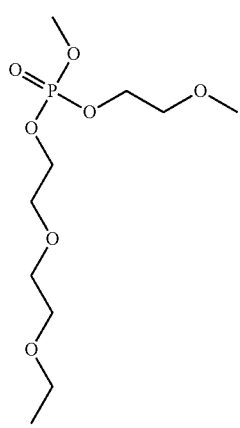
III-59
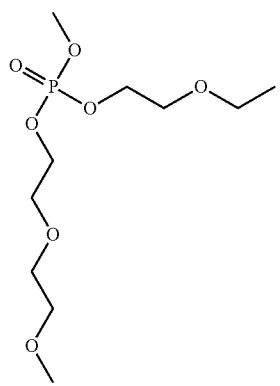

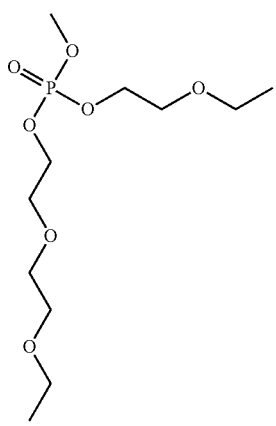 III-60
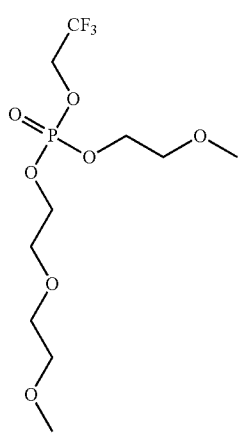 III-61
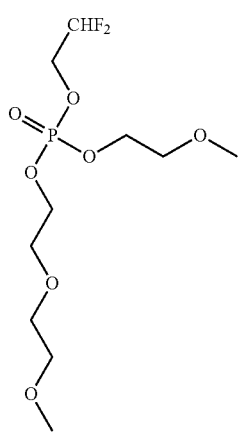 III-62
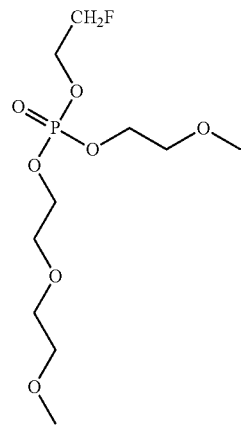 III-63
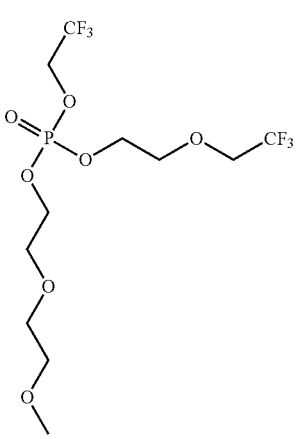 III-64
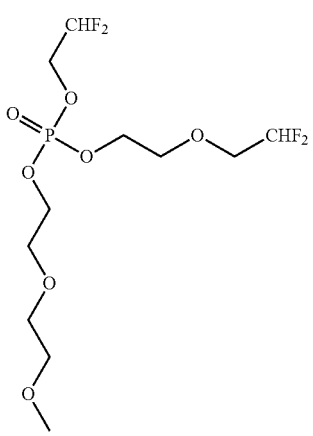 III-65

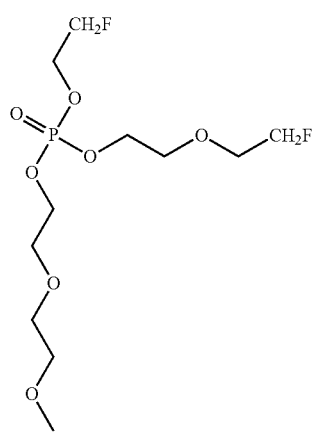
III-66
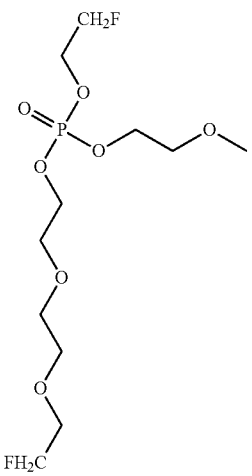
III-69
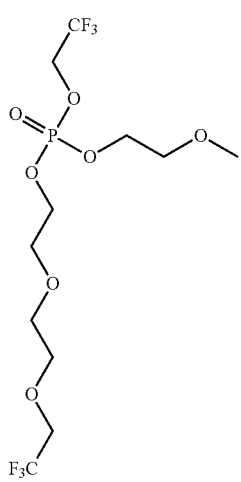
III-67
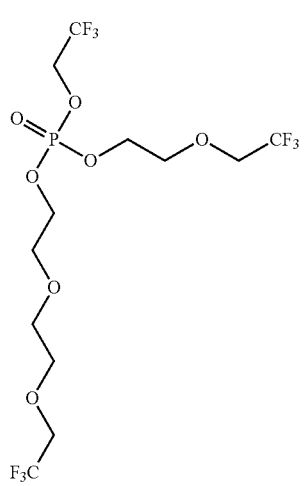
III-70
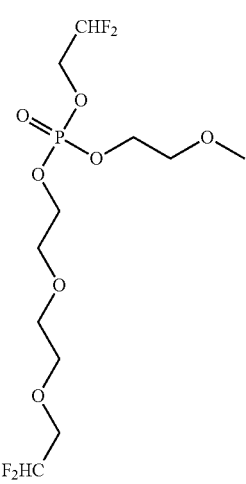
III-68
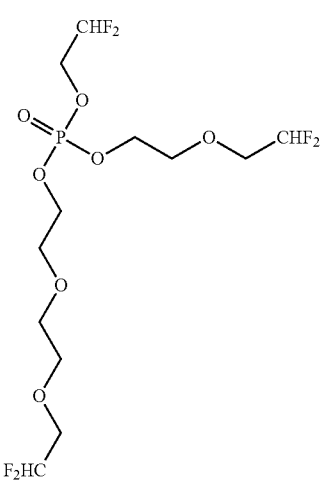
III-71

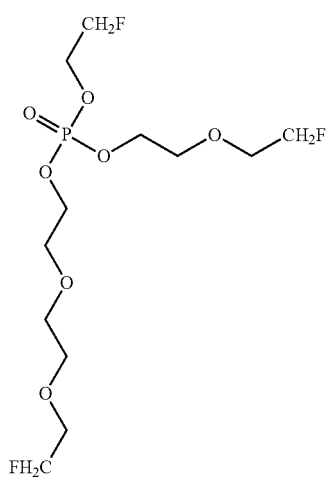
III-72
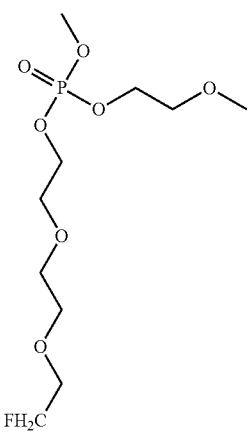
III-75
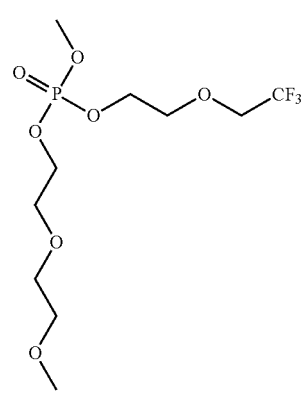
III-76
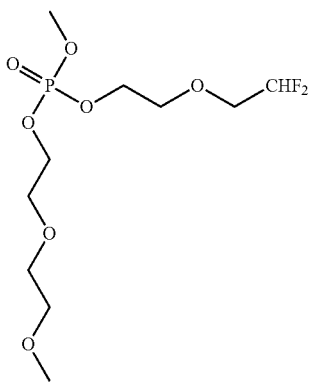
III-77
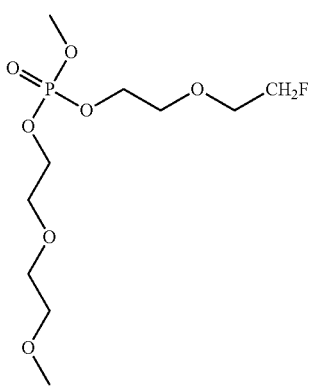
III-78
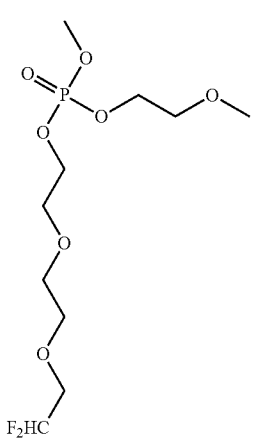
III-73
III-74

III-79
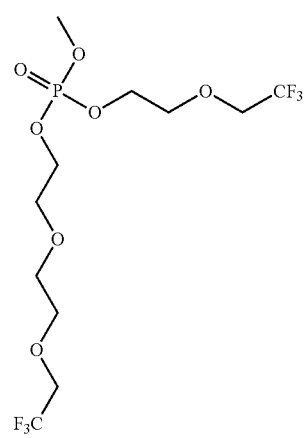
III-82
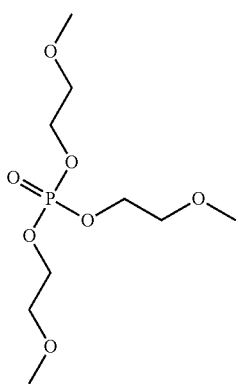
III-80
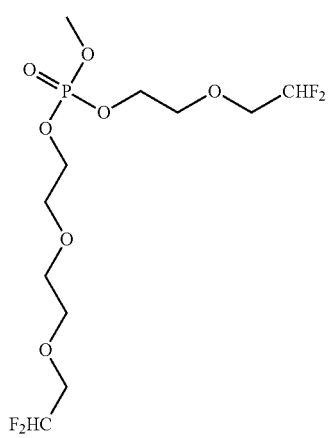
III-83
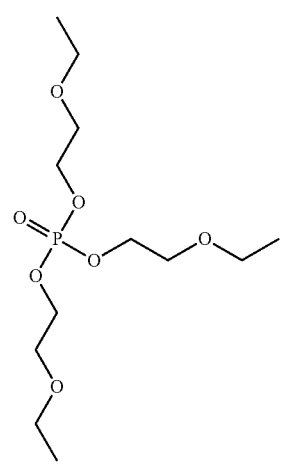
III-81
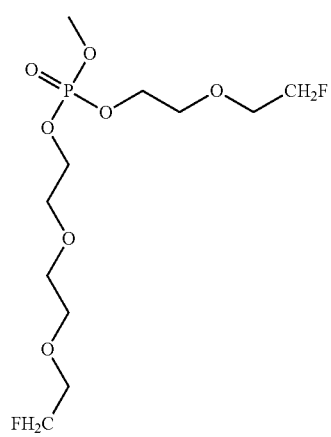
III-84
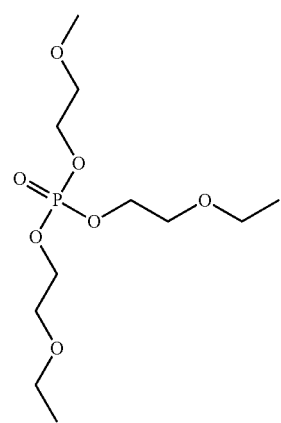

III-85
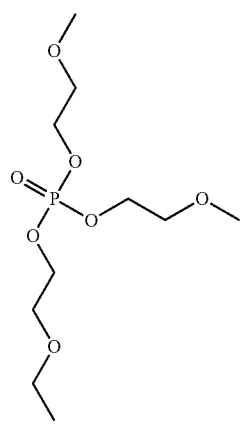
III-86
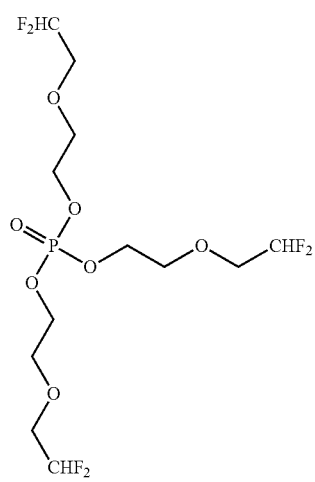
III-87
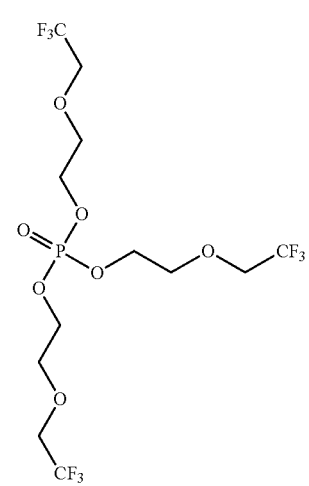
III-88
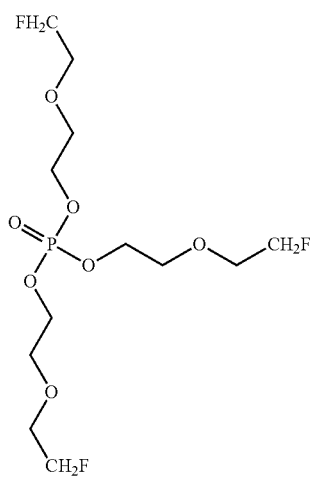
III-89
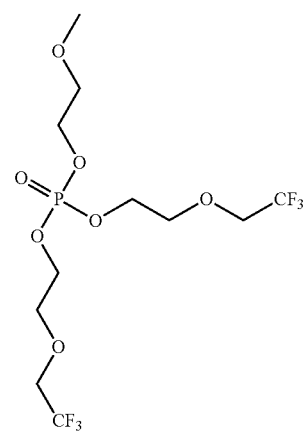
III-90
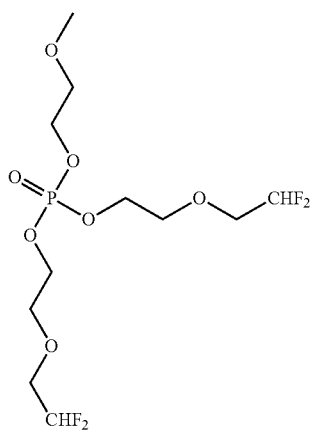

III-91
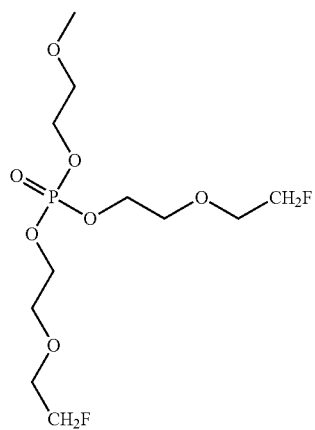
III-92
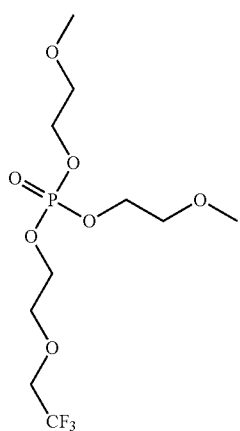
III-93
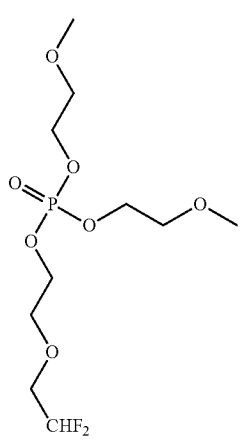
III-94
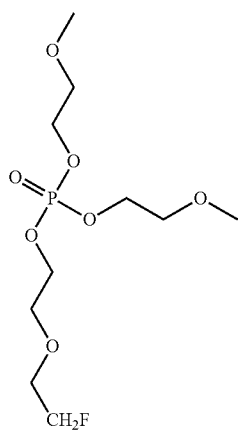
III-95
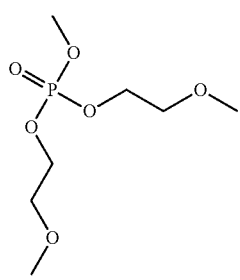
III-96
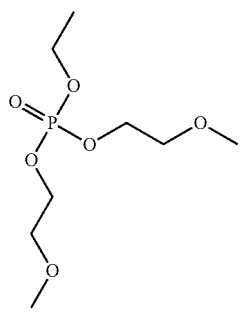
III-97
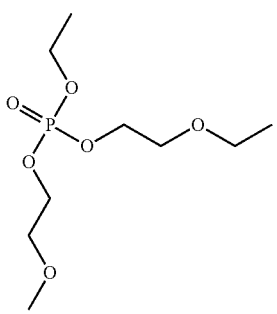
III-98
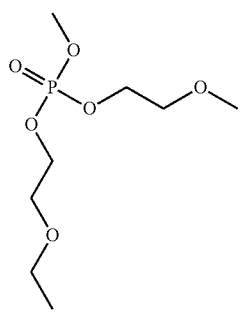

III-99
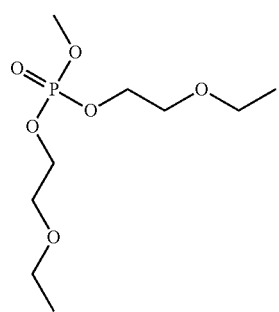
III-100
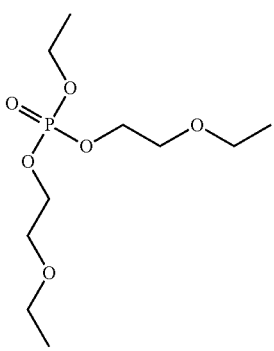
III-101
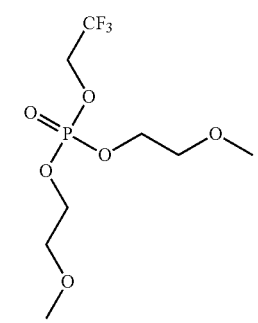
III-102
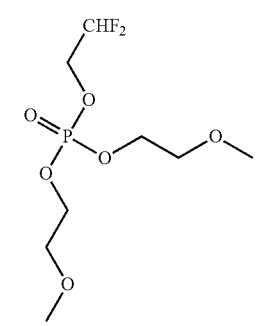
III-103
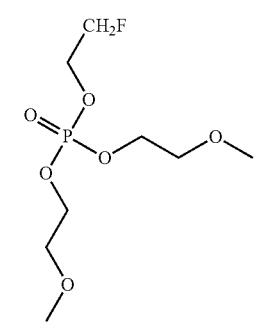
III-104
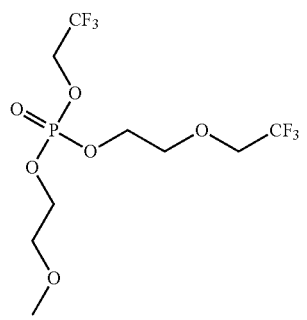
III-105
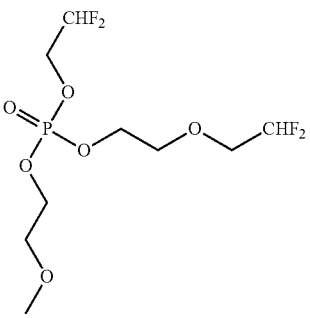
III-106
III-107
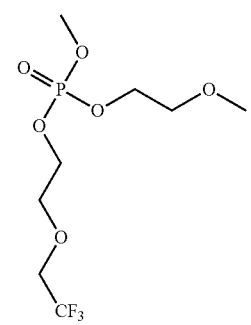

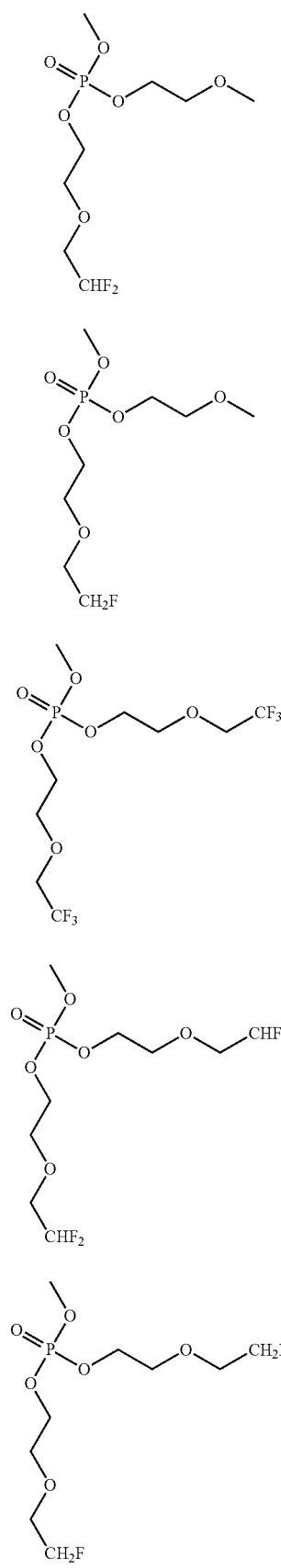
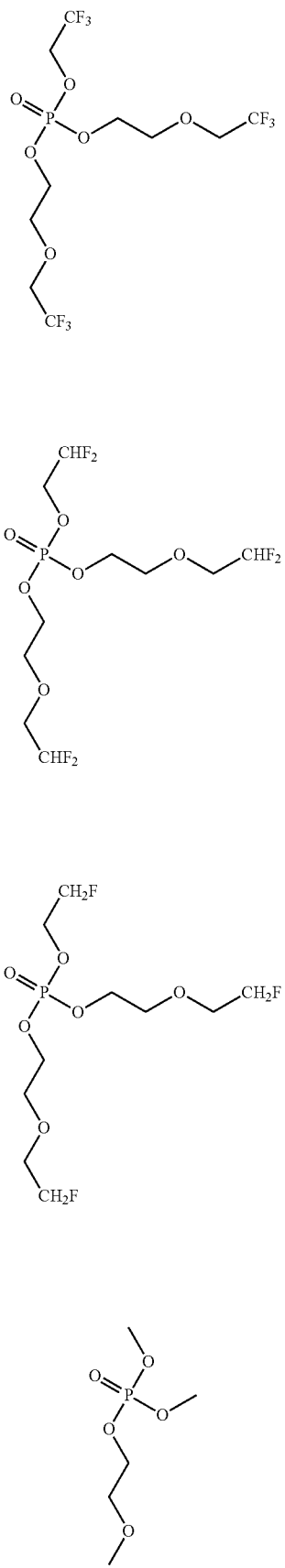

III-117
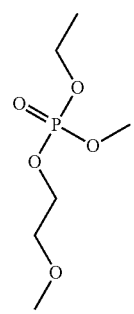
III-118
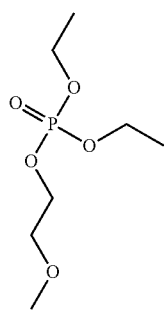
III-119
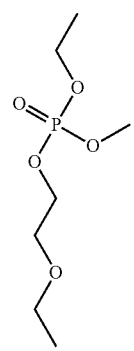
III-120
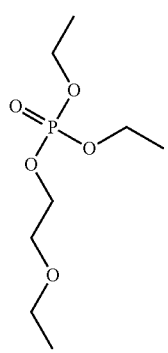
III-121
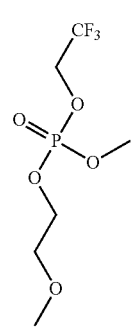
III-122
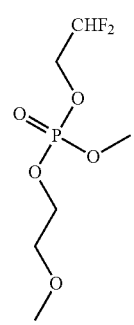
III-123
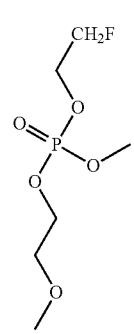
III-124
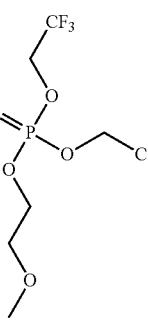
III-125
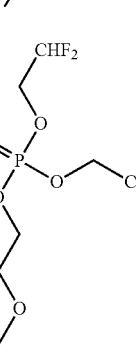
III-126
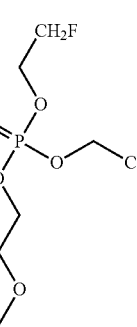

III-127 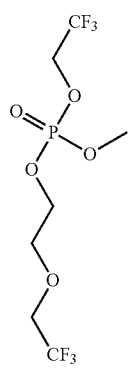

III-128 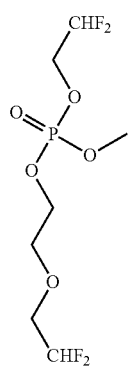

III-129 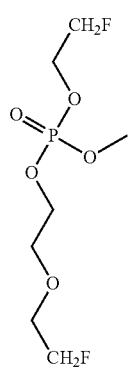

III-130 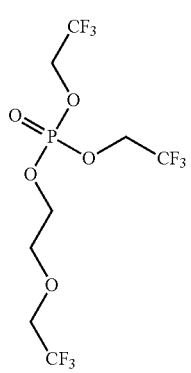

III-131 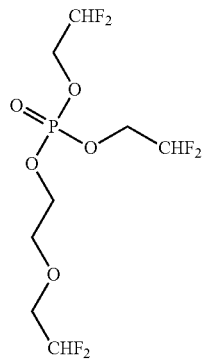

III-132 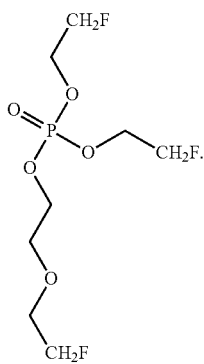

Optionally, the additive C includes III-20 and III-86.

The additive C is optionally the above compounds because such compounds are of high compatibility and possess a relatively low viscosity, thereby ensuring longevity of the battery. In addition, the flash point and the boiling point of such compounds are relatively high, and can reduce the exothermic value and the spontaneous combustion rate of the battery when the compounds are added into the electrolyte solution system.

In any embodiment, a mass fraction of an additive C is 0.5% to 30%, optionally 1% to 25%, and further optionally 5% to 15%, based on a total mass of the compound A, the compound B, and a lithium salt existent in the nonaqueous electrolyte solution.

The additive C added at a mass fraction falling within the above range not only facilitates the dissolution of the lithium salt and improves the compatibility with the lithium-ion electrolyte solutions, increases the boiling point and flame retardant properties of the electrolyte solution, but also avoids significantly impairing the ion transport properties of the electrolyte solution and ensures the long-term cycle performance.

In any embodiment, in a molecule of an additive C, when a terminal of the molecule contains fluorine, a mass fraction of the additive C in the nonaqueous electrolyte solution is 15% to 30%, based on a total mass of the compound A, the compound B, and a lithium salt existent in the nonaqueous electrolyte solution.

The viscosity of the fluorinated phosphate ester tends to decrease. Therefore, in a case that the fluorinated phosphate ester is applied, the additive can be added at a higher mass percent into the electrolyte solution system. The fluorinated phosphate ester coordinates with the compound A and the compound B to form an electrolyte solution system, thereby reducing the exothermic value and the spontaneous combustion rate of the battery, and in turn, improving the safety of the battery without affecting the battery life.

A second aspect of this application provides a lithium secondary battery. The lithium secondary battery includes the nonaqueous electrolyte solution according to the first aspect of this application.

In any embodiment, the secondary battery is an anode-free lithium secondary battery.

When applied to an anode-free lithium secondary battery, the nonaqueous electrolyte solution disclosed in this application can improve the long-term cycling capability of the secondary battery cycled at a high charge cut-off voltage, and significantly improve the capacity release capability and cycle life of the secondary battery discharged at low temperature (for example, −40° C.). In addition, the nonaqueous electrolyte solution contributes to significantly improved safety performance to meet the functional requirements of electric vehicles, high-altitude electric aircraft, and other low-temperature-critical application scenarios in the future.

In any embodiment, the secondary battery includes a negative electrode plate. The negative electrode plate includes no negative active material. The nonaqueous electrolyte solution disclosed in this application is matched with a negative electrode that includes no negative active material, and the resultant secondary battery is more excellent in the long-term cycling capability and low-temperature cycle performance.

In any embodiment, the secondary battery includes a negative electrode plate, and the negative electrode plate is not a graphite negative electrode or a silicon negative electrode.

In any embodiment, the secondary battery includes a negative electrode plate, and the negative electrode plate contains no lithium ions.

In any embodiment, the secondary battery includes a negative electrode plate. The negative electrode plate includes a negative current collector and a metal layer or an oxide layer located on the negative current collector. Optionally, a thickness of the metal layer or oxide layer is 0 to 200 nm. Optionally, the metal layer includes one or more of tin, zinc, aluminum, magnesium, silver, gold, gallium, indium, or platinum. Optionally, the oxide layer includes one or more of zinc oxide, aluminum oxide, or titanium oxide.

In any embodiment, the secondary battery includes a negative electrode plate. The negative electrode plate includes a negative current collector. The negative current collector is a copper foil. Optionally, the negative electrode plate consists only of the copper foil.

In any embodiment, the secondary battery includes a negative electrode plate. The negative electrode plate includes a copper foil current collector and a lithium metal foil. Optionally, the lithium metal foil is 5 to 100 μm thick.

A third aspect of this application provides an electrical device. The electrical device includes the nonaqueous electrolyte solution according to the first aspect of this application or the secondary battery according to the second aspect of this application.

Figure 1:
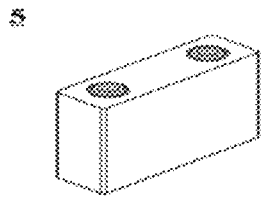
FIG. 1 is a schematic diagram of a secondary battery according to an embodiment of this application.

LIST OF REFERENCE NUMERALS 1. battery pack; 2. upper box; 3. lower box; 4. battery module; 5. secondary battery; 51. housing; 52. electrode assembly; 53. cover plate.

DETAILED DESCRIPTION

The following discloses and describes in detail a nonaqueous electrolyte solution, a secondary battery, and an electrical device according to some embodiments of this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 6. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and optionally, in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, or closed-ended inclusion. For example, the terms "include" and "comprise" may mean inclusion of other items that are not recited, or inclusion of only the items recited.

Unless otherwise expressly specified, the term "or" used herein is inclusive. For example, the expression "A or B" means "A alone, B alone, or both A and B". More specifically, all and any of the following conditions satisfy the condition "A or B": A is true (or existent) and B is false (or absent): A is false (or absent) and B is true (or existent); and, both A and B are true (or existent).

Currently, the cycle performance of lithium secondary batteries has been improved. However, the improvement in the cycle performance of lithium secondary batteries under extreme working conditions, especially under low-temperature conditions (for example, lithium secondary batteries in electric vehicles/high-altitude electric aircraft in low-temperature environments), is still unsatisfactory: Especially, conventional electrolyte solution formulas for prolonging the cycle life of secondary batteries are usually accompanied by characteristics such as a high concentration, a high viscosity; a high melting point, and a high boiling point, thereby being detrimental to maintaining normal cycling at low temperature. In response to such problems, this application discloses a new electrolyte solution formula. The electrolyte solution is a nonaqueous electrolyte solution. When applied to a lithium secondary battery, the nonaqueous electrolyte solution can significantly improve the low-temperature cycle performance and low-temperature capacity retention rate of the secondary battery. In addition, the nonaqueous electrolyte solution is combined with a lithium-free negative electrode to produce a secondary battery that exhibits excellent low-temperature cycle performance and low-temperature capacity retention rate while achieving a high energy density concurrently.

In addition to the above problems, the safety of lithium secondary batteries is also nonnegligible. Driven by the electric vehicle industry, the lithium-ion battery industry has developed rapidly, and there is a pressing need to develop lightweight and high-energy-density battery materials. The successive emergence of power lithium-ion batteries makes it practicable to achieve long-range and high-power lithium metal secondary batteries. However, the safety of lithium-ion batteries is still a pressing issue.

Thermal runaway events of a battery caused by abuse conditions such as high temperature, nail penetration, overcharge, and squeezing are unceasing. The advent of high-capacity power lithium-ion batteries has exacerbated the safety concerns. Phosphate esters are commonly used flame retardants. Examples of phosphate esters include trimethyl phosphate (TMP), triethyl phosphate (TEP), dimethyl methylphosphate (DMMP), and diethyl ethylphosphate (DEEP). However, such flame retardants are hardly compatible with the electrolyte solution of a lithium-ion battery. Trithiophosphate ester additives are well compatible with the electrolyte solution of the lithium-ion battery; but the mass percent of the trithiophosphate ester additive is as low as 3% to 7% based on the total mass of the electrolyte solution. In response to this problem, the applicant finds through research that a chain alkoxy group added into the phosphate ester not only increases the boiling point of the phosphate ester but also improves the compatibility of the phosphate ester due to gain of some physical and chemical properties of the chain alkoxy group. Moreover, after being fluorinated, such phosphate ester not only improves the thermal stability of the lithium salt in the electrolyte solution, but also improves the safety performance of the battery during thermal shock. In addition, the viscosity of the fluorinated phosphate ester is reduced. Therefore, the phosphate ester can be added into the electrolyte solution system at a relatively high mass percent, thereby further improving the safety performance of the lithium battery:

Therefore, a first aspect of this application provides a nonaqueous electrolyte solution, including:

a compound A, including a saturated five-membered ring or six-membered ring that contains 1 or 2 oxygen atoms as ring atoms, where the compound A includes at least one fluorine-containing substituent, and a ring carbon atom connected to the oxygen atom in the five-membered ring or six-membered ring is not directly replaced by fluorine; and a compound B, including a saturated five-membered ring or six-membered ring that contains 1 or 2 oxygen atoms as ring atoms, where at least one ring carbon atom connected to the oxygen atom in the five-membered ring or six-membered ring is directly replaced by at least one fluorine atom; and optionally, each ring carbon atom connected to the oxygen atom is directly replaced by at least one fluorine atom, optionally by two fluorine atoms.

Optionally, the saturated five-membered ring or six-membered ring containing 1 or 2 oxygen atoms as ring atoms includes tetrahydrofuran, 1,3-dioxolane, 1,3-dioxane, 1,4-dioxane, or tetrahydropyran.

In the nonaqueous electrolyte solution, the compounds A and B exist as solvents, both being epoxy compound solvents. As used herein, "compound A" is also referred to as a solvent A, and "compound B" is also referred to as a solvent B.

According to this application, at least one fluorine-containing substituent needs to be contained in the compound A so that the strong electron-withdrawing effect of fluorine atoms can be utilized to significantly improve the oxidation resistance of the compound and achieve the long-term stable cycling of the compound in the secondary battery. Especially, if the fluorine atom directly substitutes for an atom or group attached to a carbon atom adjacent to an oxygen atom, the strong electron-withdrawing effect will strongly attract the lone electron pair of the oxygen atom, thereby possibly causing the oxygen atom to lose the ability to bind with lithium ions, and in turn, making the molecule of the solvent A no longer able to dissolve a lithium salt effectively. Therefore, in the compound A, the fluorine atom does not directly substitute for an atom or group attached to the ring carbon atom adjacent to the oxygen atom, thereby improving the oxidation resistance of the compound A to some extent while retaining good ability to dissolve lithium salts.

In contrast to compound A, in the compound B, a fluorine atom is required to directly substitute for an atom or group attached to an alpha carbon atom adjacent to the oxygen atom in the ring. Experimental and calculation results show that the oxidative decomposition process of the epoxy compound solvent is as follows: first, the alpha carbon adjacent to the oxygen atom in the ring is dehydrogenated to generate a free radical, and then further oxidized to form a corresponding product. The strongly electron-withdrawing group on the alpha carbon can significantly reduce the stability of the free radical generated by dehydrogenation, thereby suppressing the occurrence of solvent oxidation. Therefore, on the one hand, an atom or group on the alpha carbon adjacent to the oxygen atom in the compound B is required to be replaced by a fluorine atom, thereby fundamentally eliminating the oxidative decomposition phenomena of the solvent structure on the positive electrode side of the secondary battery to some extent, or even to a great extent. On the other hand, in the compound B, due to the strong electron-withdrawing effect of the fluorine atom and the very close distance of the fluorine atom to the oxygen atom, the effect of dissolving the lithium salt by the compound B is inferior. Therefore, the compound B needs to coordinate with the compound A. With the same or similar basic ring structure, the compound B and the compound A are miscible. Therefore, the combination of the compound B and the compound A can dissolve the lithium salt effectively, and on the other hand, can further improve the oxidation resistance and stability of the nonaqueous electrolyte solution, and significantly reduce the probability of oxidative decomposition of the nonaqueous electrolyte solution.

In addition, both the compound A and the compound B are based on an epoxy six-membered ring or an epoxy five-membered ring, and optionally, based on tetrahydrofuran, 1,3-dioxolane, 1,3-dioxane, 1,4-dioxane, or tetrahydropyran. Such cyclic basic structures are suitable cyclic structures, and are neither undersized nor oversized. An undersized cyclic structure leads to excessive tension of the ring and makes the ring very prone to ring-opening reaction that affects the battery cycling. An oversized cyclic structure leads to a decline in the solvation ability, thereby resulting in an adverse effect on or even loss of the ability to maintain the discharge capacity at low temperature. Therefore, the compound A and the compound B containing the saturated five-membered ring or six-membered ring are of high stability. In addition, the above epoxy compounds are of a relatively low melting point and a relatively low viscosity, thereby being conducive to the cycle performance of the battery cell under low-temperature conditions.

The nonaqueous electrolyte solution formed by using the mutually coordinating compound A and compound B as a solvent in the secondary battery can not only significantly prolong the cycle life of the secondary battery at room temperature, but also significantly increase the capacity retention rate of the secondary battery discharged at low temperature and the longevity of the secondary battery cycled at low temperature.

In some embodiments, the compound A includes 1 to 3 fluorine-containing substituents, and optionally includes only 1 fluorine-containing substituent.

In the compound A, if the number of fluorine atoms in the substituent on the saturated five-membered ring or six-membered ring containing 1 or 2 oxygen atoms as ring atoms is excessive, the excessive fluorine atoms will impair the capability of the oxygen atoms in dissociating the lithium salt. In addition, even if the oxygen atoms can dissolve a part of the lithium salt, a high ionic conductivity is not definitely ensured in the case of excessive fluorine atoms, thereby possibly being severely detrimental to the low-temperature discharge performance. Therefore, the compound A includes 1 to 3 fluorine-containing substituents, and optionally includes only one fluorine atom and the fluorine atom does not directly substitute for an atom or group attached to the ring carbon atom adjacent to the oxygen atoms.

As used herein, the "fluorine-containing substituents" include fluorine atoms and fluorine-containing groups.

In some embodiments, in the compound A, substituents on the five-membered ring or the six-membered ring include hydrogen, fluorine, —R, —OR, and unsubstituted or —R- or —OR-substituted phenyl, where R represents a $C_1$ to $C_6$ alkyl or a $C_1$ to $C_6$ fluoroalkyl, optionally a $C_1$ to $C_4$ alkyl or a $C_1$ to $C_4$ fluoroalkyl, and further optionally methyl or fluoromethyl.

As used herein, "$C_1$ to $C_6$ alkyl" means an alkyl containing 1 to 6 carbon atoms, including but not limited to, methyl, ethyl, n-propyl, isopropyl, n-butyl, isobutyl, tert-butyl, pentyl, hexyl, and the like. The "$C_1$ to $C_4$ alkyl" is an alkyl containing 1 to 4 carbon atoms, including but not limited to, methyl, ethyl, n-propyl, isopropyl, n-butyl, isobutyl, and tert-butyl. The "$C_1$ to $C_6$ fluoroalkyl" may be monofluorinated, difluorinated, or polyfluorinated $C_1$ to $C_6$ alkyl, and optionally $C_1$ to $C_6$ monofluoroalkyl. The "$C_1$ to $C_4$ fluoroalkyl" may be monofluorinated, difluorinated, or polyfluorinated $C_1$ to $C_4$ alkyl, and optionally $C_1$ to $C_4$ monofluoroalkyl.

In the compound A, the substituent needs to avoid being excessively long, so as to ensure that the melting point, boiling point, and viscosity of the substituent are relatively low, and in turn, ensure the capacity release performance at low temperature. Therefore, optionally, R represents a $C_1$ to $C_4$ alkyl or a $C_1$ to $C_4$ fluoroalkyl, and further optionally methyl or fluoromethyl.

Optionally, the ring carbon atom connected to the oxygen atom is unsubstituted or substituted with one methyl group or one monofluoromethyl group.

In some embodiments, the compound A is represented by a chemical formula I:

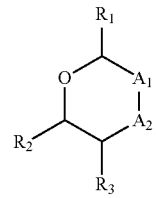

Formula I

In the formula above, $A_1$ represents oxygen, a direct bond, or $CHR_4$.

$A_2$ represents oxygen, a direct bond, or $CHR_5$.

$R_1$ and $R_2$ each independently represent hydrogen, —R, —OR, or unsubstituted or —R- or —OR-substituted phenyl.

$R_3$, $R_4$, and $R_5$ each independently represent hydrogen, fluorine, —R, —OR, or unsubstituted or —R- or —OR-substituted phenyl.

Each R represents a $C_1$ to $C_6$ alkyl or a $C_1$ to $C_6$ fluoroalkyl, optionally a $C_1$ to $C_4$ alkyl or a $C_1$ to $C_4$ fluoroalkyl, and further optionally methyl or fluoromethyl;

optionally, R, $R_1$, $R_2$, $R_3$, $R_4$, and $R_5$ each independently represent hydrogen, fluorine, methyl, monofluoromethyl, difluoromethyl, trifluoromethyl, monofluoromethoxyl, phenyl, methylphenyl, or methoxyphenyl, and $R_1$ and $R_2$ are not fluorine.

$A_1$ and $A_2$ are not both direct bonds and are not both oxygen.

When $A_1$ is oxygen, $R_5$ is not fluorine. When $A_2$ is oxygen, $R_3$ and Ra are not fluorine.

$R_1$, $R_2$, $R_3$, $R_4$, and $R_5$ include at least 1 fluorine-containing substituent in total, optionally include 1 to 3 fluorine-containing substituents in total, and further optionally include only 1 fluorine-containing substituent.

In some embodiments, the compound A includes the following compounds:

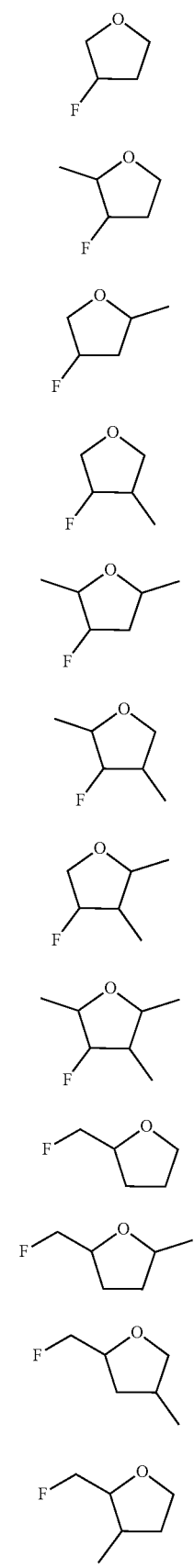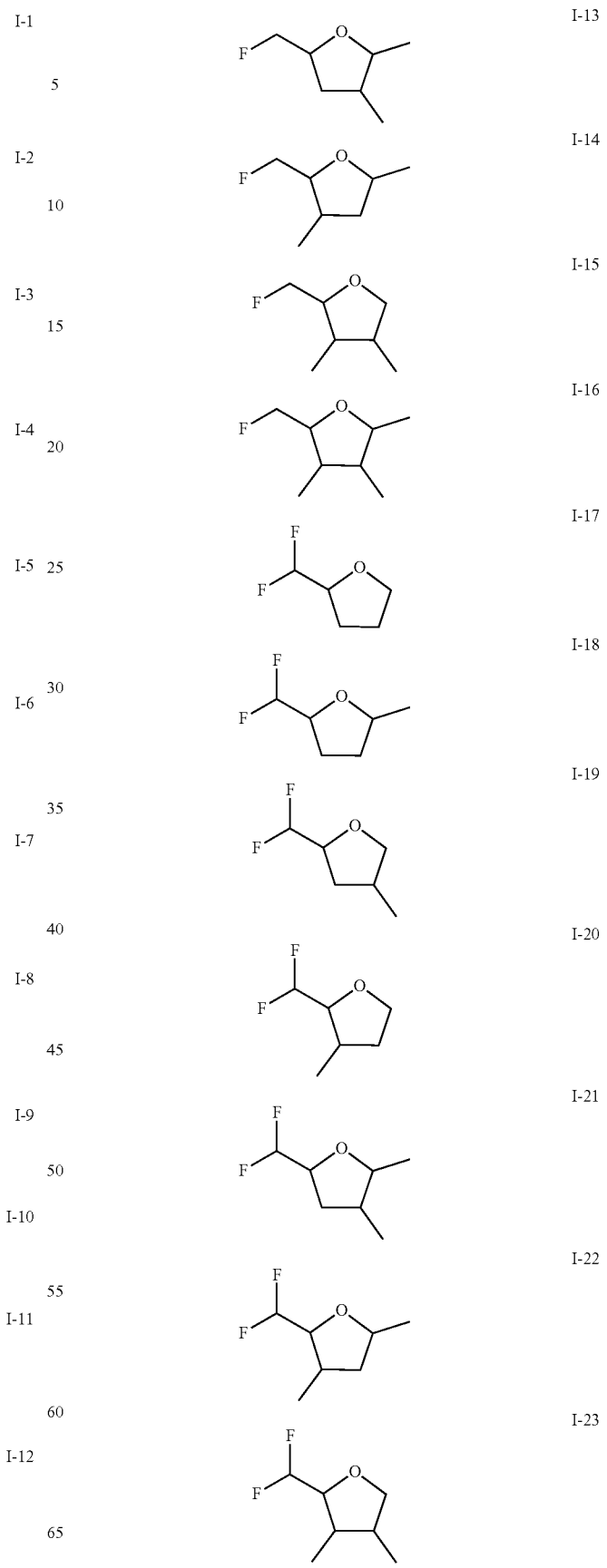

I-24 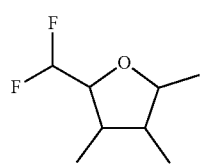
I-25 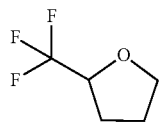
I-26 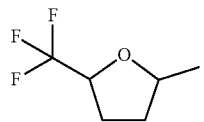
I-27 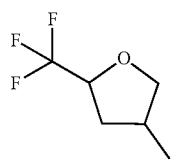
I-28 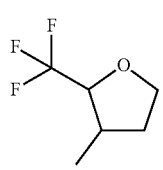
I-29 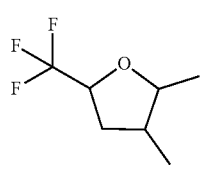
I-30 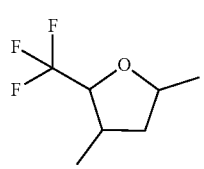
I-31 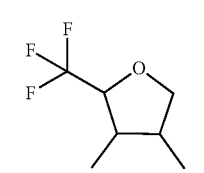
I-32 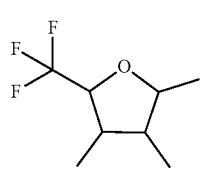
I-33 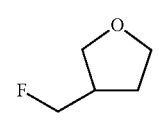
I-34 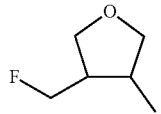
I-35 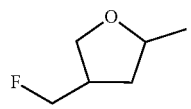
I-36 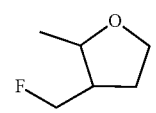
I-37 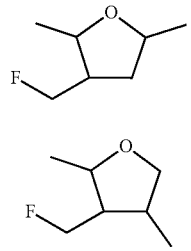
I-38 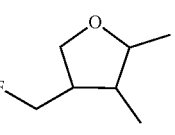
I-39 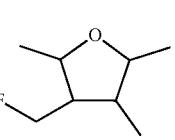
I-40 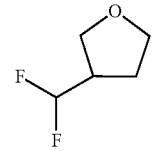
I-41 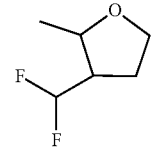
I-42 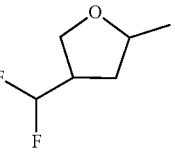
I-43 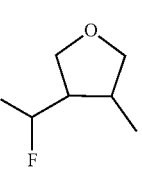
I-44

| | |
|---|---|
| 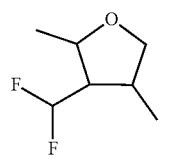 | I-45 |
| 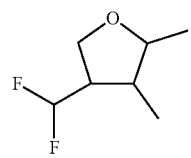 | I-46 |
| 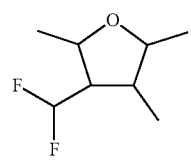 | I-47 |
| 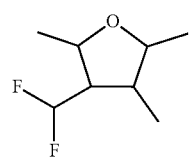 | I-48 |
| 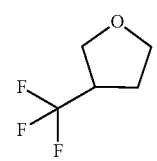 | I-49 |
| 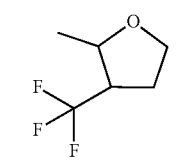 | I-50 |
| 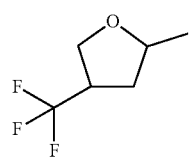 | I-51 |
| 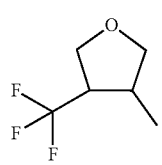 | I-52 |
| 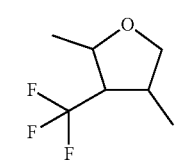 | I-53 |
| 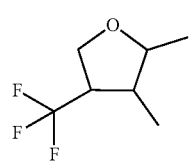 | I-54 |
| | |
|---|---|
| 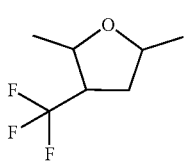 | I-55 |
| 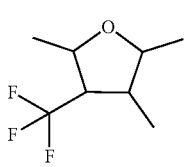 | I-56 |
| 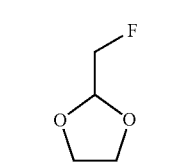 | I-57 |
| 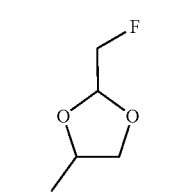 | I-58 |
| 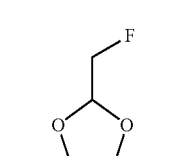 | I-59 |
| 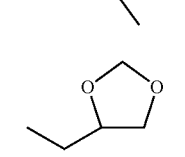 | I-60 |
| 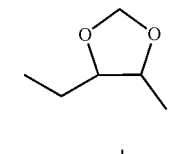 | I-61 |
| 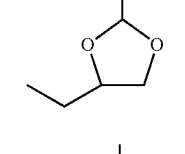 | I-62 |
| 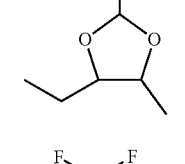 | I-63 |
| 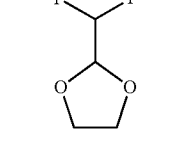 | I-64 |

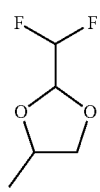 I-65
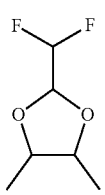 I-66
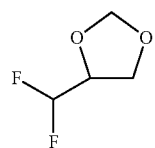 I-67
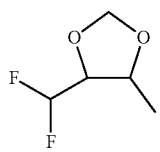 I-68
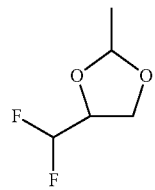 I-69
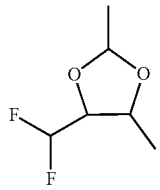 I-70
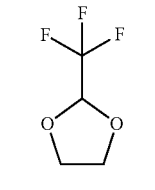 I-71
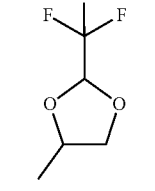 I-72
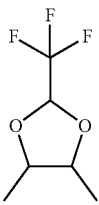 I-73
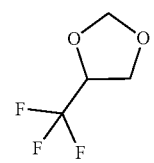 I-74
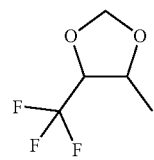 I-75
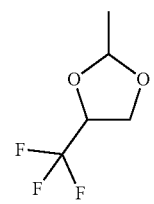 I-76
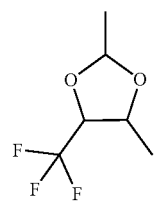 I-77
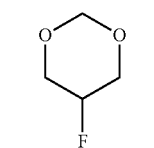 I-78
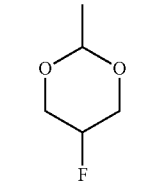 I-79
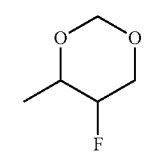 I-80
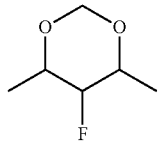 I-81

-continued
I-82
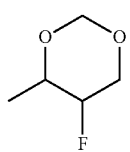
I-83
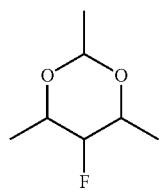
I-84
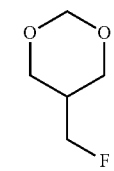
I-85
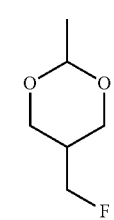
I-86
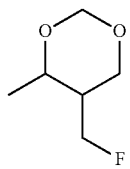
I-87
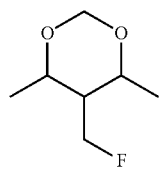
I-88
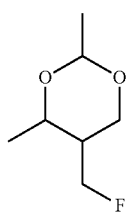
I-89
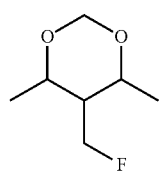
-continued
I-90
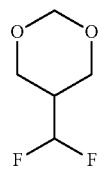
I-91
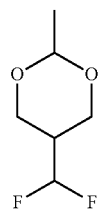
I-92
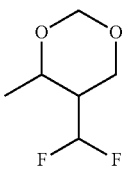
I-93
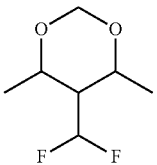
I-94
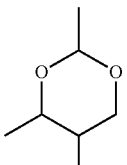
I-95
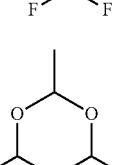
I-96
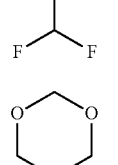
I-97
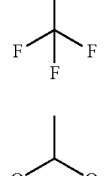
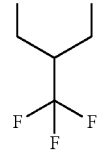

| | |
|---|---|
| 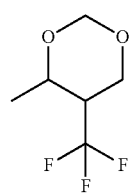 I-98 | 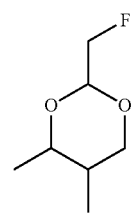 I-105 |
| 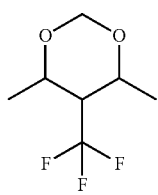 I-99 | 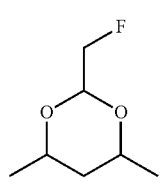 I-106 |
| 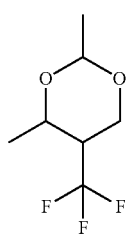 I-100 | 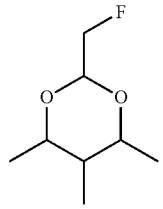 I-107 |
| 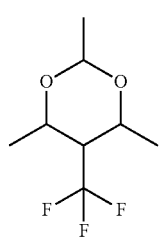 I-101 | 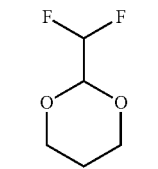 I-108 |
| 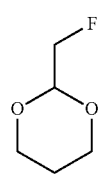 I-102 | 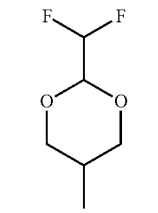 I-109 |
| 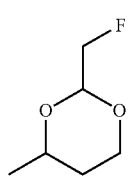 I-103 | 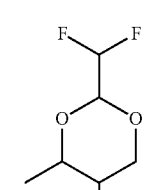 I-110 |
| 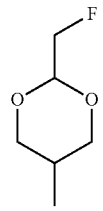 I-104 | 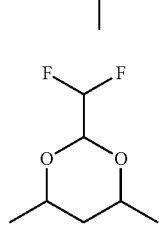 I-111 |
| | I-112 |

I-113 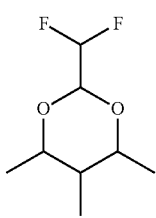
I-114 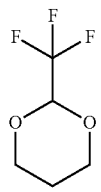
I-115 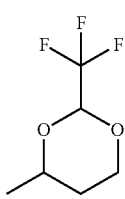
I-116 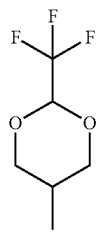
I-117 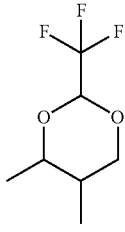
I-118 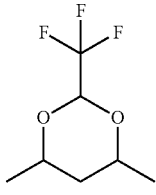
I-119 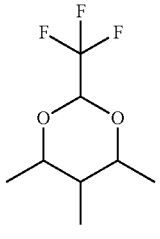
I-120 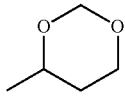
I-121 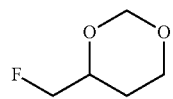
I-122 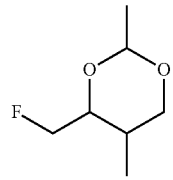
I-123 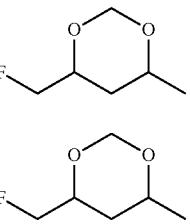
I-124 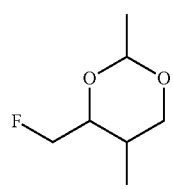
I-125 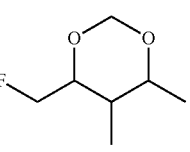
I-126 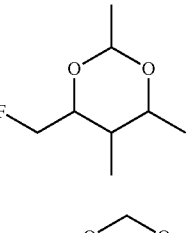
I-127 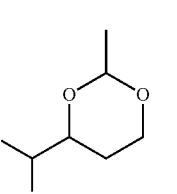
I-128 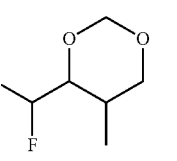
I-129 
I-130

I-131 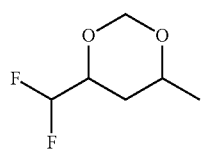
I-132 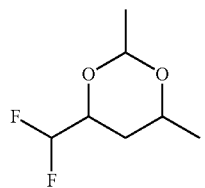
I-133 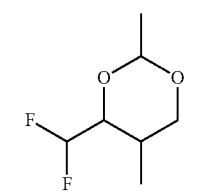
I-134 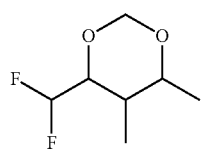
I-135 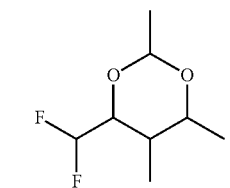
I-136 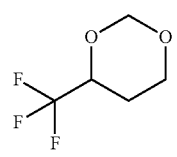
I-137 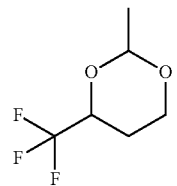
I-138 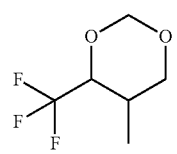
I-139 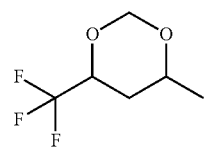
I-140 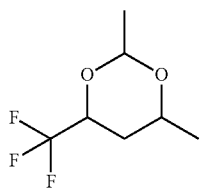
I-141 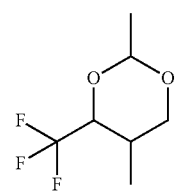
I-142 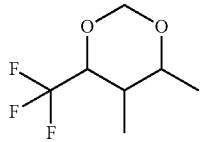
I-143 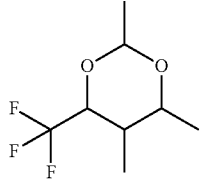
I-144 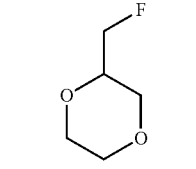
I-145 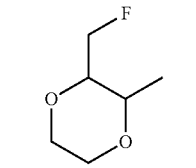
I-146 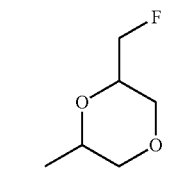
I-147 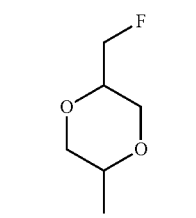

| 101 -continued | | 102 -continued | |
|---|---|---|---|
| 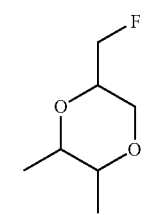 | I-148 | 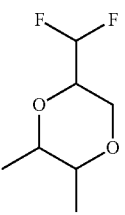 | I-156 |
| 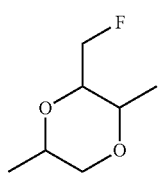 | I-149 | 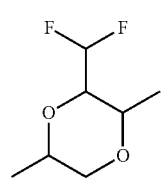 | I-157 |
| 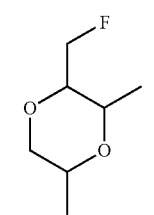 | I-150 | 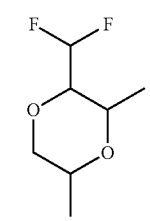 | I-158 |
| 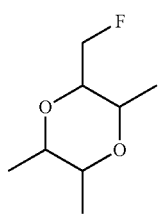 | I-151 | 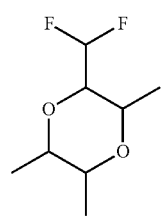 | I-159 |
| 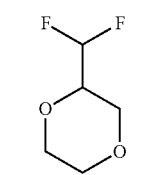 | I-152 | 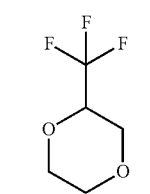 | I-160 |
| 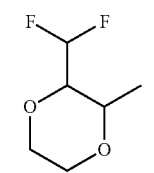 | I-153 | 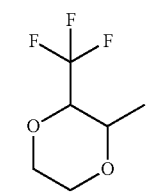 | I-161 |
| 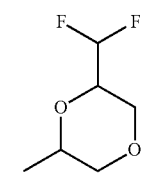 | I-154 | 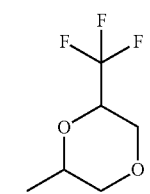 | I-162 |
| 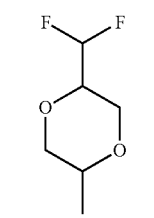 | I-155 | | |

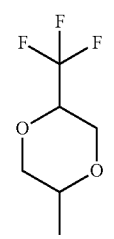
I-163
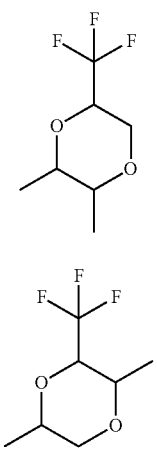
I-164
I-165
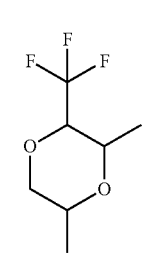
I-166
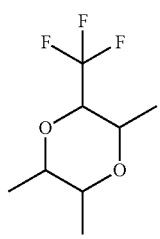
I-167
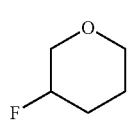
I-168
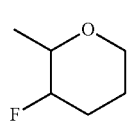
I-169
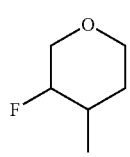
I-170
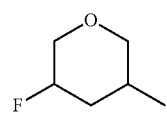
I-171
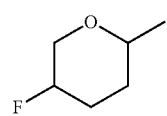
I-172
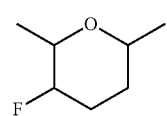
I-173
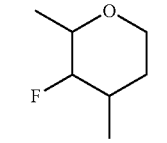
I-174
I-175
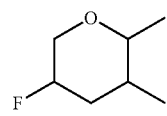
I-176
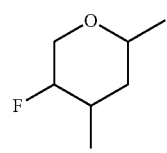
I-177
I-178
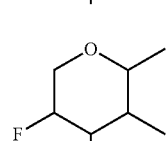
I-179
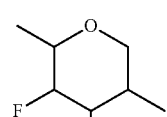
I-180
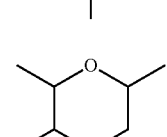
I-181
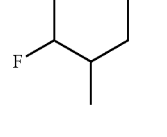

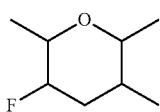
I-182
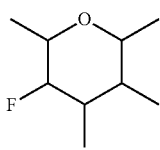
I-183
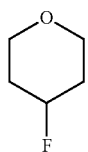
I-184
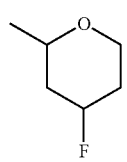
I-185
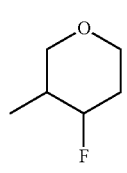
I-186
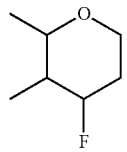
I-187
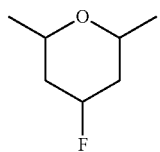
I-188
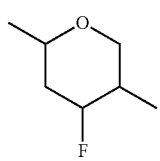
I-189
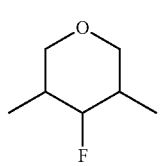
I-190
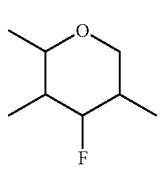
I-191
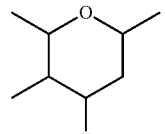
I-192
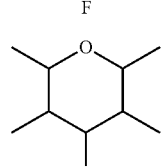
I-193
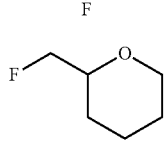
I-194
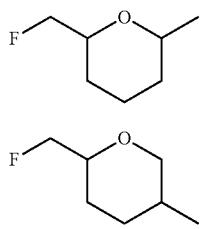
I-195
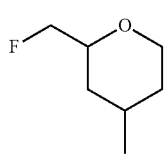
I-196
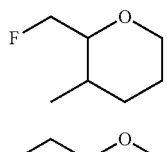
I-197
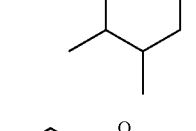
I-198
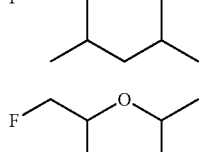
I-199
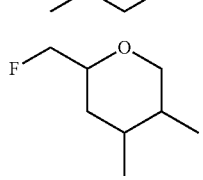
I-200
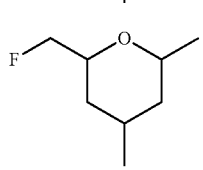
I-201
I-202
I-203

| | |
|---|---|
| 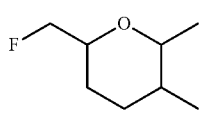 | I-204 |
| 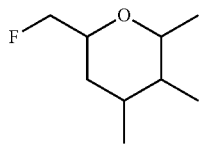 | I-205 |
| 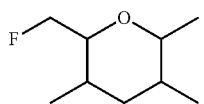 | I-206 |
| 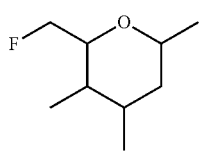 | I-207 |
| 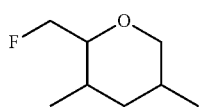 | I-208 |
| 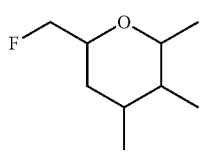 | I-209 |
| 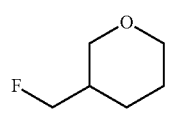 | I-210 |
| 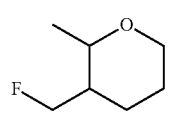 | I-211 |
| 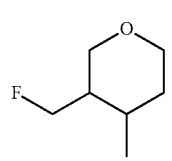 | I-212 |
| 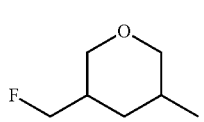 | I-213 |
| 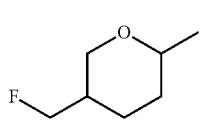 | I-214 |
| 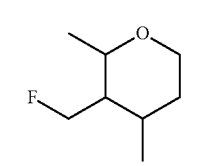 | I-215 |
| | |
|---|---|
| 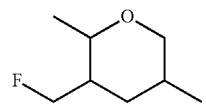 | I-216 |
| 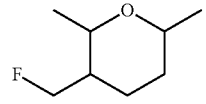 | I-217 |
| 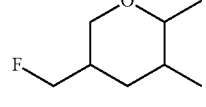 | I-218 |
| 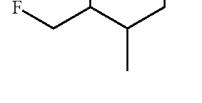 | I-219 |
| 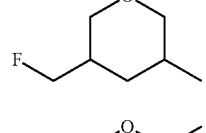 | I-220 |
| 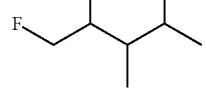 | I-221 |
| 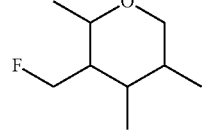 | I-222 |
| 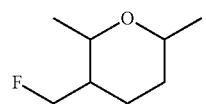 | I-223 |
| 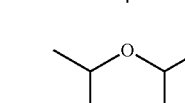 | I-224 |
| 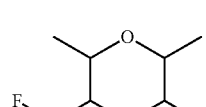 | I-225 |
| 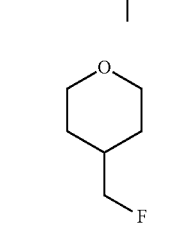 | I-226 |

I-227 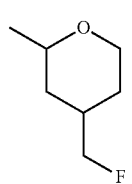

I-228 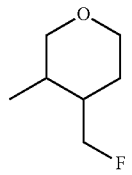

I-229 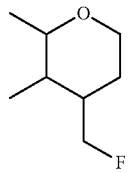

I-230 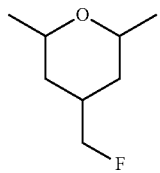

I-231 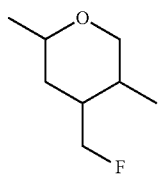

I-232 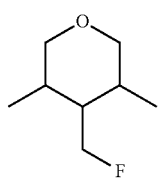

I-233 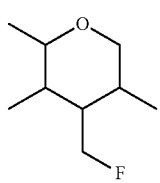

I-234 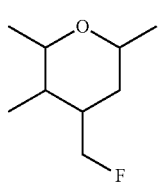

I-235 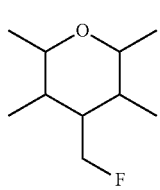

I-236 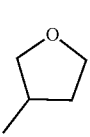

I-237 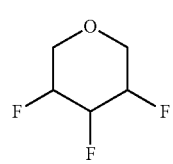

I-238 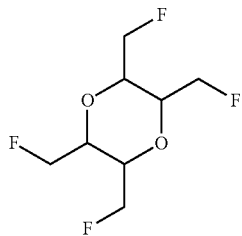

I-239 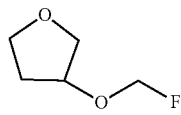

I-240 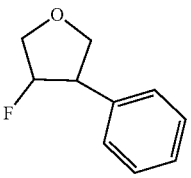

I-241 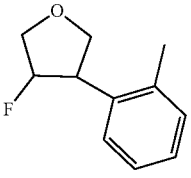

I-242 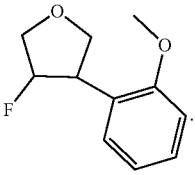

Optionally, the compound A includes compounds I-1, I-57, I-78, I-144, and I-184.

The compound A is optionally the above compounds because such components optimally contribute to both excellent oxidation resistance and the lithium salt dissociation ability that facilitates release of capacity at low temperature.

In some embodiments, the compound B is represented by a chemical formula II:

Formula II

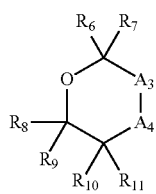

In the formula above, $A_3$ represents oxygen, a direct bond, or $CR_{12}R_{13}$.

$A_4$ represents oxygen, a direct bond, or $CR_{14}R_{15}$.

$A_3$ and $A_4$ are not both oxygen and are not both direct bonds.

$R_6$, $R_7$, $R_8$, $R_9$, $R_{10}$, $R_{11}$, $R_{12}$, $R_{13}$, $R_{14}$, and $R_{15}$ each independently represent hydrogen, fluorine, $C_1$ to $C_5$ alkyl, or $C_1$ to $C_5$ fluoroalkyl, and optionally hydrogen, fluorine, or methyl.

At least one of $R_6$, $R_7$, $R_8$, or $R_9$ is fluorine. Optionally, at least one of $R_6$ or $R_7$ is fluorine and at least one of $R_8$ or $R_9$ is fluorine. Further optionally, $R_6$, $R_7$, $R_8$, and $R_9$ are all fluorine.

The "$C_1$ to $C_5$ alkyl" is an alkyl containing 1 to 5 carbon atoms, including but not limited to, methyl, ethyl, n-propyl, isopropyl, n-butyl, isobutyl, tert-butyl, pentyl, and the like. Optionally, the $C_1$ to $C_5$ alkyl may be methyl or ethyl. The $C_1$ to $C_5$ fluoroalkyl may be monofluorinated, difluorinated, or polyfluorinated $C_1$ to $C_5$ alkyl.

In the compound B, when the substituent is alkyl or fluoroalkyl, the alkyl chain needs to avoid being excessively long. If the alkyl chain is excessively long, the viscosity of the compound will increase and impair the low-temperature performance. Therefore, optionally, the number of carbon atoms in the substituent in compound B is less than or equal to 1.

In some embodiments, the compound B includes the following compounds:

II-1
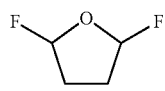

II-2
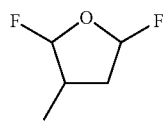

II-3
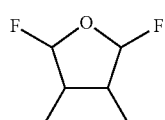

II-4
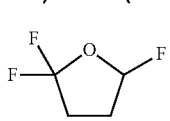

II-5
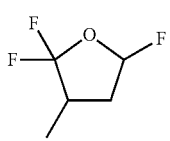

II-6
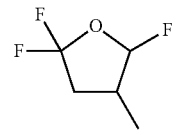

II-7
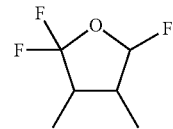

II-8
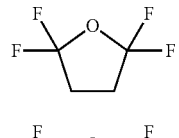

II-9
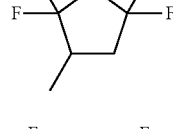

II-10
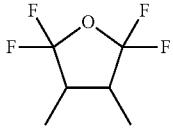

II-11
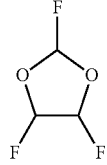

II-12
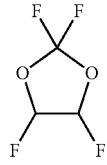

II-13
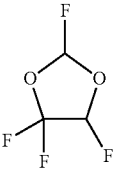

II-14
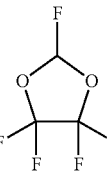

II-15
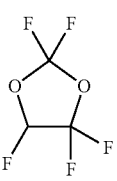

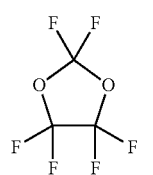
II-16
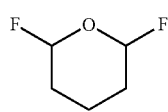
II-17
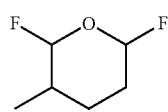
II-18
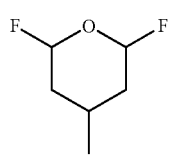
II-19
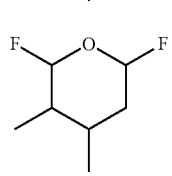
II-20
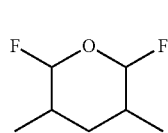
II-21
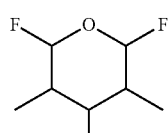
II-22
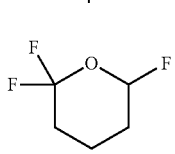
II-23
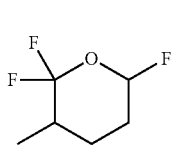
II-24
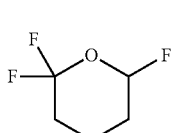
II-25
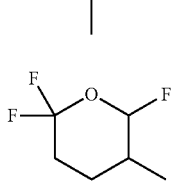
II-26
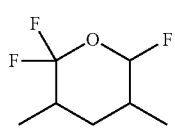
II-27
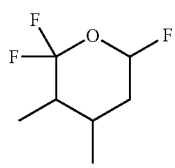
II-28
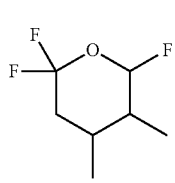
II-29
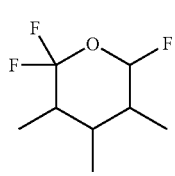
II-30
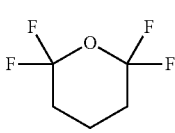
II-31
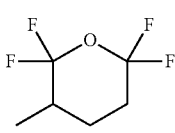
II-32
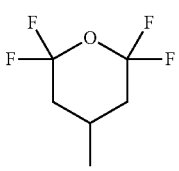
II-33
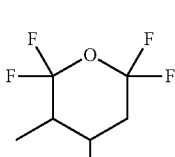
II-34
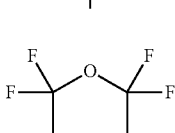
II-35
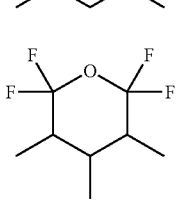
II-36

-continued
II-37
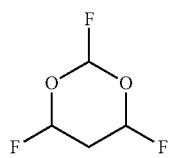
II-38
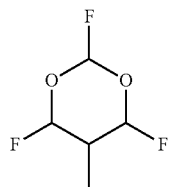
II-39
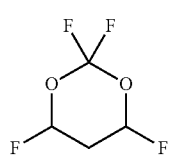
II-40
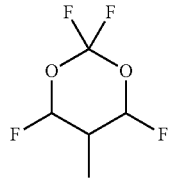
II-41
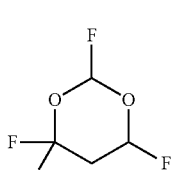
II-42
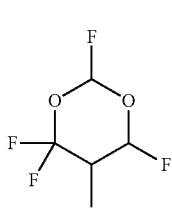
II-43
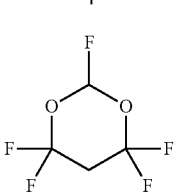
II-44
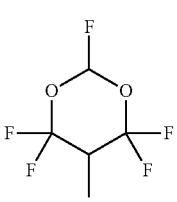
II-45
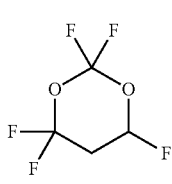
-continued
II-46
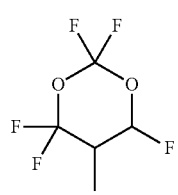
II-47
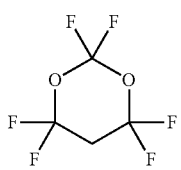
II-48
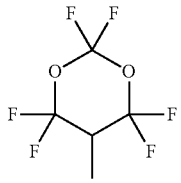
II-49
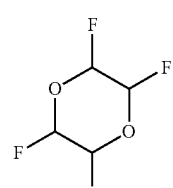
II-50
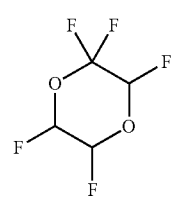
II-51
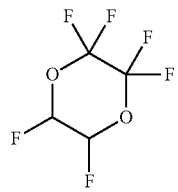
II-52
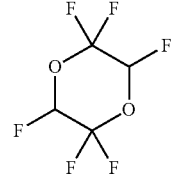
II-53
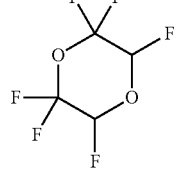

II-54

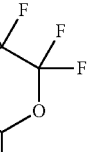

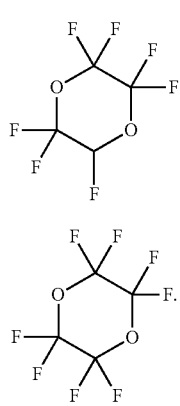

II-55

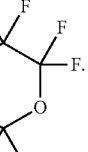

Optionally, the compound B includes compounds II-8, II-9, II-10, II-16, II-31, II-32, II-33, II-34, II-35, II-36, II-47, II-48, and II-55.

Compound B is optionally the above compounds because all the hydrogen atoms on the alpha carbon adjacent to the ring oxygen atom in a ring of such components are replaced by fluorine atoms. Theoretically, it is fundamentally impossible for such components to undergo oxidative decomposition. Therefore, such components can significantly promote the stability of the electrolyte solution. In addition, the molecular structure of such components is relatively small, thereby being conducive to maintaining a low viscosity of the electrolyte solution at low temperature.

In some embodiments, a mass ratio of the compound A to the compound B in the nonaqueous electrolyte solution ranges from 0.20 to 6.00, optionally 0.20 to 5.00, further optionally 0.40 to 2.50, and still further optionally 0.80 to 1.25.

For example, a volume ratio of the compound A to the compound B may be 0.20, 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, 5.00, 5.05, 5.10, 5.15, 5.20, 5.25, 5.30, 5.35, 5.40, 5.45, 5.50, 5.55, 5.60, 5.65, 5.70, 5.75, 5.80, 5.85, 5.90, 5.95, or 6.00.

If the mass percent of the compound A is excessively high, the oxidation resistance of the nonaqueous electrolyte solution will be slightly reduced, thereby being detrimental cycle stability. If the mass percent of the compound B is excessively high, the solubility of the lithium salt in the mixed solvent will be reduced, thereby being detrimental to ion transport and cycle stability.

In some embodiments, the nonaqueous electrolyte solution further includes one or more salts containing an alkali metal or an alkaline earth metal, and optionally includes one or more lithium salts. Further optionally, the lithium salt includes lithium bis(fluorosulfonyl)imide (LiFSI), lithium hexafluorophosphate (LiPF$_6$), lithium tetrafluoroborate (LiBF$_4$), lithium hexafluoroarsenate (LiAsF$_6$), lithium bis(trifluoromethanesulfonyl)imide (LiTFSI), lithium trifluoromethanesulfonate (LiOTF), lithium difluorophosphate (LiDFP), lithium dioxalatoborate (LiBOB), lithium difluoro (oxalato) borate (LiDFOB), lithium difluorobis(oxalato) phosphate, lithium tetrafluoro (oxalato)phosphate, or a combination thereof. Still further optionally, the lithium salt is lithium bis(fluorosulfonyl)imide.

The above lithium salt, optionally lithium bis(fluorosulfonyl)imide, can decompose on the surface of the negative electrode to form a solid electrolyte interface (SEI) film constituent rich in inorganic fluorine, thereby being conducive to the long-term cycling capability of the secondary battery. Moreover, the lithium salt is of relatively high dissociation ability, and contributes to a relatively high ionic conductivity of electrolyte solution and a relatively low viscosity of the electrolyte solution, thereby enhancing the capability of releasing the capacity under low-temperature conditions.

In some embodiments, a concentration range of a lithium salt in the nonaqueous electrolyte solution is 0.3 to 6 mol/L, optionally 0.5 to 5 mol/L, further optionally 1.0 to 3.0 mol/L, and still further optionally 1.5 to 2.5 mol/L.

For example, the concentration of the lithium salt in the nonaqueous electrolyte solution may be 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 mol/L.

By controlling the concentration of the lithium salt in the nonaqueous electrolyte solution to fall within the above range, the concentration is neither so high as to decrease the ionic conductivity and increase the viscosity nor so low as to affect the stability of the electrolyte solution to the positive and negative electrodes, and at the same time, contributes to long-term cycle performance and low-temperature performance of the secondary battery.

In order to improve the safety performance of the secondary battery, a flame-retardant additive containing a phosphate ester group may be added into the nonaqueous electrolyte solution. It is found that a chain alkoxy group added into the phosphate ester not only increases the boiling point of the resultant molecule, but also improves the compatibility of the resultant molecule due to gain of some physical and chemical properties of the chain alkoxy. Therefore, this application further provides an additive C. The molecule of the additive C includes a phosphate ester group and an alkoxy chain. The additive C boils at a relatively high boiling point and is of relatively high compatibility. When added to the electrolyte solution system, the additive C can reduce the exothermic value and spontaneous combustion rate of the battery, thereby improving the safety performance of the battery without causing an adverse effect onto the battery life. However, if the alkoxy chain is excessively long, the molecular viscosity may increase, thereby being detrimental to the conductivity of the nonaqueous electrolyte solution. Therefore, according to this application, the alkoxy chain in the molecule of the additive C needs to avoid being excessively long. The total number of carbon atoms of all alkoxy groups in each alkoxy chain is preferably 1 to 20, and optionally 1 to 6. With the increase in the length of the chain and in the number of the alkoxy groups, the compatibility of the additive C is higher, and the boiling point of the additive C is higher, but the viscosity is increased, and in turn, the ionic conductivity is decreased, thereby impairing the cycle performance of the battery. Therefore, the total number of carbon atoms in the alkoxy chain is optionally not more than 6.

Therefore, in some embodiments, the nonaqueous electrolyte solution further includes an additive C containing a phosphate ester group and an alkoxy chain. A total number of carbon atoms in each alkoxy chain falls within a range of 1 to 20, and optionally 1 to 6.

In this application, the alkoxy chain is an alkoxy-containing chain hydrocarbon group in which an atom or group is substitutable with fluorine.

The additive C provided in this application produces an excellent flame retardant effect. Moreover, in the molecule of the additive C, the alkoxy group is an ethoxy group, and the substitutive fluorine atom is located only at the terminal of the molecule of the additive but not attached to the carbon atom directly adjacent to the oxygen atom, thereby making it convenient to complex lithium ions in the lithium salt, and facilitating the lithium salt to dissolve to form a homogeneous solution. In addition, the viscosity is not high, thereby improving the thermal stability of the lithium salt in the electrolyte solution, and improving the safety performance of the battery during thermal shock. Moreover, after being fluorinated, the additive C is more excellent in flame retardance.

Therefore, in some embodiments, a molecule of an additive C includes a phosphate ester group and at least one of the following groups: a $C_1$ to $C_4$ alkyl, a $C_1$ to $C_4$ fluoroalkyl, a $C_1$ to $C_4$ ethoxyalkyl ether, a $C_1$ to $C_4$ ethoxy ethoxyalkyl ether, a $C_1$ to $C_4$ ethoxy fluoroalkyl ether, or a $C_1$ to $C_4$ ethoxy-ethoxy fluoroalkyl ether, where the fluoro in the $C_1$ to $C_4$ fluoroalkyl means monofluoro, difluoro, or trifluoro substitution by one, two, or three fluorine atoms, respectively, located at a terminal of a molecule of the additive C and not attached to a carbon atom directly adjacent to an oxygen atom.

In this application, the $C_1$ to $C_4$ alkyl may be methyl, ethyl, isopropyl, n-propyl, n-butyl, tert-butyl, isobutyl, optionally methyl or ethyl, and further optionally methyl. The $C_1$ to $C_4$ fluoroalkyl is optionally $C_1$ to $C_4$ monofluoroalkyl, difluoroalkyl, or trifluoroalkyl, and further optionally monofluoromethyl, difluoromethyl, or trifluoromethyl.

In some embodiments, the additive C is represented by a chemical formula III:

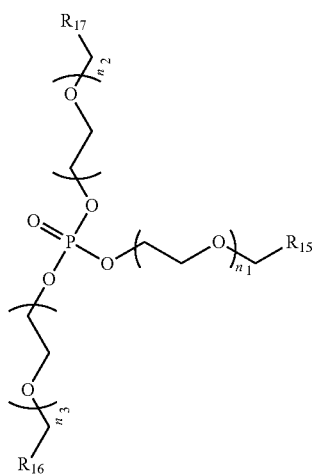

III

In the formula above, $n_1$, $n_2$, and $n_3$ represent 0, 1, and 2 respectively, and $n_1$, $n_2$, and $n_3$ are not all 0.

$R_{16}$, $R_{17}$ and $R_{18}$ each independently represent hydrogen, $C_1$ to $C_4$ alkyl, $C_1$ to $C_4$ monofluoroalkyl, $C_1$ to $C_4$ difluoroalkyl, or $C_1$ to $C_4$ trifluoroalkyl, where the fluoro in the $C_1$ to $C_4$ monofluoroalkyl, the $C_1$ to $C_4$ difluoroalkyl, or the $C_1$ to $C_4$ trifluoroalkyl means fluorine substitution by one, two, or three fluorine atoms, respectively, located at a terminal of a molecule of the additive C; and optionally, the $C_1$ to $C_4$ alkyl is methyl or ethyl.

Optionally, $R_{16}$, $R_{17}$, and $R_{18}$ each independently represent —CH$_2$CH$_2$OCH$_2$CH$_2$OCH$_3$, —CH$_2$CH$_2$OCH$_2$CH$_2$OCH$_2$CH$_3$, —CH$_2$CH$_2$OCH$_2$CH$_2$OCH$_2$CF$_3$, —CH$_3$, —CH$_2$CH$_3$, —CH$_2$CH$_2$OCH$_2$CH$_2$OCH$_2$CHF$_2$, —CH$_2$CH$_2$OCH$_2$CH$_2$OCH$_2$F, —CH$_2$CF$_3$, —CH$_2$CH$_2$F, —CH$_2$CHF$_2$, —CH$_2$CH$_2$OCH$_3$, —CH$_2$CH$_2$OCH$_2$CH$_3$, —CH$_2$CH$_2$OCH$_2$CH$_2$F, —CH$_2$CH$_2$OCH$_2$CHF$_2$, or —CH$_2$CH$_2$OCH$_2$CF$_3$.

In some embodiments, the additive C includes the following compounds:

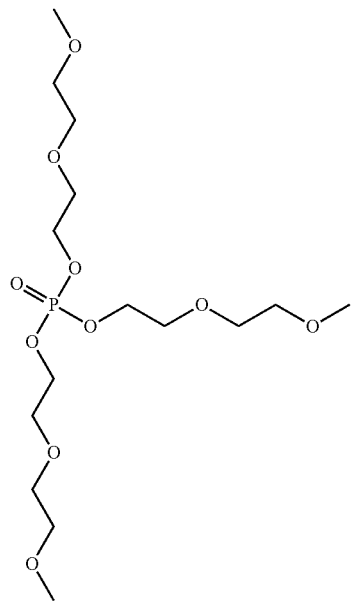

III-1

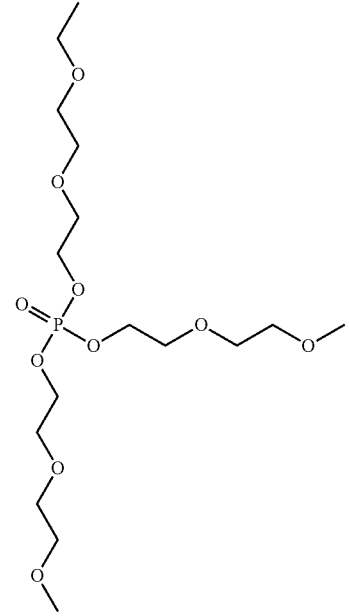

III-2

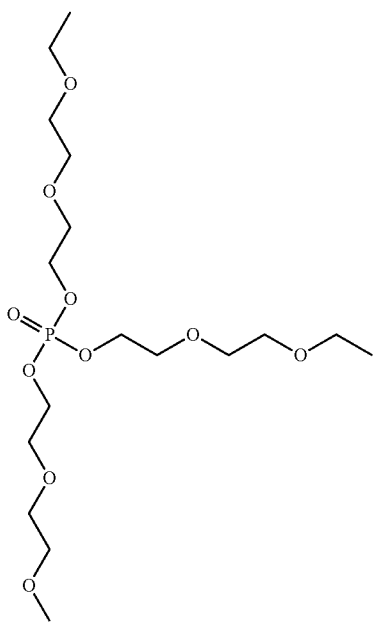
III-3
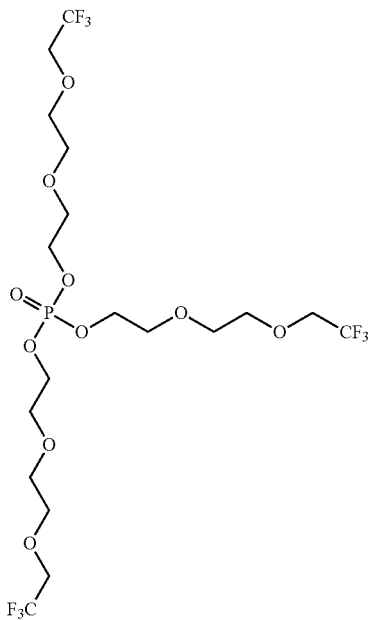
III-5
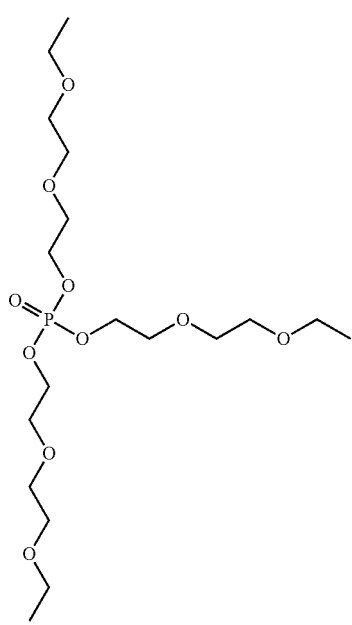
III-4
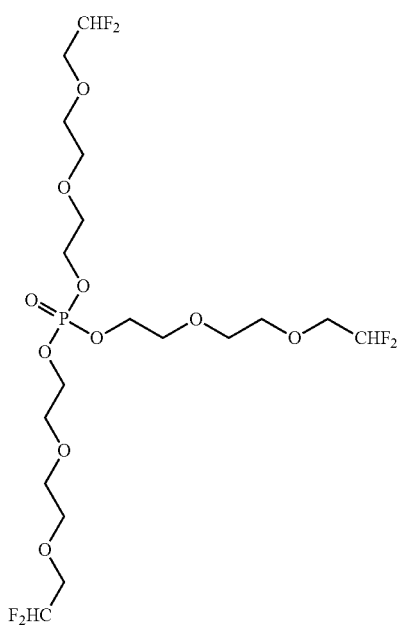
III-6

III-7
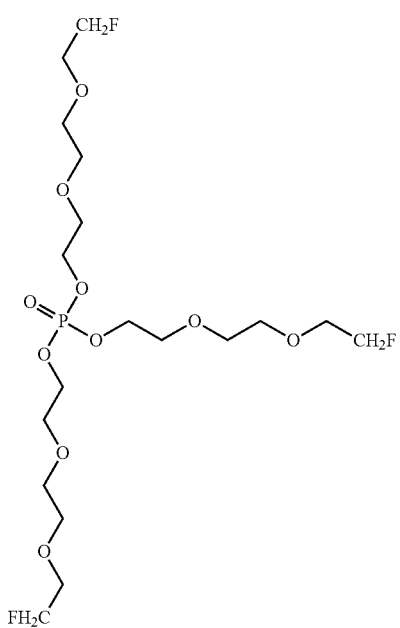
III-9
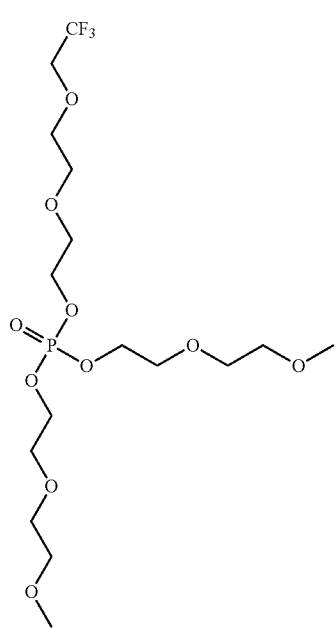
III-8
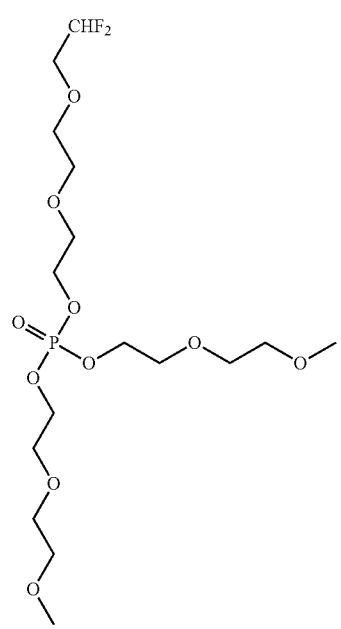
III-10
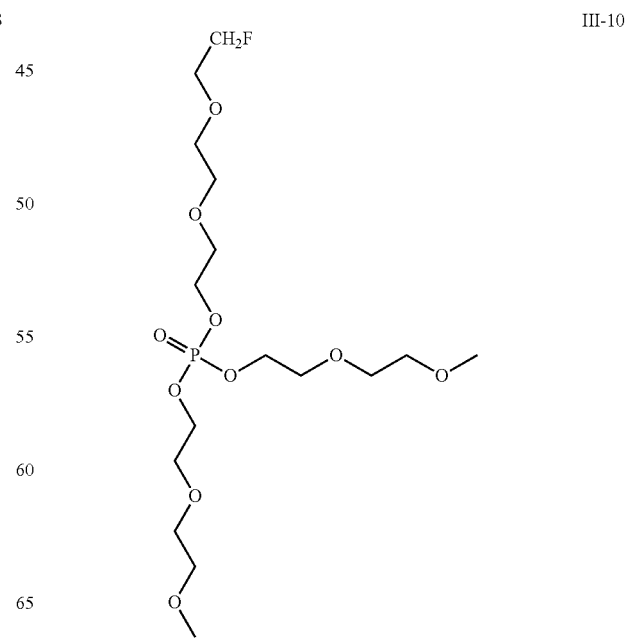

III-11
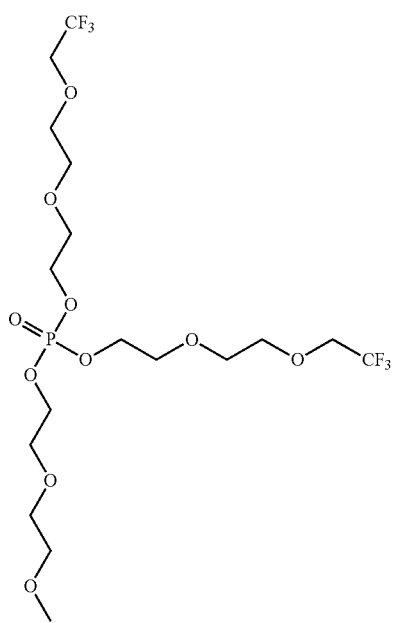
III-12
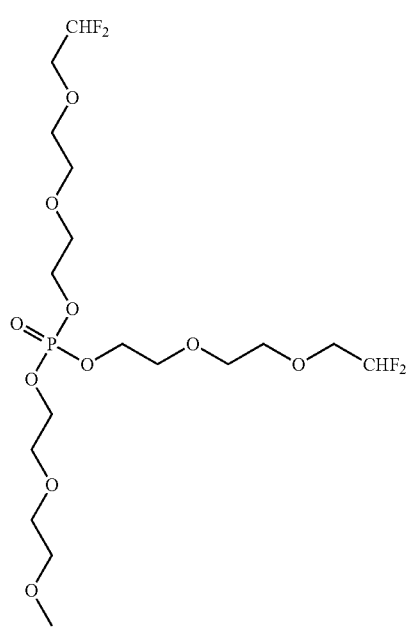
III-13
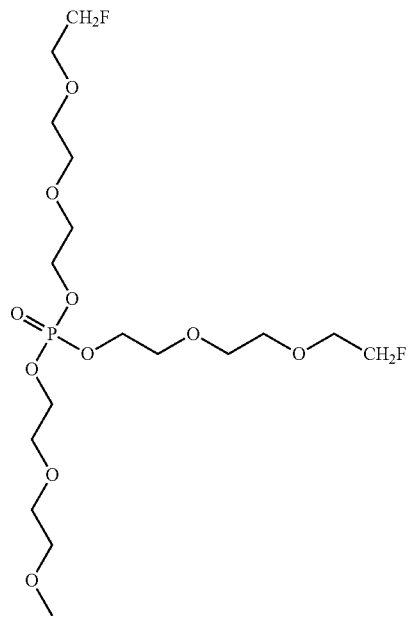
III-14
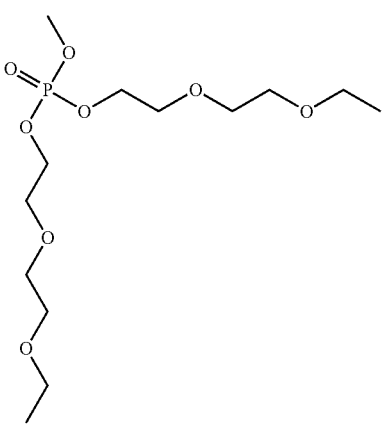
III-15

III-16
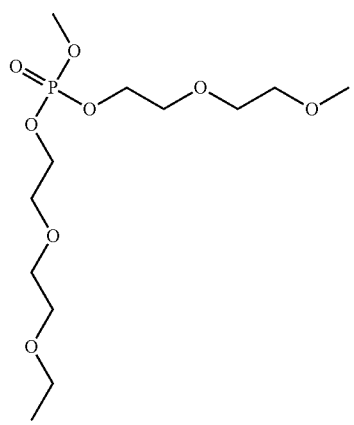
III-17
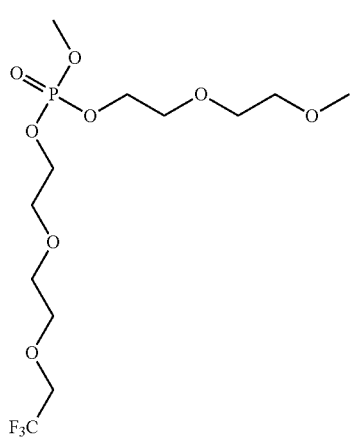
III-18
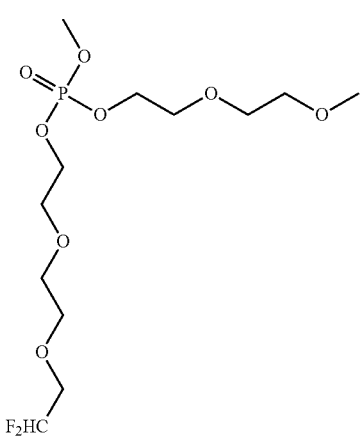
III-19
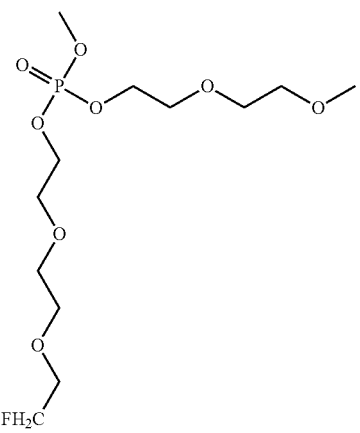
III-20
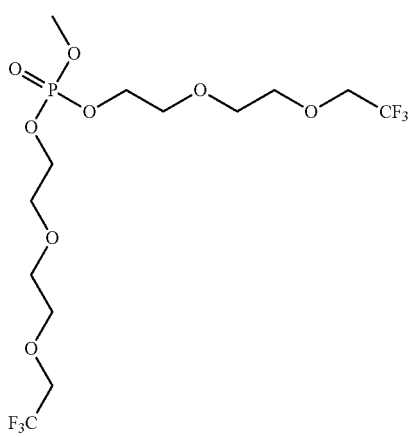
III-21
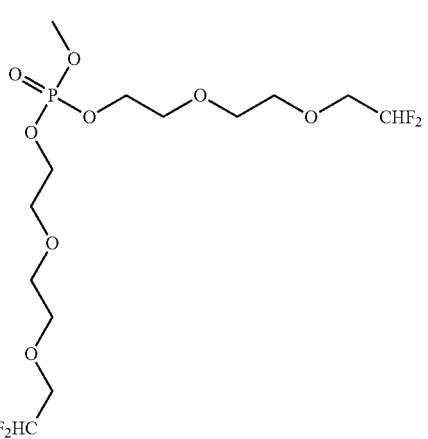

III-22
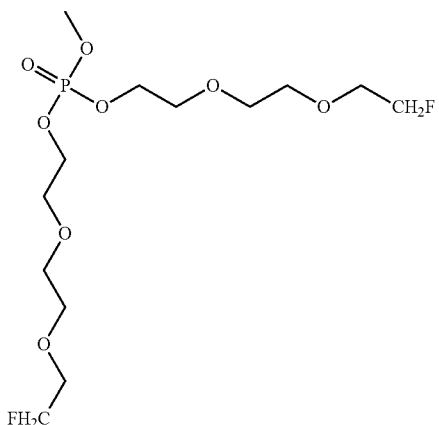
III-23
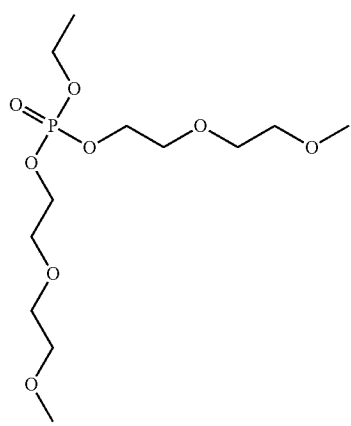
III-24
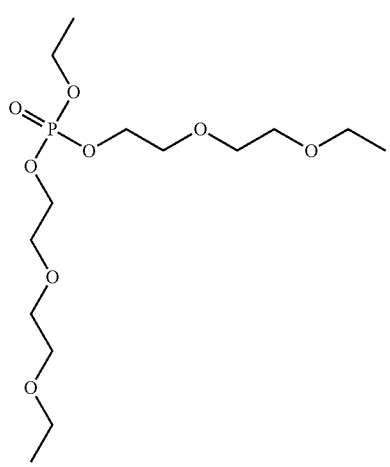
III-25
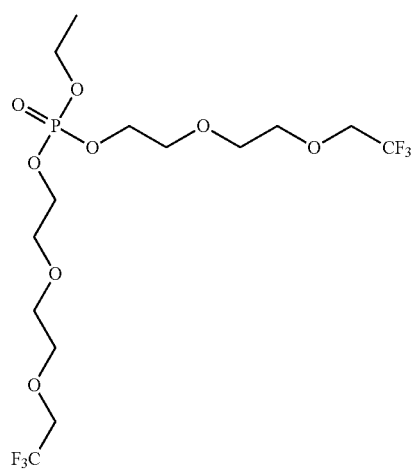
III-26
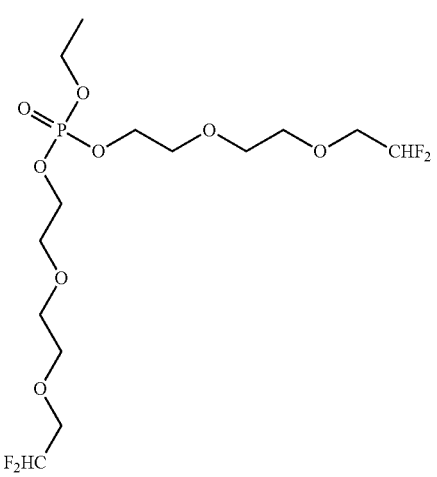
III-27
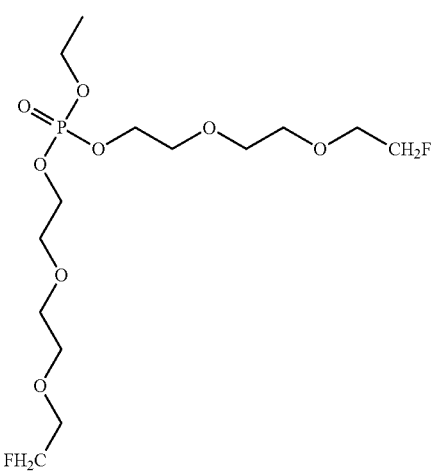

III-28
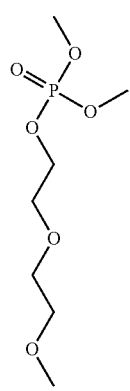
III-31
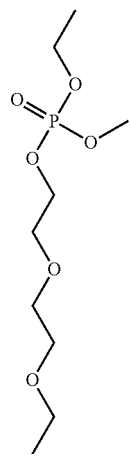
III-29
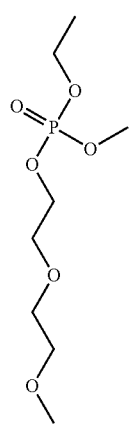
III-32
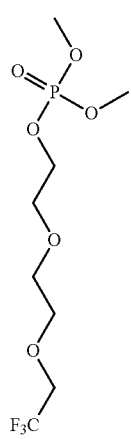
III-30
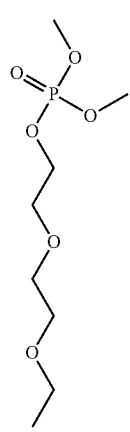
III-33
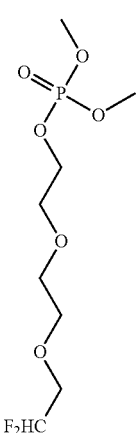

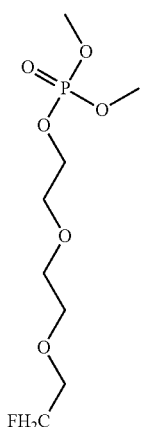
III-34
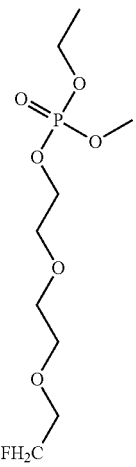
III-37
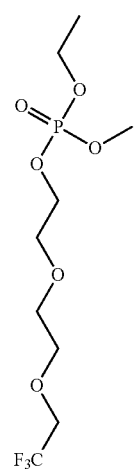
III-35
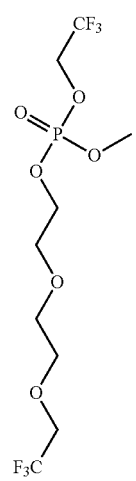
III-38
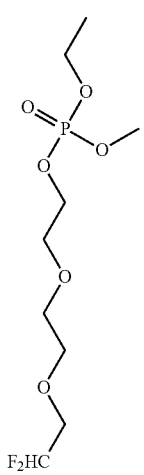
III-36
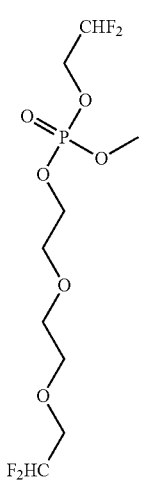
III-39

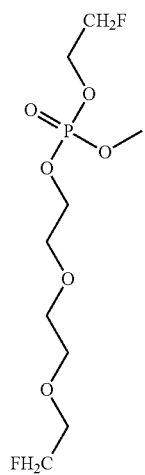
III-40
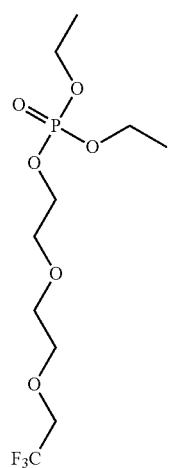
III-41
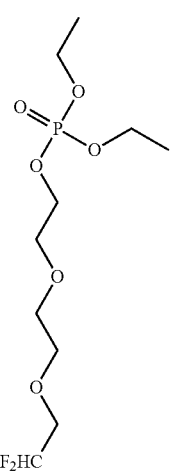
III-42
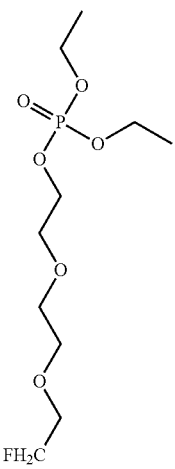
III-43
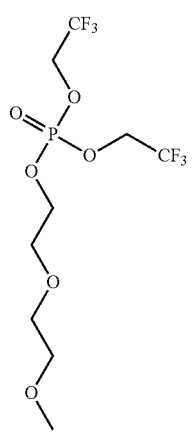
III-44
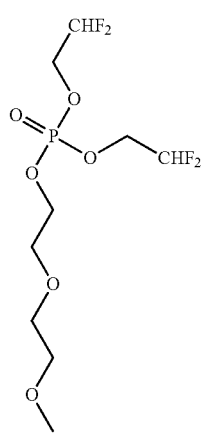
III-45

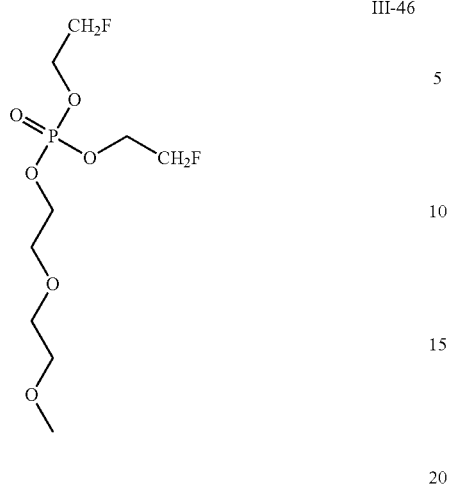
III-46
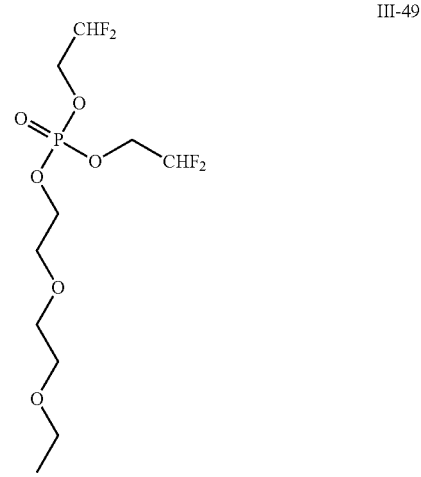
III-49
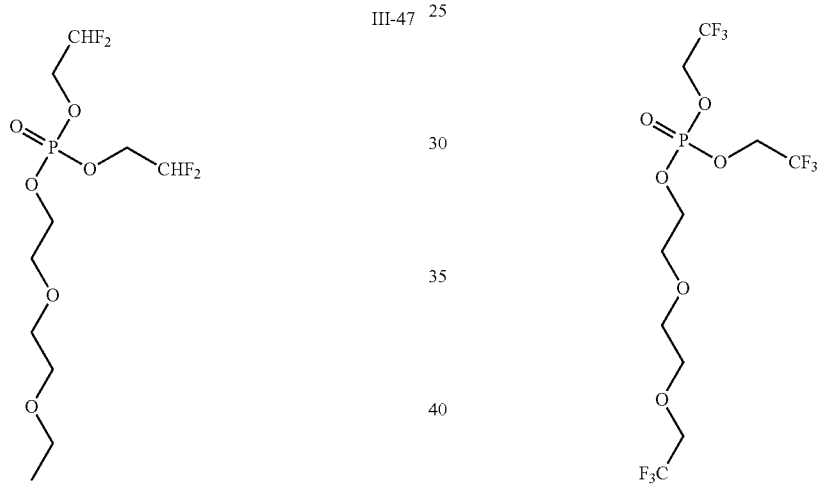
III-47
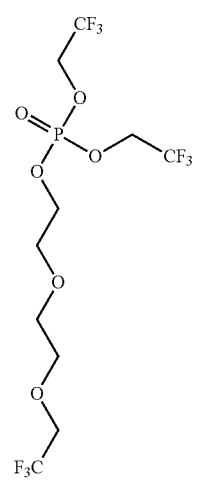
III-50
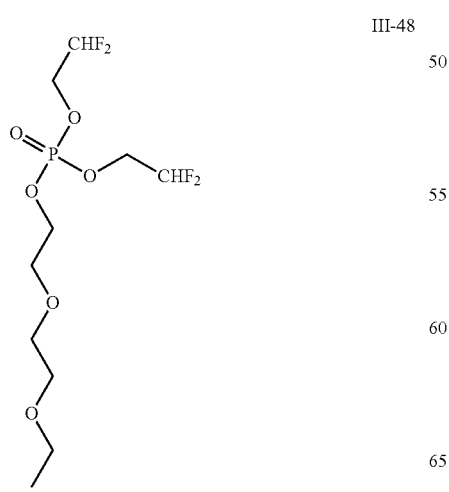
III-48
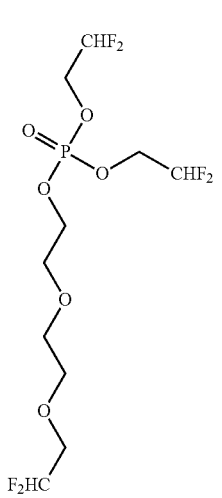
III-51

-continued
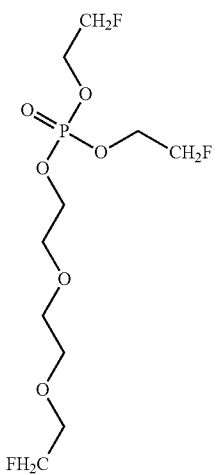
III-52
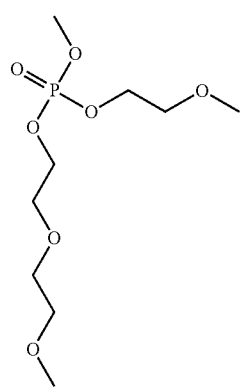
III-53
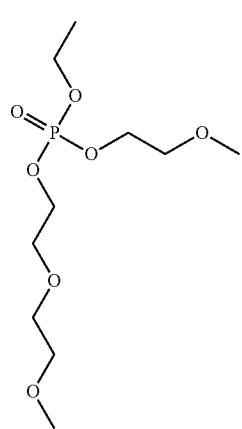
III-54
-continued
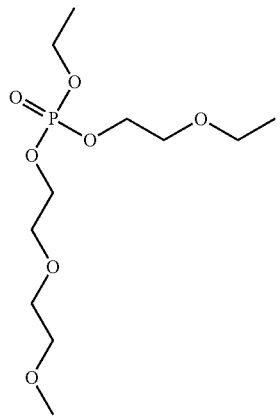
III-55
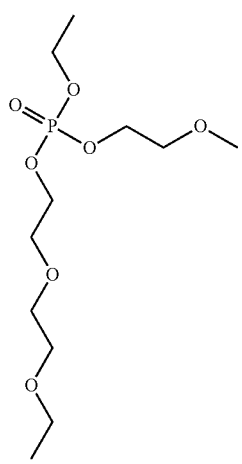
III-56
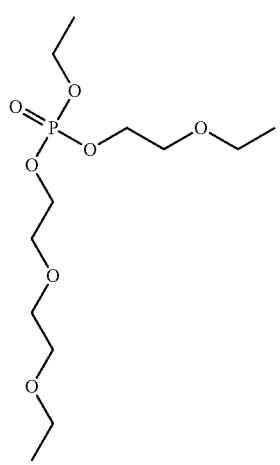
III-57

III-58
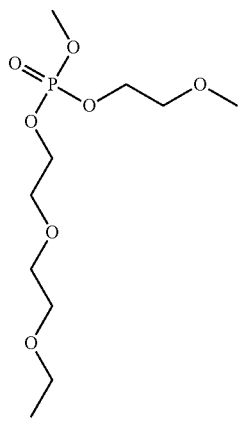
III-59
III-60
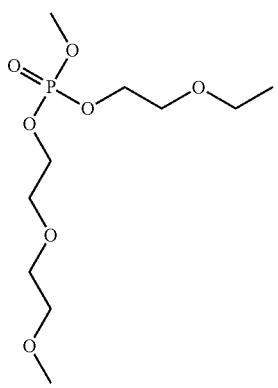
III-61
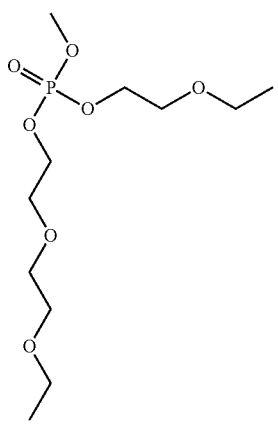
III-62
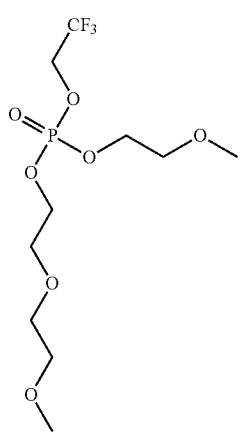
III-63
III-64
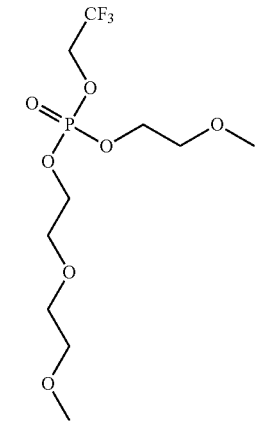

III-65
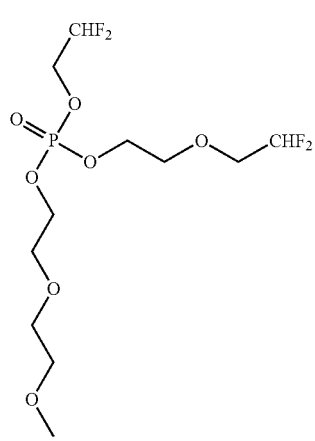
III-68
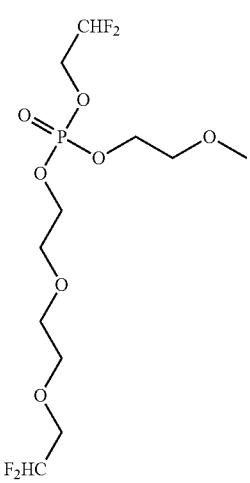
III-66
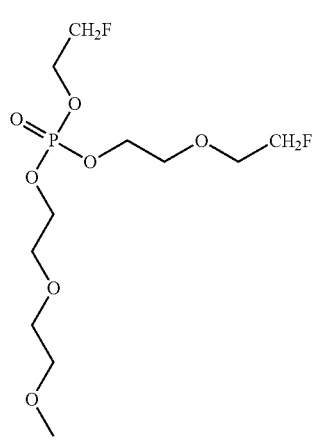
III-69
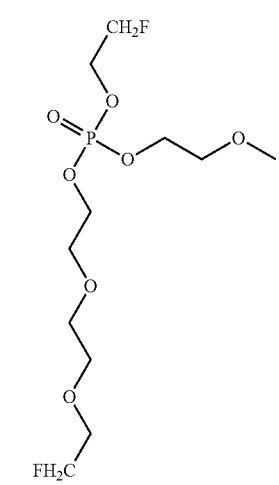
III-67
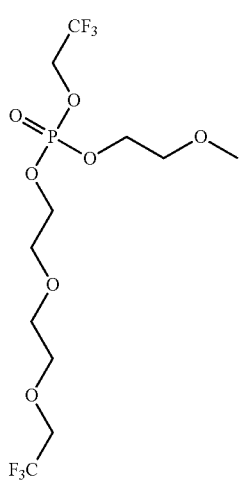
III-70
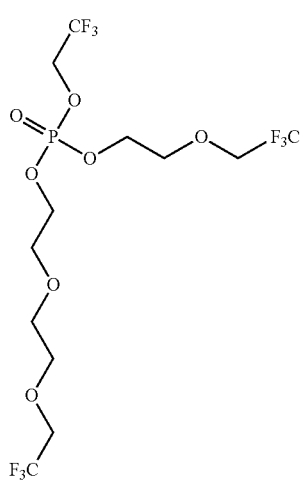

III-71
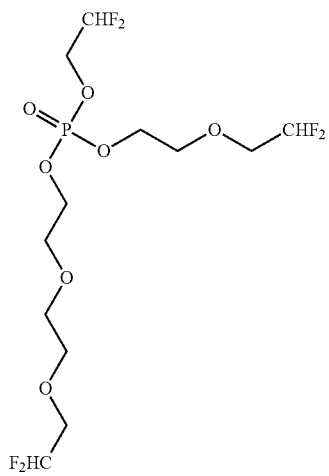
III-72
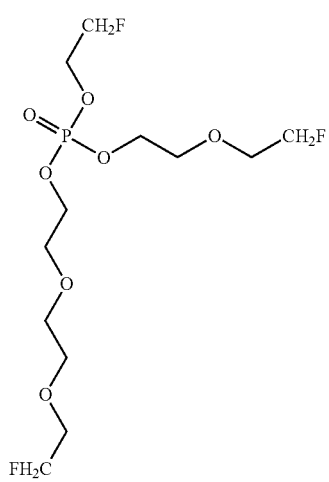
III-73
III-74
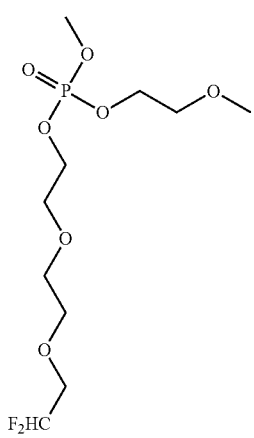
III-75
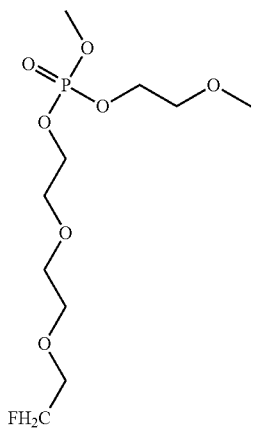
III-76
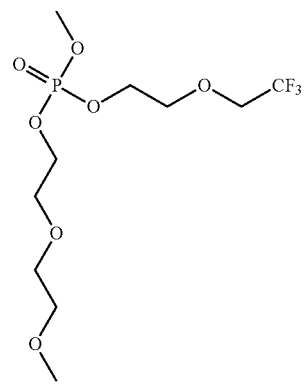
III-77
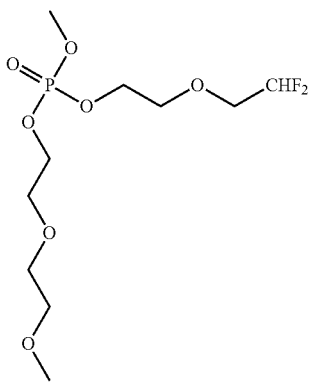

III-78
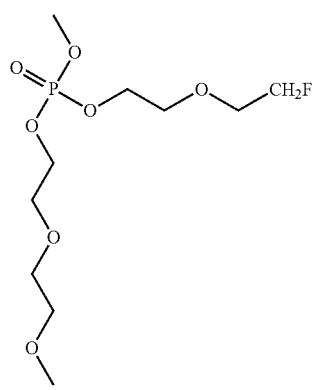
III-79
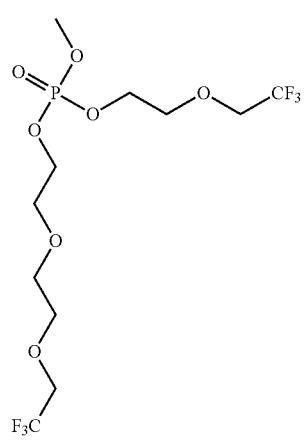
III-80
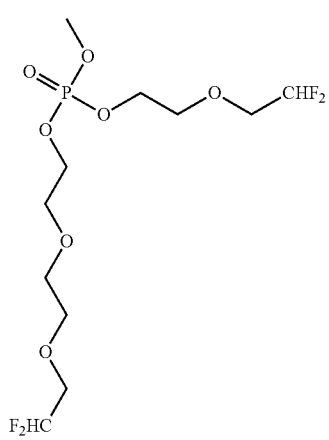
III-81
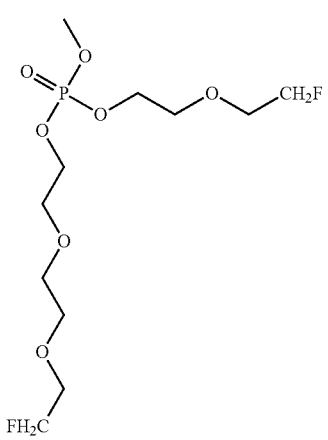
III-82
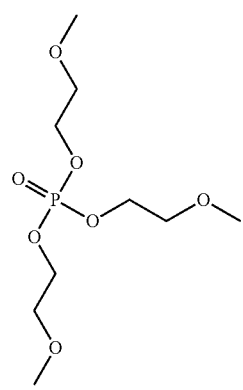
III-83
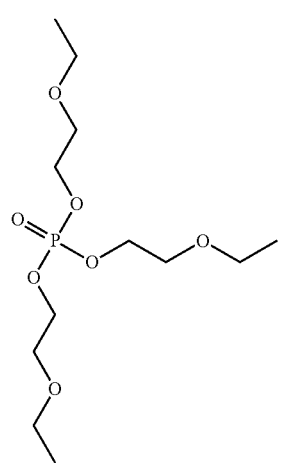

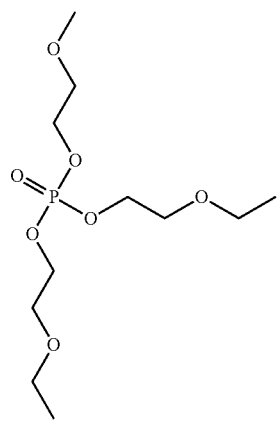
III-84
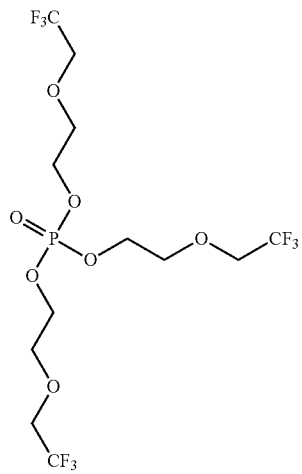
III-87
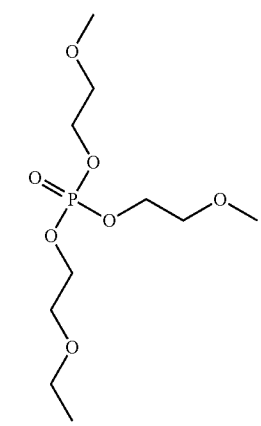
III-85
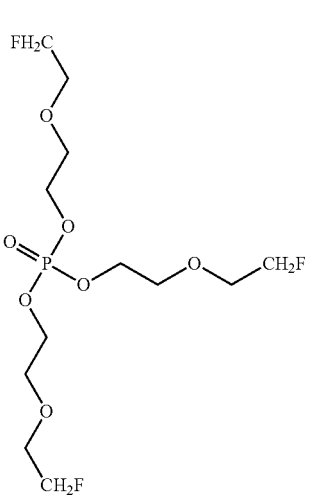
III-88
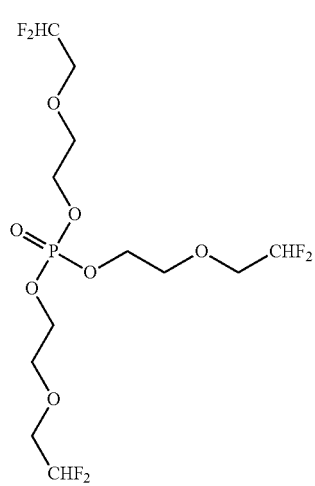
III-86
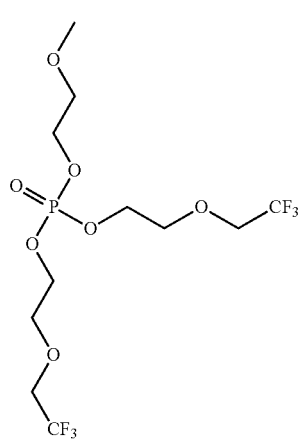
III-89

III-90
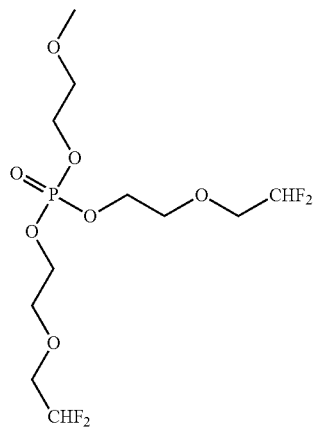
III-91
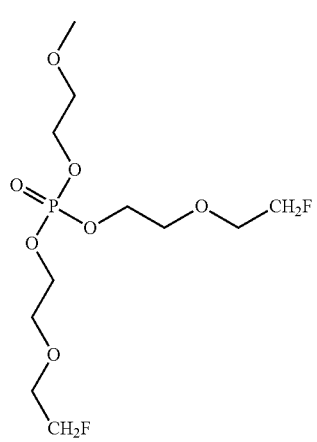
III-92
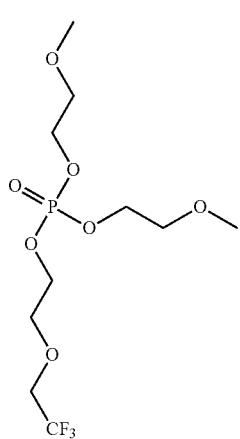
III-93
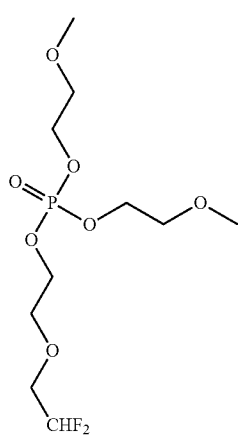
III-94
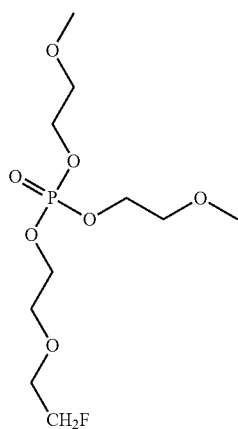
III-95
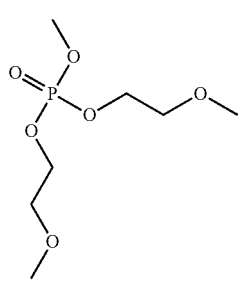
III-96
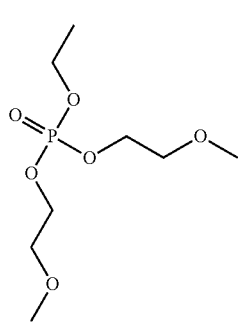

III-97
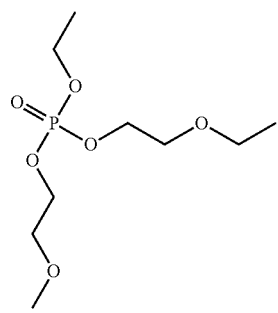
III-98
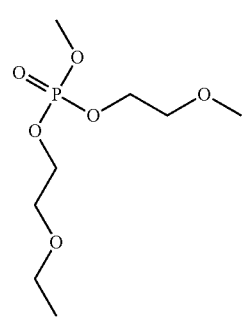
III-99
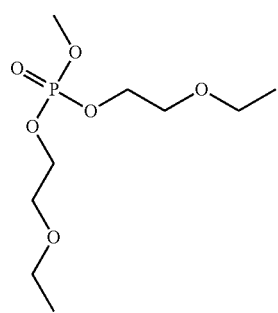
III-100
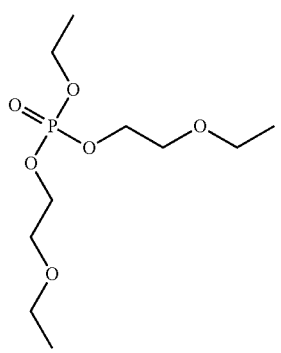
III-101
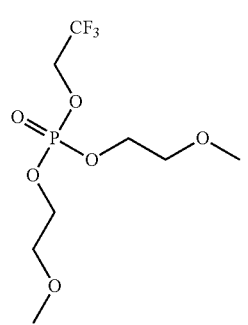
III-102
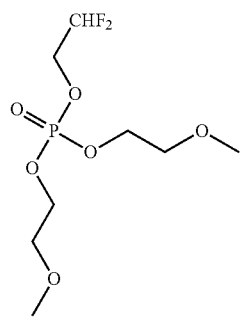
III-103
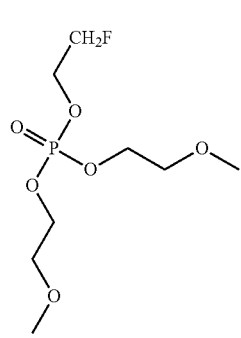
III-104
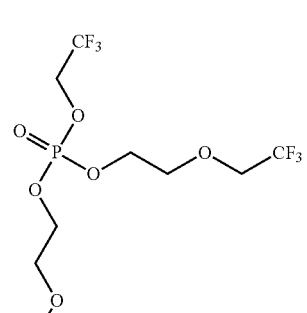
III-105
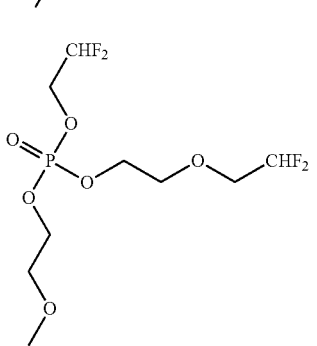
III-106
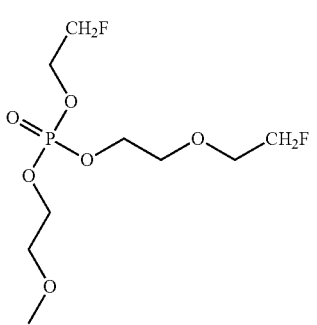

III-107
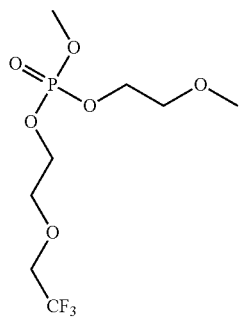
III-108
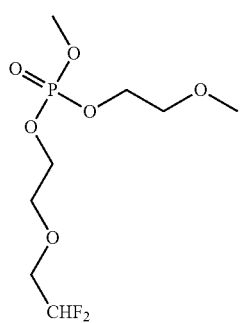
III-109
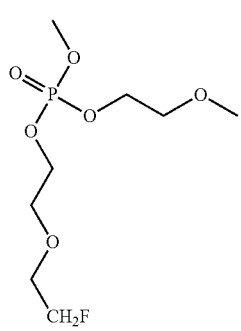
III-110
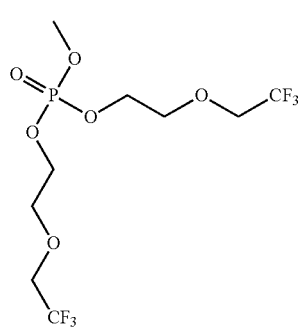
III-111
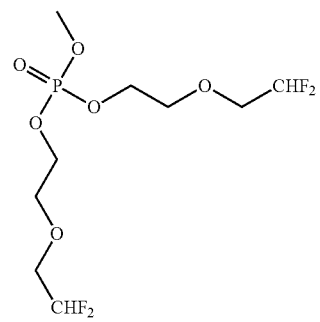
III-112
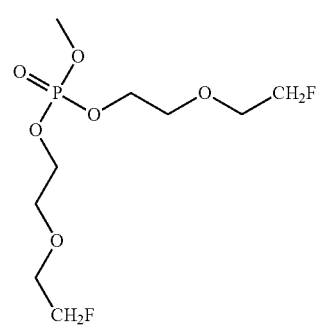
III-113
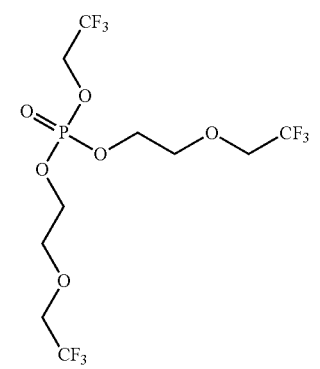
III-114
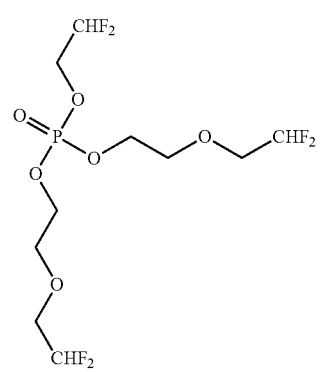

| | |
|---|---|
| 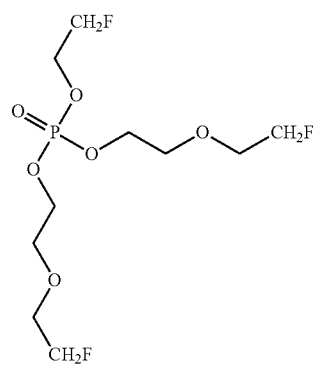 III-115 | 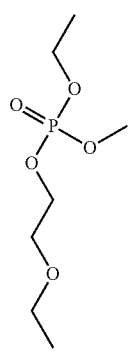 III-120 |
| 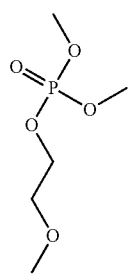 III-116 | 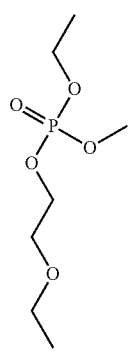 III-121 |
| 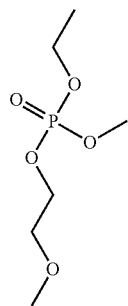 III-117 | 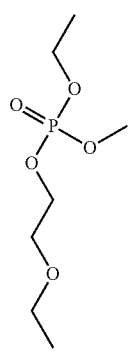 III-122 |
| 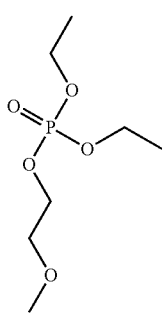 III-118 | 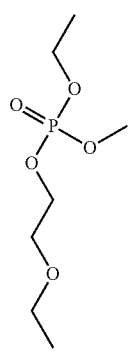 III-123 |
| 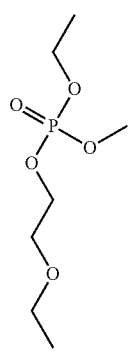 III-119 | 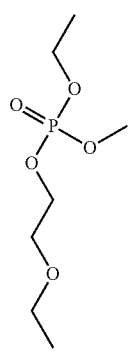 III-124 |

III-125 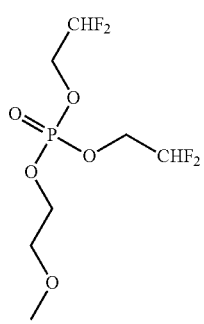

III-126 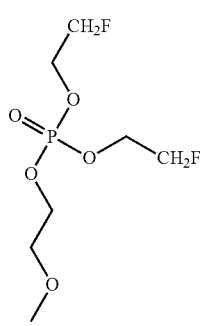

III-127 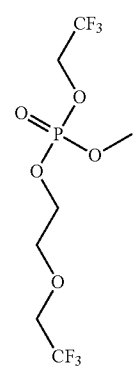

III-128 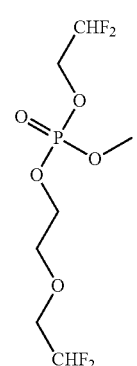

III-129 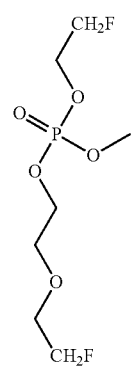

III-130 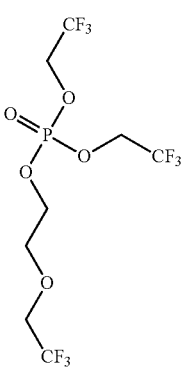

III-131 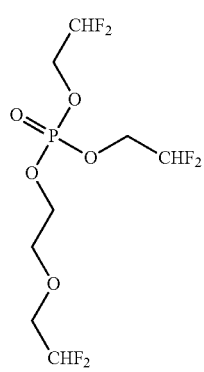

III-132 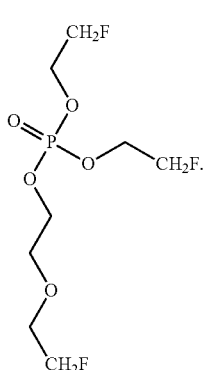

Optionally, the additive C includes III-20 and III-86.

The additive C is optionally the above compounds because such compounds are of high compatibility and possess a relatively low viscosity, thereby ensuring longevity of the battery. In addition, the flash point and the boiling point of such compounds are relatively high, and can reduce the exothermic value and the spontaneous combustion rate of the battery when the compounds are added into the electrolyte solution system.

In some embodiments, a mass fraction of an additive C is 0.5% to 30%, optionally 1% to 25%, and further optionally 5% to 15%, based on a total mass of the compound A, the compound B, and a lithium salt existent in the nonaqueous electrolyte solution.

For example, the mass fraction of the additive C in the nonaqueous electrolyte solution may be 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%.

The additive C added at a mass fraction falling within the above range not only facilitates the dissolution of the lithium salt and improves the compatibility with the lithium-ion electrolyte solutions, increases the boiling point and flame retardant properties of the electrolyte solution, but also avoids significantly impairing the ion transport properties of the electrolyte solution and ensures the long-term cycle performance.

In some embodiments, in a molecule of an additive C, when a terminal of the molecule contains fluorine, a mass fraction of the additive C in the nonaqueous electrolyte solution is 15% to 30%, based on a total mass of the compound A, the compound B, and a lithium salt existent in the nonaqueous electrolyte solution.

The viscosity of the fluorinated phosphate ester tends to decrease. Therefore, in a case that the fluorinated phosphate ester is applied, the additive can be added at a higher mass percent into the electrolyte solution system. The fluorinated phosphate ester coordinates with the compound A and the compound B to form an electrolyte solution system, thereby reducing the exothermic value and the spontaneous combustion rate of the battery, and in turn, improving the safety of the battery without affecting the battery life.

In some optional embodiments, the nonaqueous electrolyte solution is formed from the lithium salt, the compound A, the compound B, and the additive C.

A second aspect of this application provides a lithium secondary battery. The lithium secondary battery includes the nonaqueous electrolyte solution according to the first aspect of this application.

A third aspect of this application provides an electrical device. The electrical device includes the nonaqueous electrolyte solution according to the first aspect of this application or the secondary battery according to the second aspect of this application.

The description of the nonaqueous electrolyte solution in the first aspect of this application is applicable to the lithium secondary battery according to the second aspect of this application and the electrical device according to the third aspect of this application.

Next, a lithium secondary battery and an electrical device of this application are described below with due reference to drawings.

Generally, a secondary battery includes a positive electrode plate, a negative electrode plate, an electrolyte (in this application, a nonaqueous electrolyte solution), and a separator. In a charge-discharge cycle of the battery, active ions are shuttled between the positive electrode plate and the negative electrode plate by intercalation and deintercalation. The electrolyte serves to conduct ions between the positive electrode plate and the negative electrode plate. Disposed between the positive electrode plate and the negative electrode plate, the separator primarily serves to prevent a short circuit between the positive electrode plate and the negative electrode plate while allowing passage of ions.

Electrolyte

The electrolyte serves to conduct ions between the positive electrode plate and the negative electrode plate. In this application, the electrolyte is a nonaqueous electrolyte solution, and includes an electrolyte salt and a solvent. The electrolyte salt is a lithium salt. The solvent includes a solvent A (that is, the compound A) and a solvent B (that is, the compound B). The nonaqueous electrolyte solution may further include an additive C. For the lithium salt, solvent A (that is, compound A), solvent B (that is, compound B), and additive C, reference may be made to the relevant description above.

In some optional embodiments, the electrolyte salt may include at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro (oxalato) borate, lithium bis(oxalato) borate, lithium difluoro (bisoxalato) phosphate, or lithium tetrafluoro (oxalato)phosphate.

In some optional embodiments, the solvent may further include at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, or (ethylsulfonyl) ethane in addition to the solvent A and the solvent B.

In some optional embodiments, in the nonaqueous electrolyte solution, the total mass percent of the solvent A and the solvent B falls within a range of 80% to 100%, based on the total mass of the nonaqueous electrolyte solution.

In some optional embodiments, the electrolyte solution further optionally includes an additive. For example, the additive may include a negative electrode film-forming additive or a positive electrode film-forming additive. The additive may further include an additive capable of improving specified performance of the battery, for example, an additive for improving overcharge performance of the battery, or an additive for improving high- or low-temperature performance of the battery.

Negative Electrode Plate

The nonaqueous electrolyte solution provided in this application is particularly suitable for use in an anode-free secondary battery, that is, an anode-free lithium metal battery: An anode-free secondary battery means a secondary battery that uses just a current collector, especially a copper foil current collector, as a negative electrode without containing a negative active material such as activated graphite, a carbon-silicon material, or a silicon-based material. The positive electrode in the anode-free secondary battery still includes a conventional lithium-containing metal material in the art. Currently, the anode-free lithium metal battery is an ultimate solution to increasing the energy density of a battery cell. In an anode-free secondary battery, the negative electrode may be simply a copper foil current collector without containing any active material, and can be matched with a conventional layered oxide positive electrode. During cycling of the anode-free secondary battery, the lithium in the positive electrode is directly deposited on the surface of the negative current collector in the form of elemental lithium metal, and is shuttled cyclically. With the initial negative electrode material omitted directly, the energy density of the battery cell is increased significantly: Therefore, the anode-free lithium metal battery offers broad prospects for applications in the fields such as long-range power batteries, electric aircraft, and electric aerial vehicles. However, because no excess metallic lithium source is available on the surface of the negative current collector in the initial state, the cycle life of the anode-free lithium metal battery urgently needs to be improved. Unexpectedly, the nonaqueous electrolyte solution provided in this application can significantly improve the long-term cycle performance of the anode-free lithium metal battery. In addition, the compound A, compound B, additive C, and the like contained in the nonaqueous electrolyte solution provided in this application assume the above structures, so that the nonaqueous electrolyte solution possesses appropriate concentration, viscosity; melting point, and boiling point, thereby being conducive to maintaining normal cycling at low temperature. Therefore, when applied to an anode-free lithium metal battery, the nonaqueous electrolyte solution provided in this application can significantly improve the long-term cycle performance of the anode-free lithium metal battery while maintaining excellent low-temperature cycle performance.

Therefore, in some embodiments, the secondary battery is an anode-free lithium secondary battery:

When applied to an anode-free lithium secondary battery; the nonaqueous electrolyte solution disclosed in this application can improve the long-term cycling capability of the secondary battery cycled at a high charge cut-off voltage, and significantly improve the capacity release capability and cycle life of the secondary battery discharged at low temperature (for example, −40° C.). In addition, the nonaqueous electrolyte solution contributes to significantly improved safety performance to meet the functional requirements of electric vehicles, high-altitude electric aircraft, and other low-temperature-critical application scenarios in the future.

In some embodiments, the secondary battery includes a negative electrode plate. The negative electrode plate includes no negative active material. The negative active material is an active material conventionally used in a negative electrode of a secondary battery in the art, such as a carbon material or a silicon-based material. The nonaqueous electrolyte solution disclosed in this application is matched with a negative electrode that includes no negative active material, and the resultant secondary battery is more excellent in the long-term cycling capability and low-temperature cycle performance.

In some embodiments, the secondary battery includes a negative electrode plate, and the negative electrode plate is not a graphite negative electrode or a silicon negative electrode. The graphite negative electrode and the silicon negative electrode are the conventional graphite negative electrode and silicon negative electrode for use in the art. Currently, three generations of lithium batteries have been launched in the market. The first generation of lithium batteries uses a graphite negative electrode, and can achieve an energy density of up to 600 Wh/L. The second generation of lithium batteries uses a silicon negative electrode, and can achieve an energy density of approximately 800 Wh/L. The first and second generations are both conventional lithium-ion batteries. The third generation of lithium batteries will use a metal negative electrode of a higher energy density or even omit the negative electrode, and can achieve an energy density higher than 1000 Wh/L. The nonaqueous electrolyte solution of this application produces a prominent effect when applied to the third generation of lithium batteries, and can significantly improve the long-term cycle capacity and low-temperature performance of the battery.

In some embodiments, the secondary battery includes a negative electrode plate, and the negative electrode plate contains no lithium ions.

In the case of the anode-free metal lithium secondary battery provided in this application (that is, the negative electrode of the lithium secondary battery contains no lithium metal), a current collector may exist but without being coated with a negative active material during preparation of the negative electrode. The negative electrode may include just a current collector. For example, the negative electrode plate is formed of a copper foil. Alternatively, the negative current collector may be overlaid with a metal layer or an oxide layer. The metal layer or oxide layer may be a plating layer. For example, the current collector may be overlaid with a metal plating layer or an oxide plating layer by evaporation, magnetron sputtering, or other means. The metal layer includes metal elements such as tin (Sn), zinc (Zn), aluminum (Al), magnesium (Mg), silver (Ag), gold (Au), gallium (Ga), indium (In), and platinum (Pt). The oxide layer includes oxides such as zinc oxide (ZnO), aluminum oxide ($Al_2O_3$), and titanium oxide ($TiO_2$). With a thickness of 0 to 200 nm, the metal layer or oxide layer serves a sole function of inducing deposition of metal lithium, but does not serve as a negative active alloy material.

Therefore, in some embodiments, the secondary battery includes a negative electrode plate. The negative electrode plate includes a negative current collector and a metal layer or an oxide layer located on the negative current collector. Optionally, a thickness of the metal layer or oxide layer is 0 to 200 nm. Optionally, the metal layer includes one or more of tin, zinc, aluminum, magnesium, silver, gold, gallium, indium, or platinum. Optionally, the oxide layer includes one or more of zinc oxide, aluminum oxide, or titanium oxide.

In some embodiments, the secondary battery includes a negative electrode plate. The negative electrode plate includes a negative current collector. The negative current collector is a copper foil. Optionally, the negative electrode plate consists only of the copper foil. In an anode-free secondary battery, the negative current collector may be a metal foil, such as copper foil, nickel foil, or another appropriate metal foil. When the negative current collector is a copper foil, the effect is desirable.

In some embodiments, the secondary battery includes a negative electrode plate. The negative electrode plate includes a copper foil current collector and a lithium metal foil. Optionally, the lithium metal foil is 5 to 100 μm thick. An ultra-thin lithium metal foil (5 to 100 μm thick) may be rolled onto the copper foil current collector to serve as a lithium metal negative electrode.

Although the nonaqueous electrolyte solution for use in a lithium secondary battery is preferably matched with the negative electrode containing no active material, the type of the negative electrode is not limited herein. The nonaqueous electrolyte solution provided in this application is also applicable to a lithium battery containing a conventional negative electrode plate except for a lesser effect than the preceding embodiment. The following describes conventional negative electrode plates that can be matched with the nonaqueous electrolyte solution provided in this application. Understandably, such description is merely exemplary, but not intended to limit this application.

The negative electrode plate includes a negative current collector and a negative electrode film layer disposed on at least one surface of the negative current collector. The negative electrode film layer includes a negative active material.

As an example, the negative current collector includes two surfaces opposite to each other in a thickness direction of the negative current collector. The negative electrode film layer is disposed on either or both of the two opposite surfaces of the negative current collector.

In some embodiments, the negative current collector may be a metal foil or a composite current collector. For example, the metal foil may be copper foil. The composite current collector may include a polymer material substrate and a metal layer formed on at least one surface of the polymer material substrate. The composite current collector may be formed by overlaying the polymer material substrate with a metal material (for example, copper, copper alloy, nickel, nickel alloy; titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material well-known in the art for use in a battery. As an example, the negative active material may include at least one of the following materials: artificial graphite, natural graphite, soft carbon, hard carbon, silicon-based material, tin-based material, lithium titanium oxide, and the like. The silicon-based material may include at least one of elemental silicon, a silicon oxide compound, a silicon-carbon composite, a silicon-nitrogen composite, or a silicon alloy. The tin-based material may include at least one of elemental tin, a tin-oxygen compound, or a tin alloy. However, this application is not limited to such materials, and other conventional materials usable as a negative active material of a battery may be used instead. One of the negative active materials may be used alone, or at least two thereof may be used in combination.

In some embodiments, the negative electrode film layer further optionally includes a binder. The binder may include at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), or carboxymethyl chitosan (CMCS).

In some embodiments, the negative electrode film layer further optionally includes a conductive agent. The conductive agent may include at least one of superconductive carbon, acetylene black, carbon black, Ketjen black, carbon dots, carbon nanotubes, graphene, or carbon nanofibers.

In some embodiments, the negative electrode film layer further optionally includes other agents, such as a thickener (for example, sodium carboxymethyl cellulose (CMC-Na)).

In the negative electrode film layer, the mass percent of the negative electrode material ranges from 70 wt % to 98 wt %, optionally 95%: the mass percent of the binder ranges from 1 wt % to 15 wt %; and the mass percent of the conductive agent ranges from 1 wt % to 15 wt %, each based on the total mass of the positive electrode film.

In some embodiments, the negative electrode plate may be prepared according to the following method: dispersing the ingredients of the negative electrode plate such as the negative active material, the conductive agent, and the binder and any other ingredients in a solvent (such as deionized water) to form a negative electrode slurry, coating a negative current collector with the negative electrode slurry, and performing steps such as drying and cold calendering to obtain the negative electrode plate.

Positive Electrode Plate

The positive electrode plate includes a positive current collector and a positive electrode film layer that overlays at least one surface of the positive current collector. The positive electrode film layer includes a lithium-containing positive active material.

As an example, the positive current collector includes two surfaces opposite to each other in a thickness direction of the positive current collector. The positive electrode film layer is disposed on either or both of the two opposite surfaces of the positive current collector.

In some embodiments, the positive current collector may be a metal foil or a composite current collector. For example, the metal foil may be aluminum foil. The composite current collector may include a polymer material substrate and a metal layer formed on at least one surface of the polymer material substrate. The composite current collector may be formed by overlaying the polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In a case of an anode-free lithium secondary battery, that is, in a case of absence of a negative active material, the positive active material optionally includes, but is not limited to, at least one of the following materials: olivine-structured lithium-containing phosphate, lithium transition metal oxide, and a modified compound thereof. However, this application is not limited to such materials, and other conventional materials usable as a positive active material of a battery may be used instead. Of such positive active materials, one may be used alone, or at least two may be used in combination. In some optional embodiments, the positive active material includes a lithium transition metal oxide. Optionally, examples of the lithium transition metal oxide include, but are not limited to, at least one of lithium cobalt oxide (such as $LiCoO_2$), lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}CO_{0.1}Mn_{0.1}O_2$ (briefly referred to as NCM811), lithium nickel cobalt aluminum oxide (such as $LiNi_{0.85}Co_{0.15}Al_{0.05}O_2$), or a modified compound thereof. In some optional embodiments, the positive active material includes an olivine-structured lithium-containing phosphate salt. Examples of the olivine-structured lithium-containing phosphate may include, but are not limited to, at least one of lithium iron phosphate (such as $LiFePO_4$, LFP for short), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

According to this application, the positive active material is not limited to the above examples, and may be any suitable positive active material that is well known for use in a battery in the art.

In some embodiments, the positive electrode film layer further optionally includes a binder. As an example, the binder may include at least one of polyvinylidene difluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), or fluorinated acrylate resin.

In some embodiments, the positive electrode film layer further optionally includes a conductive agent. As an example, the conductive agent may include at least one of superconductive carbon, acetylene black, carbon black, Ketjen black, carbon dots, carbon nanotubes, graphene, or carbon nanofibers.

In the positive electrode film layer, the mass percent of the positive active material described in this application ranges from 70 wt % to 99 wt %, optionally 97 wt %: the mass percent of the binder ranges from 0.2 wt % to 15 wt %; and the mass percent of the conductive agent ranges from 0.2 wt % to 15 wt %, each based on the total mass of the positive electrode film.

In some embodiments, the positive electrode plate may be prepared according to the following method: dispersing the ingredients of the positive electrode plate such as the positive active material, the conductive agent, the binder, and any other ingredients into a solvent (such as N-methylpyrrolidone) to form a positive electrode slurry, coating a positive current collector with the positive electrode slurry, and performing steps such as drying and cold pressing to obtain the positive electrode plate.

Separator

In some embodiments, the secondary battery further includes a separator. The type of the separator is not particularly limited in this application, and may be any well-known porous separator that is highly stable both chemically and mechanically.

In some embodiments, the separator may be made of a material that includes at least one of glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In a case of the anode-free lithium metal secondary battery provided in this application, the separator of the secondary battery may be, but is not limited to, a polyethylene porous film, a polypropylene porous film, a polyimide porous film, or a porous film compounded of a plurality of polymers.

The anode-free liquid lithium metal secondary battery provided in this application can achieve a longer cycle life at a higher cut-off voltage due to the use of a more oxidation-resistant nonaqueous electrolyte solution. The cycle life is up to 118 cycles when the battery is charged and discharged at room temperature, a current rate of 0.2C to 1C, and a voltage of 2.8 V to 4.5 V.

The anode-free liquid lithium metal secondary battery provided in this application can operate in a wider range of temperature due to the use of a nonaqueous electrolyte solution that is conducive to low-temperature discharge. Especially, in an environment of −40° C. and at a charge and discharge rate of 0.2C to 1C, the discharge capacity of the secondary battery can reach 70% or more of the discharge capacity achieved at room temperature.

The anode-free liquid lithium metal secondary battery provided in this application can maintain a large number of cycles even in a low-temperature environment due to the use of the nonaqueous electrolyte solution that can achieve cycle stability and a high low-temperature discharge capability simultaneously. The cycle life keeps at 100 cycles or more when the battery is charged and discharged at −40° C. and a current rate of 0.2C to 1C.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The soft package may be made of plastic such as polypropylene, polybutylene terephthalate, or polybutylene succinate.

The shape of the secondary battery is not particularly limited in this application, and may be cylindrical, prismatic or any other shape. FIG. 1 shows a prismatic secondary battery 5 as an example.

Figure 2:
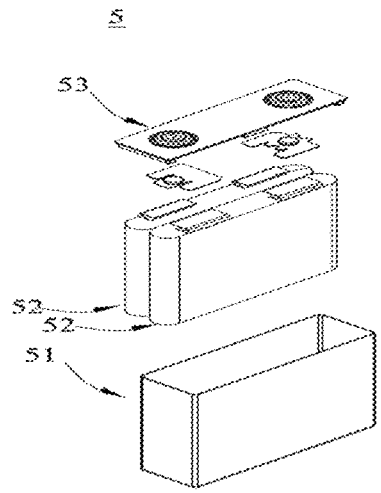
FIG. 2 is an exploded view of a secondary battery shown in FIG. 1 according to an embodiment of this application.

In some embodiments, referring to FIG. 2, the outer package may include a housing 51 and a cover plate 53. The housing 51 may include a bottom plate and a side plate connected to the bottom plate. The bottom plate and the side plate close in to form an accommodation cavity. The housing 51 is provided with an opening that communicates to the accommodation cavity. The cover plate 53 can be placed over the opening to seal the accommodation cavity. The positive electrode plate, the negative electrode plate, and the separator may be made into the electrode assembly 52 by winding or stacking. The electrode assembly 52 is packaged in the accommodation cavity. The electrolyte solution infiltrates in the electrode assembly 52. The number of electrode assemblies 52 in a secondary battery 5 may be one or more, and may be selected by a person skilled in the art as actually required.

The secondary battery may be in the form of a battery cell, a battery module, a battery pack, or the like. In some embodiments, the battery cell may be assembled into a battery module. The battery module may include one or more battery cells, and the specific number of battery cells in a battery module may be selected by a person skilled in the art depending on the application scenario and capacity of the battery module.

Figure 3:
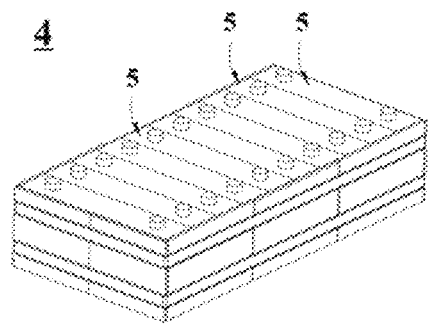
FIG. 3 is a schematic diagram of a battery module according to an embodiment of this application.

FIG. 3 shows a battery module 4 as an example. Referring to FIG. 3, in the battery module 4, a plurality of battery cells 5 may be arranged sequentially along a length direction of the battery module 4. Alternatively, the secondary batteries may be arranged in any other manner. Further, the plurality of battery cells 5 may be fixed by a fastener.

Optionally, the battery module 4 may further include a shell that provides an accommodation space. The plurality of battery cells 5 are accommodated in the accommodation space.

In some embodiments, the battery cells may be assembled to form a battery pack. In some embodiments, the battery module may be assembled to form a battery pack. The battery pack may include one or more battery modules, and the specific number of battery modules in a battery pack may be selected by a person skilled in the art depending on practical applications and capacity of the battery pack.

Figure 4:
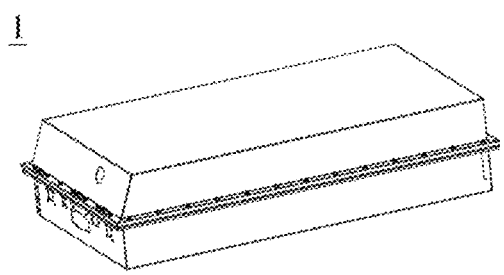
FIG. 4 is a schematic diagram of a battery pack according to an embodiment of this application.
Figure 5:
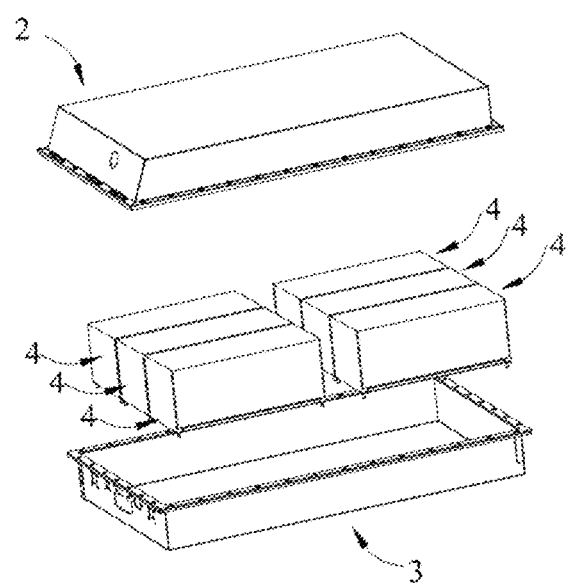
FIG. 5 is an exploded view of a battery pack shown in FIG. 4 according to an embodiment of this application.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes the secondary battery according to this application. The secondary battery may be used as a power supply of the electrical device, or used as an energy storage unit of the electrical device. The electrical devices may include, but are not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery may be selected for use in the electrical device according to the use requirements.

As an example, the electrical device may be a battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

In another example, the device may be a mobile phone, a tablet computer, a notebook computer, or the like. The device is generally required to be thin and light, and may have a secondary battery as a power supply.

EMBODIMENTS

The following describes some embodiments of this application. The embodiments described below are illustrative, and are merely intended to construe this application but not to limit this application. Unless techniques or conditions are otherwise expressly specified in an embodiment hereof, the techniques or conditions described in the literature in this field or in an instruction manual of the product are applicable in the embodiment. A reagent or instrument used herein without specifying a manufacturer is a conventional product that is commercially available in the market.

I. Preparing a Lithium Secondary Battery

Embodiment 1

(1) Preparing a Nonaqueous Electrolyte Solution

Taking equal amounts of solvent I-1 and solvent II-8 by mass, and stirring well to obtain a mixed solvent for later use. Adding 1.87 grams of lithium bis(fluorosulfonyl)imide salt into 5 ml of the above mixed solvent, and stirring well to form a colorless transparent electrolyte solution in which the concentration of the lithium salt is 2 mol/L. Subsequently, adding compound III-86 at a mass percent of 15 wt % based on the total mass of the solvent I-1, the solvent II-8, and the lithium bis(fluorosulfonyl)imide salt to obtain a nonaqueous electrolyte solution.

(2) Preparing a Positive Electrode Plate

Mixing lithium nickel cobalt manganese oxide $LiNi_{0.8}Co_{0.1}Mn_{0.1}O_2$ (NCM811) as a positive active material, acetylene black as a conductive agent, and PVDF as a binder at a mass ratio of 98:1:1; adding an N-methylpyrrolidone (NMP) solvent, and stirring the mixture until the solvent system is homogeneous, so as to obtain a positive electrode slurry (in which the solid content is 70%); applying the positive electrode slurry evenly onto both sides of a positive current collector aluminum foil at a concentration of 25 mg/cm$^2$, air-drying the coated aluminum foil at room temperature, and then transferring the foil into an oven for further drying; and then cutting the dried aluminum foil into 40 mm×50 mm rectangular sheets to form positive electrode plates, where the areal capacity of the positive electrode is 3.5 mAh/cm$^2$.

(3) Separator

Selecting a polyethylene porous film purchased from SEMCORP Group, and cutting the film into 45 mm×55 mm rectangular sheets for later use.

(4) Preparing a Negative Electrode Plate

Selecting a 12 µm-thick copper foil, and cutting the copper foil into a 41 mm×51 mm rectangular sheets as negative electrode plates for later use.

(5) Assembling a Lithium Secondary Battery

Matching one cut positive electrode plate with two cut negative electrode plates, stacking the above separator between the positive electrode plate and the negative electrode plate to isolate the positive and negative electrodes, and wrapping the stacked structure in an aluminum laminated film package to form a stacked-type dry cell. Injecting 0.3 gram of the nonaqueous electrolyte solution prepared in step (1) into the package, hot-pressing the aluminum laminated film package in a vacuum environment to seal the package, and leaving the package to stand at room temperature for at least 6 hours before starting the cycle test. The rated capacity of the stacked-type battery prepared in this way is 140 mAh.

Embodiments 2 to 35

The preparation method and test method in Embodiments 2 to 35 are similar to those in Embodiment 1. The details are set out in Table 1.

Embodiment 36

In Embodiment 36, the negative current collector copper foil is plated with a 50 nm-thick Zn layer by evaporation, and then an anode-free lithium metal battery is assembled. Other test steps are similar to those in Embodiment 1.

Embodiments 37 and 38

The preparation method and test method in Embodiments 37 and 38 are similar to those in Embodiment 36. The details are set out in Table 1.

Embodiment 39

In Embodiment 39, the negative current collector copper foil is plated with a 50 nm-thick ZnO layer by magnetron sputtering, and then an anode-free lithium metal battery is assembled. Other test steps are similar to those in Embodiment 1.

Embodiments 40 to 46

The preparation method and test method in Embodiments 40 to 46 are similar to those in Embodiment 1. The differences are set out in Table 1.

Embodiment 47

The preparation method and test method in Embodiment 47 are similar to those in Embodiment 1. The details are set out in Table 1. No additive C described in this application is added, but triethyl phosphate in the prior art is used instead, purchased from Shanghai Macklin Biochemical Technology Co., Ltd.

Embodiment 48

The preparation method and test method in Embodiment 48 are similar to those in Embodiment 1. The details are set out in Table 1. No additive C described in this application is added, but tris(2,2,2-trifluoroethyl)phosphate in the prior art is used instead, purchased from Shanghai Xieer Chemical Technology Co., Ltd.

Embodiment 49

In Embodiment 49, the negative current collector copper foil is overlaid with a 20 μm ultrathin lithium foil by rolling, and then a lithium metal battery is assembled. Other test steps are similar to those in Embodiment 1.

Embodiment 50

In Embodiment 50, the negative current collector copper foil is replaced with a current collector nickel foil of the same thickness, and then an anode-free lithium metal battery is assembled. Other test steps are similar to those in Embodiment 1.

Embodiment 51

The preparation method and test method in Embodiment 51 are similar to those in Embodiment 1 except that no flame retardant additive is added. The details are set out in Table 1.

Comparative Embodiment 1

Adding 1.87 grams of lithium bis(fluorosulfonyl)imide salt into 5 ml of solvent I-1, and stirring well to form a colorless transparent electrolyte solution in which the concentration of the lithium salt is 2 mol/L; and then adding III-86 at a mass percent of 15 wt % based on the total mass of the electrolyte solution to obtain an electrolyte solution for future performance test and cycle test of the battery cell.

As tested, the time taken for the electrolyte solution in Comparative Embodiment 1 to extinguish itself after being ignited is 0 s; tested at room temperature, the long-term cycle life of the lithium metal secondary battery that uses the electrolyte solution in Comparative Embodiment 1 is 57 cycles, the reversible capacity retention rate tested at −40° C. is 64%, and the long-term cycle life tested at −40° C. is 45 cycles.

Comparative Embodiments 2 to 7

The preparation method and test method in Comparative Embodiments 2 to 7 are similar to those in Comparative Embodiment 1 except the differences set out in Table 1.

II. Performance Test

1. Testing the Cycle Life of a Lithium Secondary Battery at Room Temperature

Taking a stacked-type battery cell (a lithium secondary battery in step (5)) prepared in each embodiment and comparative embodiment above, setting the ambient temperature to 25° C., and charging the battery cell at a current rate of 0.2C (that is, 28 mA) and discharging the battery cell at a current rate of 1C (that is, 140 mA) repeatedly. Setting the cut-off voltage during charge to 4.5 V, and setting the cut-off voltage during discharge to 2.8 V, where the charging process is performed by a constant-current and constant-voltage charging method. A specific constant-current and constant-voltage charging process is: charging the cell at a constant current of 0.2C until a cut-off voltage 4.5 V, and then continuing to charge the cell at a constant voltage of 4.5 V until the current tapers off to 0.1C (that is, 14 mA). Determining, when the discharge capacity fades to 80% of the first-cycle discharge capacity, that the battery reaches the end of life, recording the number of cycles at this time, and setting out the results in Table 1 below.

2. Testing the Low-Temperature Capacity Retention Rate of the Lithium Secondary Battery Taking a stacked-type battery cell (a lithium secondary battery in step (5)) prepared in each embodiment and comparative embodiment above, placing the battery cell into a Votsch VT4044 temperature-controlled chamber, setting the temperature of the temperature-controlled chamber to 25° C., and charging the battery cell at a rate of 0.2C and discharging the battery cell at a rate of 1C for 2 cycles to activate the anode-free lithium metal battery cell. Subsequently, setting the temperature of the temperature-controlled chamber to −40° C., −30° C., −20° C., −10° C., 0° C., 10° C., and 25° C. in sequence, and charging and discharging the battery cell at each of such temperatures for 3 cycles, during which the charge rate is 0.2C and the discharge rate is 1C, and recording the discharge capacity: In each cycle, setting the cut-off voltage during charge to 4.5 V, and setting the cut-off voltage during discharge to 2.8 V, where each charging process is performed by a constant-current and constant-voltage charging method, and the cut-off current during the constant-voltage charge is 0.1C (14 mA).

Calculating the capacity retention rate as: capacity retention rate=average value of discharge capacity over 3 cycles at −40° C./average value of discharge capacity over 3 cycles at 25° C.×100%. The results of the capacity retention rate are set out in Table 1 below:

3. Testing the Low-Temperature Cycle Life of a Lithium Secondary Battery

Taking a stacked-type battery cell (a lithium secondary battery in step (5)) prepared in each embodiment and comparative embodiment above, placing the battery cell into a Votsch VT4044 temperature-controlled chamber, and setting the temperature of the temperature-controlled chamber to −40° C. Performing long-term cycling at a charge rate of 0.2C and a discharge rate of 1C. Setting the cut-off voltage during charge to 4.5 V, and setting the cut-off voltage during discharge to 2.8 V, where each charging process is performed by a constant-current and constant-voltage charging method, and the cut-off current during the constant-voltage charge is 0.1C (14 mA). Determining, when the discharge capacity fades to 80% of the first-cycle discharge capacity, that the battery reaches the end of life, recording the number of cycles at this time, and setting out the results in the "−40° C. cycle life" column in Table 1 below.

4. Testing the Flame Retardancy of the Electrolyte Solution

The flame retardant properties of the electrolyte solution prepared in the embodiments and comparative embodiments are evaluated by a self-extinguishing time (SET) test.

A specific operation procedure of the self-extinguishing time (SET) test is as follows: Making glass fiber into a glass fiber ball with a diameter of 5 mm, measuring the mass $M_0$ of the glass fiber ball, immersing the glass fiber ball in the nonaqueous electrolyte solution prepared in step (1) of each comparative embodiment and embodiment, and measuring the mass $M_1$ of the immersed glass fiber ball. Putting the soaked glass fiber ball onto a round iron wire, and igniting the glass fiber ball quickly. Recording the time T consumed after the ignition source is removed and before the flame extinguishes automatically. Calculating the self-extinguishing time as: $T1=T/(M_1-M_0)$. Repeating the measurement three times, and the averaging out the measured values. Recording the test results in Table 1 below.

TABLE 1

| Serial number | Solvent A | Solvent B | Mass ratio | Lithium salt | Concentration of lithium salt (mol/L) | Additive C |
|---|---|---|---|---|---|---|
| Embodiment 1 | I-1 | II-8 | 1.00 | LiFSI | 2.0 | III-86 |
| Embodiment 2 | I-1 | II-8 | 1.00 | LiFSI | 0.3 | III-86 |
| Embodiment 3 | I-1 | II-8 | 1.00 | LiFSI | 6.0 | III-86 |
| Embodiment 4 | I-1 | II-8 | 1.00 | LiFSI | 0.5 | III-86 |
| Embodiment 5 | I-1 | II-8 | 1.00 | LiFSI | 5.0 | III-86 |
| Embodiment 6 | I-1 | II-8 | 1.00 | LiFSI | 1.0 | III-86 |
| Embodiment 7 | I-1 | II-8 | 1.00 | LiFSI | 3.0 | III-86 |
| Embodiment 8 | I-1 | II-8 | 1.00 | LiFSI | 1.5 | III-86 |
| Embodiment 9 | I-1 | II-8 | 1.00 | LiFSI | 2.5 | III-86 |
| Embodiment 10 | I-1 | II-8 | 0.10 | LiFSI | 2.0 | III-86 |
| Embodiment 11 | I-1 | II-8 | 6.00 | LiFSI | 2.0 | III-86 |
| Embodiment 12 | I-1 | II-8 | 0.20 | LiFSI | 2.0 | III-86 |
| Embodiment 13 | I-1 | II-8 | 5.00 | LiFSI | 2.0 | III-86 |
| Embodiment 14 | I-1 | II-8 | 0.40 | LiFSI | 2.0 | III-86 |
| Embodiment 15 | I-1 | II-8 | 2.50 | LiFSI | 2.0 | III-86 |
| Embodiment 16 | I-1 | II-8 | 0.80 | LiFSI | 2.0 | III-86 |
| Embodiment 17 | I-1 | II-8 | 1.25 | LiFSI | 2.0 | III-86 |
| Embodiment 18 | I-1 | II-8 | 1.00 | LiFSI | 2.0 | III-86 |
| Embodiment 19 | I-1 | II-8 | 1.00 | LiFSI | 2.0 | III-86 |
| Embodiment 20 | I-1 | II-8 | 1.00 | LiFSI | 2.0 | III-86 |
| Embodiment 21 | I-1 | II-8 | 1.00 | LiFSI | 2.0 | III-86 |
| Embodiment 22 | I-1 | II-8 | 1.00 | LiFSI | 2.0 | III-86 |
| Embodiment 23 | I-1 | II-8 | 1.00 | LiFSI | 2.0 | III-86 |
| Embodiment 24 | I-1 | II-8 | 1.00 | LiFSI | 2.0 | III-86 |
| Embodiment 25 | I-1 | II-8 | 1.00 | LiFSI | 2.0 | III-20 |
| Embodiment 26 | I-1 | II-8 | 1.00 | LiFSI | 2.0 | III-1 |
| Embodiment 27 | I-1 | II-31 | 1.00 | LiFSI | 2.0 | III-86 |
| Embodiment 28 | I-57 | II-8 | 1.00 | LiFSI | 2.0 | III-86 |
| Embodiment 29 | I-78 | II-8 | 1.00 | LiFSI | 2.0 | III-86 |
| Embodiment 30 | I-144 | II-8 | 1.00 | LiFSI | 2.0 | III-86 |

TABLE 1-continued

| | | | | | |
|---|---|---|---|---|---|
| Embodiment 31 | I-184 | II-8 | 1.00 | LiFSI | 2.0 | III-86 |
| Embodiment 32 | I-1 | II-2 | 1.00 | LiFSI | 2.0 | III-86 |
| Embodiment 33 | I-2 | II-8 | 1.00 | LiFSI | 2.0 | III-86 |
| Embodiment 34 | I-1 | II-8 | 1.00 | $LiPF_6$ | 2.0 | III-86 |
| Embodiment 35 | I-1 | II-8 | 1.00 | LiDFOB | 2.0 | III-86 |
| Embodiment 36 | I-1 | II-8 | 1.00 | LiFSI | 2.0 | III-86 |
| Embodiment 37 | I-1 | II-8 | 1.00 | LiFSI | 2.0 | III-86 |
| Embodiment 38 | I-1 | II-8 | 1.00 | LiFSI | 2.0 | III-86 |
| Embodiment 39 | I-1 | II-8 | 1.00 | LiFSI | 2.0 | III-86 |
| Embodiment 40 | I-236 | II-8 | 1.00 | LiFSI | 2.0 | III-86 |
| Embodiment 41 | I-237 | II-8 | 1.00 | LiFSI | 2.0 | III-86 |
| Embodiment 42 | I-238 | II-8 | 1.00 | LiFSI | 2.0 | III-86 |
| Embodiment 43 | I-239 | II-8 | 1.00 | LiFSI | 2.0 | III-86 |
| Embodiment 44 | I-240 | II-8 | 1.00 | LiFSI | 2.0 | III-86 |
| Embodiment 45 | I-241 | II-8 | 1.00 | LiFSI | 2.0 | III-86 |
| Embodiment 46 | I-242 | II-8 | 1.00 | LiFSI | 2.0 | III-86 |
| Embodiment 47 | I-1 | II-8 | 1.00 | LiFSI | 2.0 | Triethyl phosphate |
| Embodiment 48 | I-1 | II-8 | 1.00 | LiFSI | 2.0 | Tris(2,2,2-trifluoroethyl)phosphate |
| Embodiment 49 | I-1 | II-8 | 1.00 | LiFSI | 2.0 | III-86 |
| Embodiment 50 | I-1 | II-8 | 1.00 | LiFSI | 2.0 | III-86 |
| Embodiment 51 | I-1 | II-8 | 1.00 | LiFSI | 2.0 | — |
| Comparative Embodiment 1 | I-1 | — | — | LiFSI | 2.0 | III-86 |
| Comparative Embodiment 2 | I-57 | — | — | LiFSI | 2.0 | III-86 |
| Comparative Embodiment 3 | I-78 | — | — | LiFSI | 2.0 | III-86 |
| Comparative Embodiment 4 | I-144 | — | — | LiFSI | 2.0 | III-86 |
| Comparative Embodiment 5 | I-184 | | | LiFSI | 2.0 | III-86 |
| Comparative Embodiment 6 | — | II-8 | — | LiFSI | 2.0 | III-86 |
| Comparative Embodiment 7 | — | II-8 | — | LiFSI | 2.0 | III-86 |

| Serial number | Mass fraction of additive C (%) | Metal layer or oxide layer on current collector copper foil | Plating thickness (nm) | Self-extinguishing time (s/g) | Cycle life tested at room temperature | −40° C. capacity retention rate | −40° C. cycle life |
|---|---|---|---|---|---|---|---|
| Embodiment 1 | 15 | None | — | 0 | 118 | 77% | 102 |
| Embodiment 2 | 15 | None | — | 0 | 70 | 62% | 59 |
| Embodiment 3 | 15 | None | — | 0 | 75 | 59% | 58 |
| Embodiment 4 | 15 | None | — | 0 | 83 | 67% | 67 |

TABLE 1-continued

| | | | | | | | |
|---|---|---|---|---|---|---|---|
| Embodiment 5 | 15 | None | — | 0 | 87 | 64% | 72 |
| Embodiment 6 | 15 | None | — | 0 | 96 | 72% | 89 |
| Embodiment 7 | 15 | None | — | 0 | 101 | 71% | 91 |
| Embodiment 8 | 15 | None | — | 0 | 110 | 74% | 95 |
| Embodiment 9 | 15 | None | — | 0 | 112 | 75% | 97 |
| Embodiment 10 | 15 | None | — | 0 | Insoluble | Insoluble | Insoluble |
| Embodiment 11 | 15 | None | — | 0 | 67 | 58% | 52 |
| Embodiment 12 | 15 | None | — | 0 | 78 | 60% | 71 |
| Embodiment 13 | 15 | None | — | 0 | 82 | 63% | 72 |
| Embodiment 14 | 15 | None | — | 0 | 88 | 72% | 80 |
| Embodiment 15 | 15 | None | — | 0 | 95 | 74% | 88 |
| Embodiment 16 | 15 | None | — | 0 | 111 | 75% | 103 |
| Embodiment 17 | 15 | None | — | 0 | 112 | 77% | 105 |
| Embodiment 18 | 0.5 | None | — | 4 | 120 | 78% | 105 |
| Embodiment 19 | 1 | None | — | 4 | 119 | 77% | 104 |
| Embodiment 20 | 5 | None | — | 2 | 118 | 77% | 103 |
| Embodiment 21 | 10 | None | — | 1 | 118 | 77% | 102 |
| Embodiment 22 | 20 | None | — | 0 | 110 | 71% | 97 |
| Embodiment 23 | 25 | None | — | 0 | 99 | 69% | 83 |
| Embodiment 24 | 30 | None | — | 0 | 90 | 67% | 72 |
| Embodiment 25 | 15 | None | — | 0 | 115 | 75% | 100 |
| Embodiment 26 | 15 | None | — | 0 | 85 | 65% | 62 |
| Embodiment 27 | 15 | None | — | 0 | 117 | 74% | 110 |
| Embodiment 28 | 15 | None | — | 0 | 113 | 72% | 105 |
| Embodiment 29 | 15 | None | — | 0 | 112 | 71% | 104 |
| Embodiment 30 | 15 | None | — | 0 | 114 | 70% | 104 |
| Embodiment 31 | 15 | None | — | 0 | 114 | 69% | 103 |
| Embodiment 32 | 15 | None | — | 0 | 72 | 71% | 59 |
| Embodiment 33 | 15 | None | — | 0 | 70 | 72% | 58 |
| Embodiment 34 | 15 | None | — | 0 | 72 | 65% | 53 |
| Embodiment 35 | 15 | None | — | 0 | 71 | 58% | 46 |
| Embodiment 36 | 15 | Zn | 50 | 0 | 126 | 75% | 118 |
| Embodiment 37 | 15 | Zn | 100 | 0 | 121 | 75% | 114 |
| Embodiment 38 | 15 | Zn | 200 | 0 | 115 | 74% | 110 |
| Embodiment 39 | 15 | ZnO | 50 | 0 | 118 | 73% | 110 |
| Embodiment 40 | 15 | None | — | 0 | 108 | 73% | 99 |
| Embodiment 41 | 15 | None | — | 0 | 107 | 71% | 98 |
| Embodiment 42 | 15 | None | — | 0 | 105 | 69% | 97 |
| Embodiment 43 | 15 | None | — | 0 | 92 | 69% | 79 |
| Embodiment 44 | 15 | None | — | 0 | 87 | 68% | 72 |

TABLE 1-continued

| | | | | | | | |
|---|---|---|---|---|---|---|---|
| Embodiment 45 | 15 | None | — | 0 | 83 | 66% | 72 |
| Embodiment 46 | 15 | None | — | 0 | 80 | 64% | 70 |
| Embodiment 47 | 15 | None | — | 0 | 83 | 63% | 61 |
| Embodiment 48 | 15 | None | — | 0 | 80 | 62% | 58 |
| Embodiment 49 | 15 | 20 μm lithium foil | — | 0 | 489 | 77% | 411 |
| Embodiment 50 | 15 | No plating, not copper foil but nickel foil | — | 0 | 111 | 73% | 99 |
| Embodiment 51 | — | None | — | >60 | 121 | 78% | 105 |
| Comparative Embodiment 1 | 15 | None | — | 0 | 57 | 64% | 45 |
| Comparative Embodiment 2 | 15 | None | — | 0 | 51 | 65% | 40 |
| Comparative Embodiment 3 | 15 | None | — | 0 | 50 | 61% | 40 |
| Comparative Embodiment 4 | 15 | None | — | 0 | 49 | 62% | 38 |
| Comparative Embodiment 5 | 15 | None | — | 0 | 50 | 65% | 43 |
| Comparative Embodiment 6 | 15 | None | — | Insoluble | Insoluble | Insoluble | Insoluble |
| Comparative Embodiment 7 | 15 | None | — | Insoluble | Insoluble | Insoluble | Insoluble |

The anode-free lithium metal secondary battery prepared by using the nonaqueous electrolyte solution in Embodiment 1 is excellent in releasing capacity in a low-temperature environment. At an ambient temperature of −40° C., the reversible capacity of the battery cell can reach 77% of that achieved at an ambient temperature of 25° C. The cycle life tested at room temperature is 118 cycles, and the cycle life tested at −40° C. is 102 cycles. This shows that the non-aqueous electrolyte solution of this embodiment can meet the requirements of lithium metal secondary battery products for the reversible capacity retention in a low-temperature environment, room-temperature cycle performance, and low-temperature cycle performance. In addition, the secondary battery in Embodiment 1 is also excellent in flame retardancy.

As can be seen from Embodiments 1 to 9 versus the comparative embodiment, the lithium salt concentration falling between 0.3 mol/L and 6 mol/L can improve the low-temperature capacity release capability and cycle life of the secondary battery:

As can be seen from Embodiment 1 and Embodiments 10 to 17 versus the comparative embodiment, the volume ratio of the solvent A to the solvent B falling between 0.2 and 6 enables effective dissolution of the lithium salt and improves the cycle life and low-temperature capacity retention rate.

As can be seen from Embodiment 1 and Embodiments 18 to 24 versus Embodiment 43, when the mass fraction of the flame retardant additive C falls within the range of 15% to 30%, the flame retardancy is optimal, and the cycle performance and low-temperature capacity retention rate are also good.

As can be seen from Embodiment 1, 25, 26, and 43, the flame retardant additives C are optionally III-20 and III-86. Other flame retardant additives cause a great impact on the cycle performance although they can produce a similar effect of flame retardancy.

As can be seen from Embodiment 1 and Embodiments 27 to 33, the performance is superior when the solvent A is a fluorine-containing substituent, that is, compound I-1, 1-57, I-78, I-144, or I-184. The performance is superior when all the ring carbon atoms adjacent to oxygen in the solvent B are substituted by fluorine, that is, when the solvent B is compound II-8 or II-31. Otherwise, a trade-off between the cycle stability and the low-temperature capacity retention rate is hardly achievable.

As can be seen from Embodiments 1, 34, and 35, a variety of lithium salts can be used in the nonaqueous electrolyte solution, but lithium bis(fluorosulfonyl)imide is preferable. Other lithium salts used instead may result in inferior cycle life and low-temperature performance.

As can be seen from Embodiments 1 and 36 to 39, the metal Zn plating layer is conducive to further improvement of the cycle life, but the thickness of the plating layer is optionally 50 nm. An excessive thickness will reduce the performance instead. The oxide ZnO plating layer is not obviously effective in improving the cycle performance.

As can be seen from Embodiment 1 versus Comparative Embodiments 1 to 5, the solvent A alone is unable to contribute to a superior long-term cycle life and superior low-temperature performance, thereby demonstrating the necessity of the solvent B for the cycling of the anode-free metal lithium battery.

As can be seen from Comparative Embodiments 6 and 7, the solvent B alone is unable to dissolve the lithium salt effectively.

As can be seen from Embodiments 47 to 48, the adverse effect of a conventional flame retardant on the cycle performance of the electrolyte solution is more significant than that of the additive C designed herein that produces an excellent in flame retardant effect.

As can be seen from Embodiment 49, when the negative electrode is formed of a copper foil and a lithium foil that overlays the copper foil, the secondary battery is extraordinarily excellent in long-term cycle life and low-temperature performance due to the additional lithium source provided in excess.

As can be seen from Embodiment 50, when the negative electrode employs only a nickel foil rather than a copper foil, the cycle performance and capacity retention rate are also superior.

As can be seen from Embodiment 51, without the flame retardant additive C added, both the cycle performance and the low-temperature performance remain good, but the electrolyte solution fails to extinguish automatically when ignited, thereby significantly impairing the safety performance of the battery cell.

The above data show that the two epoxy compound solvents A and B fluorinated in different ways are used in coordination with the flame retardant additive C to produce a boosting effect, thereby significantly improving the cycle life and safety of the high-voltage anode-free lithium metal battery and the ordinary lithium secondary battery, and further improving the capacity retention rate and cycle life of the batteries cycled at low temperature.

Various embodiments described above are merely an exemplary description of the principles and effects of this application, but are not intended to limit this application. A person skilled in the art can modify or change the above embodiments without departing from the spirit and scope of this application. Therefore, any equivalent modification or change made by a person of ordinary skill in the art without departing from the essence and technical conception of this application still falls within the protection scope of the claims of this application.

What is claimed is:

1. A nonaqueous electrolyte solution, comprising:
    a compound A, comprising a saturated five-membered ring or six-membered ring that contains 1 or 2 oxygen atoms as ring atoms, wherein the compound A comprises at least one fluorine-containing substituent, and a ring carbon atom connected to the oxygen atom in the five-membered ring or six-membered ring is not directly substituted with fluorine; and
    a compound B, comprising a saturated five-membered ring or six-membered ring that contains 1 or 2 oxygen atoms as ring atoms, wherein at least one ring carbon atom connected to the oxygen atom in the five-membered ring or six-membered ring is directly substituted with at least one fluorine atom;
    wherein the compound B comprises one of the following compounds:

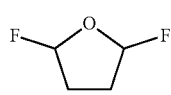

II-1

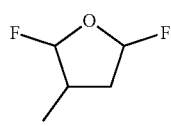

II-2

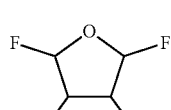

II-3

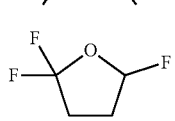

II-4

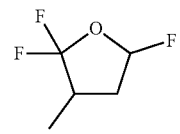

II-5

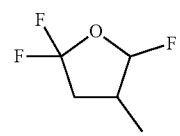

II-6

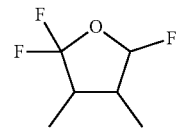

II-7

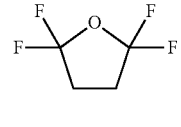

II-8

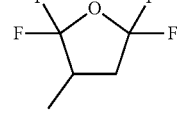

II-9

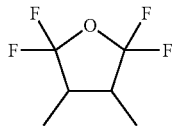

II-10

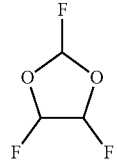

II-11

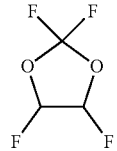

II-12

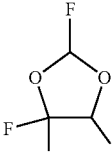

II-13

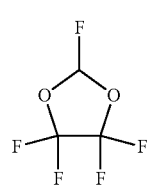

II-14

-continued
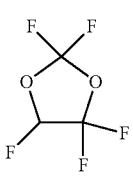
II-15
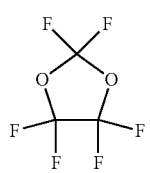
II-16
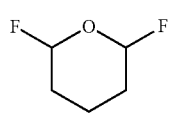
II-17
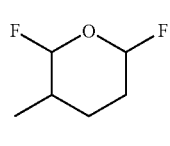
II-18
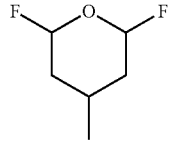
II-19
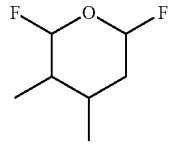
II-20
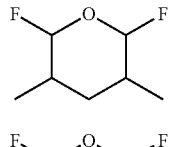
II-21
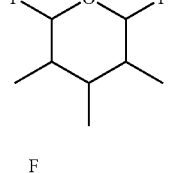
II-22
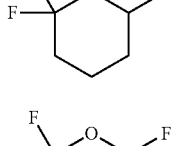
II-23
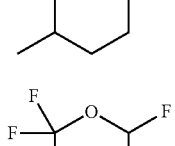
II-24
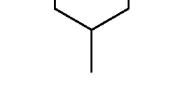
II-25
-continued
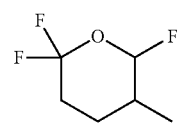
II-26
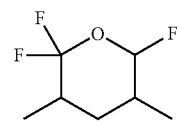
II-27
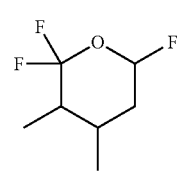
II-28
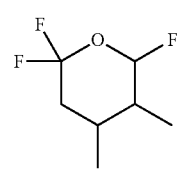
II-29
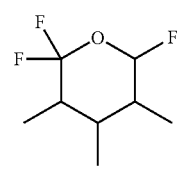
II-30
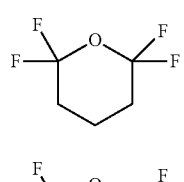
II-31
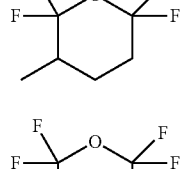
II-32
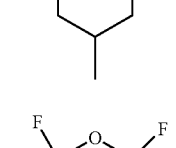
II-33
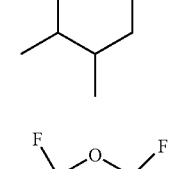
II-34
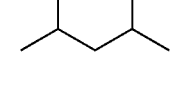
II-35

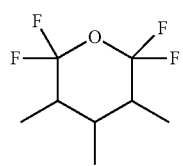 II-36
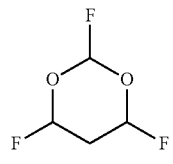 II-37
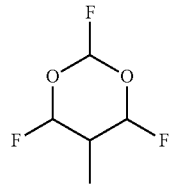 II-38
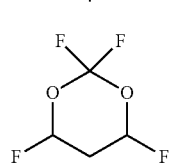 II-39
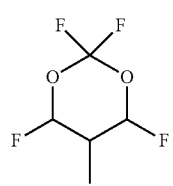 II-40
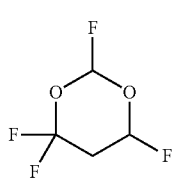 II-41
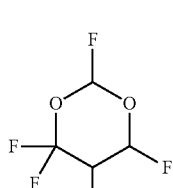 II-42
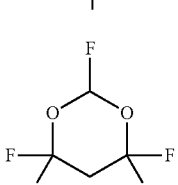 II-43
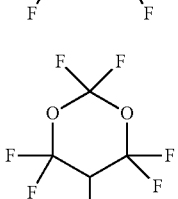 II-44
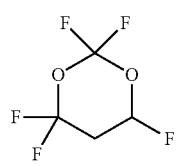 II-45
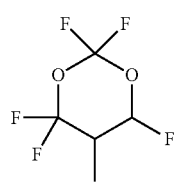 II-46
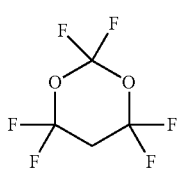 II-47
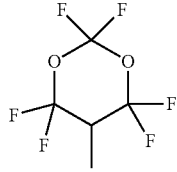 II-48
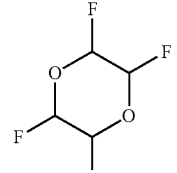 II-49
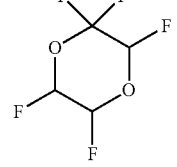 II-50
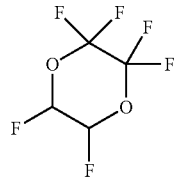 II-51
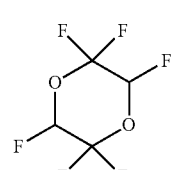 II-52

-continued

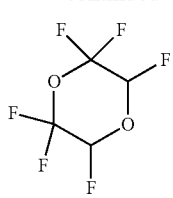
II-53

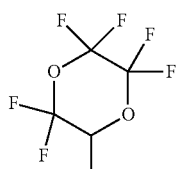
II-54

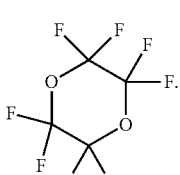
II-55

2. The nonaqueous electrolyte solution according to claim 1, wherein the compound A comprises 1 to 3 fluorine-containing substituents.

3. The nonaqueous electrolyte solution according to claim 1, wherein, in the compound A, substituents on the five-membered ring or the six-membered ring comprise hydrogen, fluorine, —R, —OR, and unsubstituted or —R- or —OR-substituted phenyl, wherein R represents a $C_1$ to $C_6$ alkyl or a $C_1$ to $C_6$ fluoroalkyl.

4. The nonaqueous electrolyte solution according to claim 1, wherein the compound A is represented by a chemical formula I:

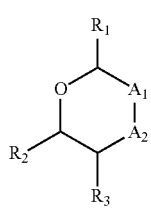
I wherein, $A_1$ represents oxygen, a direct bond, or $CHR_4$;

$A_2$ represents oxygen, a direct bond, or $CHR_5$;

$R_1$ and $R_2$ each independently represent hydrogen, —R, —OR, or unsubstituted or —R- or —OR-substituted phenyl;

$R_3$, $R_4$, and $R_5$ each independently represent hydrogen, fluorine, —R, —OR, or unsubstituted or —R- or —OR-substituted phenyl, wherein each R represents a $C_1$ to $C_6$ alkyl or a $C_1$ to $C_6$ fluoroalkyl;

$A_1$ and $A_2$ are not both direct bonds and are not both oxygen; and when $A_1$ is oxygen, $R_5$ is not fluorine; when $A_2$ is oxygen, $R_3$ and $R_4$ are not fluorine;

$R_1$, $R_2$, $R_3$, $R_4$, and $R_5$ comprise at least 1 fluorine-containing substituent in total.

5. The nonaqueous electrolyte solution according to claim 1, wherein the compound A comprises one of the following compounds:

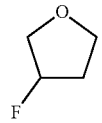
I-1

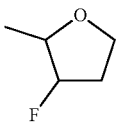
I-2

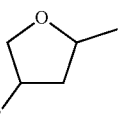
I-3

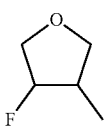
I-4

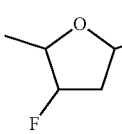
I-5

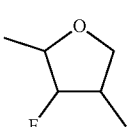
I-6

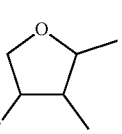
I-7

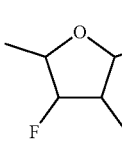
I-8

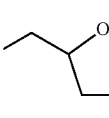
I-9

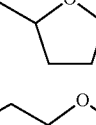
I-10

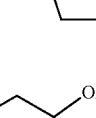
I-11

I-12

| | | |
|---|---|---|
| I-13 | 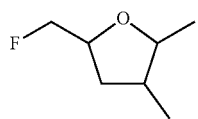 | |
| I-14 | 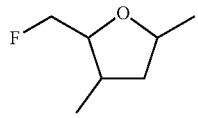 | |
| I-15 | 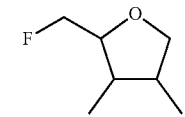 | |
| I-16 | 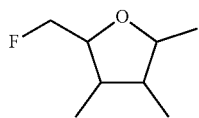 | |
| I-17 | 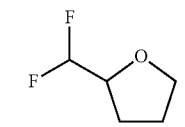 | |
| I-18 | 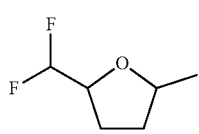 | |
| I-19 | 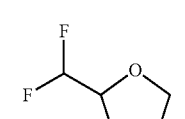 | |
| I-20 | 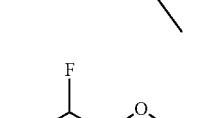 | |
| I-21 | 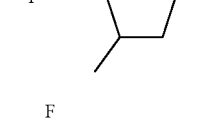 | |
| I-22 | 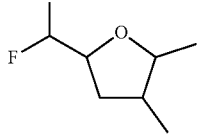 | |
| I-23 | 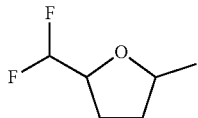 | |
| | | |
|---|---|---|
| I-24 | 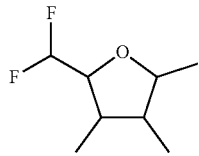 | |
| I-25 | 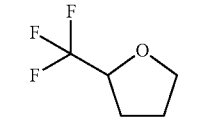 | |
| I-26 | 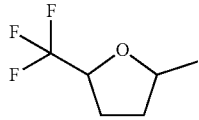 | |
| I-27 | 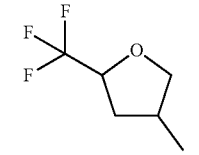 | |
| I-28 | 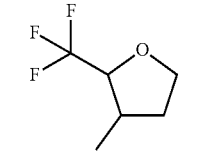 | |
| I-29 | 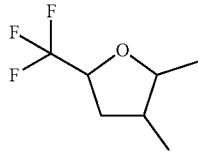 | |
| I-30 | 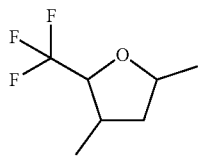 | |
| I-31 | 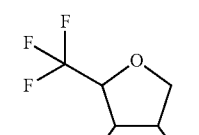 | |
| I-32 | 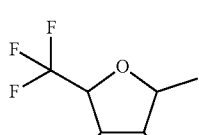 | |
| I-33 | 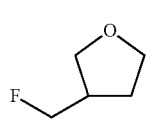 | |
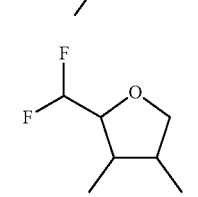

| I-34 | I-46 |
| I-35 | I-47 |
| I-37 | I-48 |
| I-38 | I-49 |
| I-39 | I-50 |
| I-40 | I-51 |
| I-41 | I-52 |
| I-42 | I-53 |
| I-43 | I-54 |
| I-44 | I-55 |
| I-45 | |

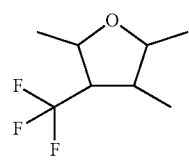
I-56
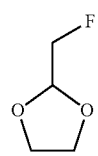
I-57
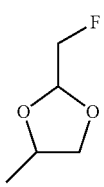
I-58
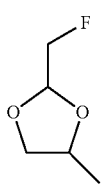
I-59
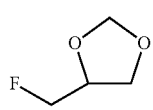
I-60
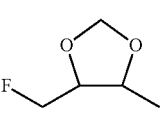
I-61
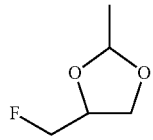
I-62
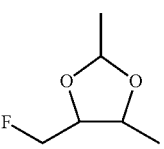
I-63
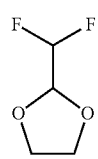
I-64
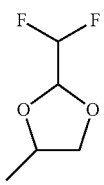
I-65
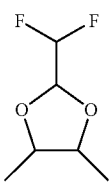
I-66
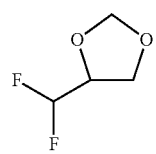
I-67
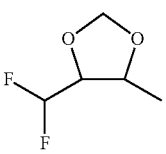
I-68
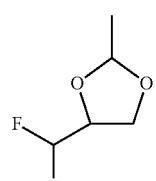
I-69
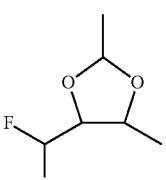
I-70
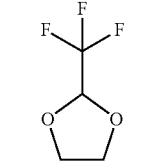
I-71
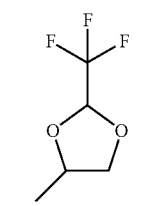
I-72
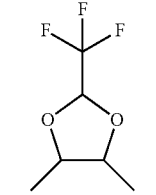
I-73

| | |
|---|---|
| 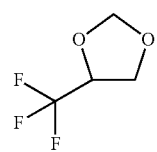 | I-74 |
| 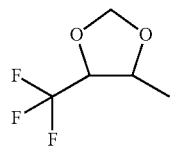 | I-75 |
| 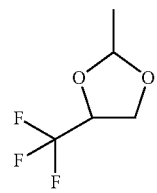 | I-76 |
| 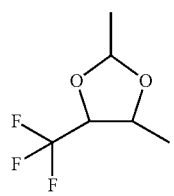 | I-77 |
| 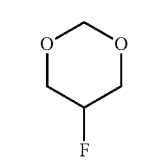 | I-78 |
| 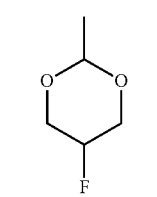 | I-79 |
| 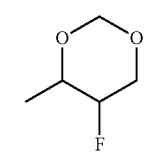 | I-80 |
| 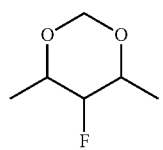 | I-81 |
| 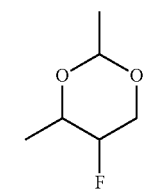 | I-82 |
| 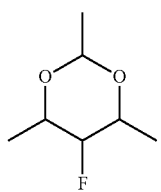 | I-83 |
| 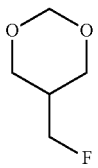 | I-84 |
| 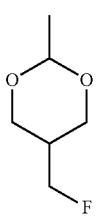 | I-85 |
| 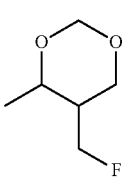 | I-86 |
| 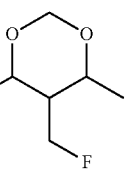 | I-87 |
| 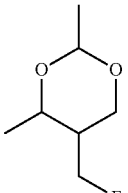 | I-88 |
| 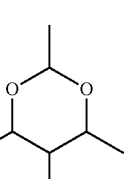 | I-89 |
| 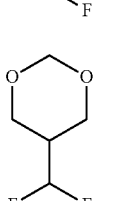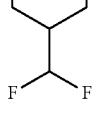 | I-90 |

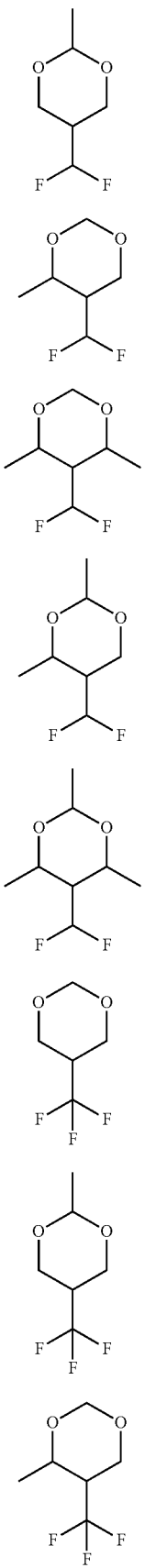
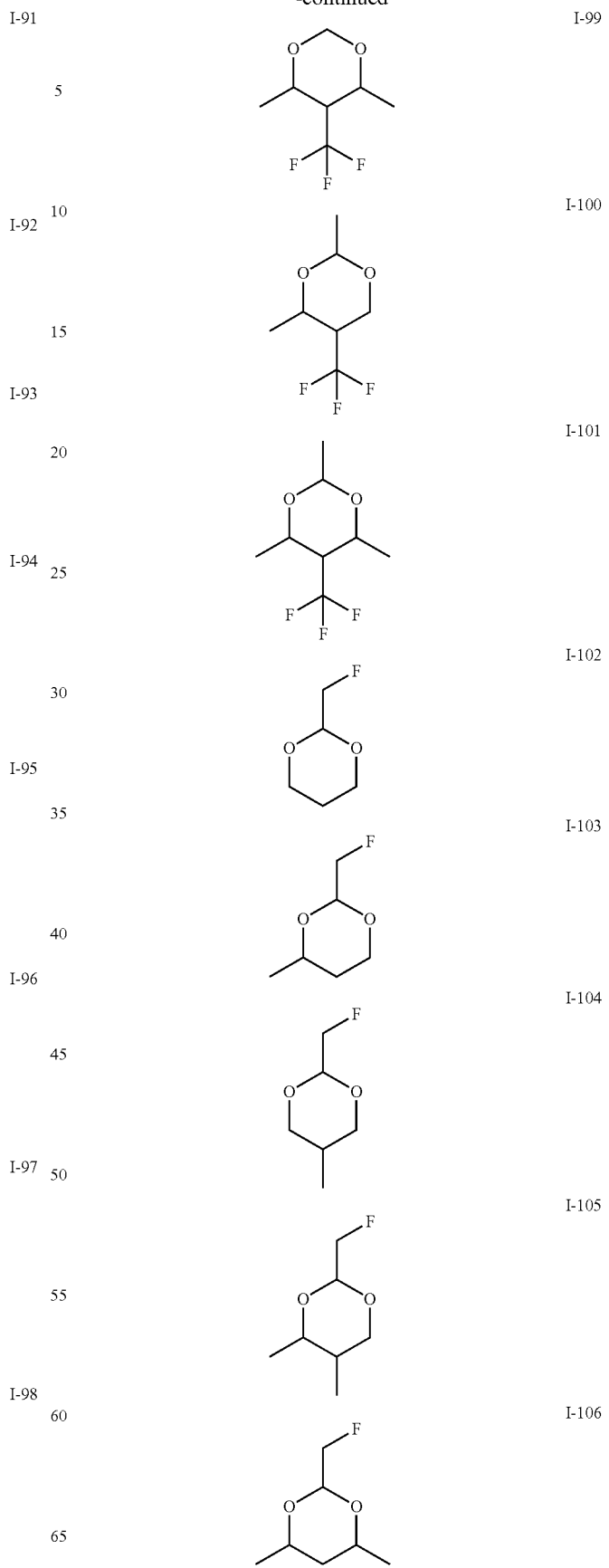

I-107
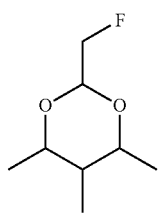
I-108
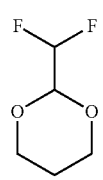
I-109
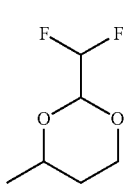
I-110
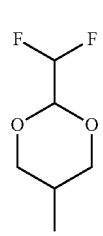
I-111
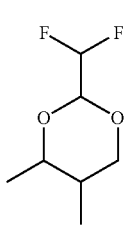
I-112
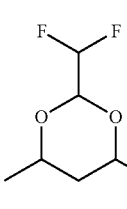
I-113
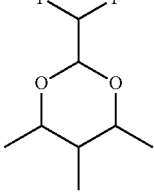
I-114
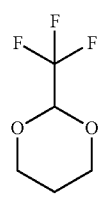
I-115
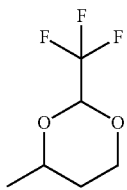
I-116
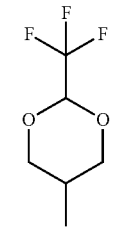
I-117
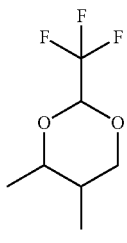
I-118
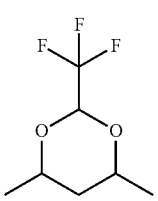
I-119
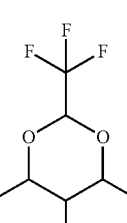
I-120
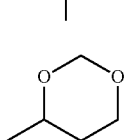
I-121
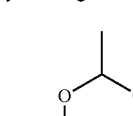
I-122
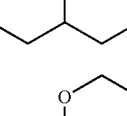
I-123
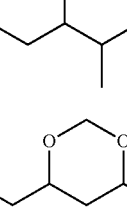

| | |
|---|---|
| I-124 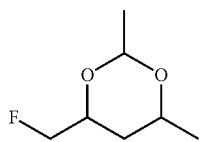 | I-133 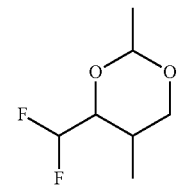 |
| I-125 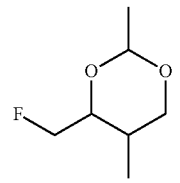 | I-134 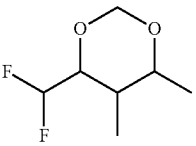 |
| I-126 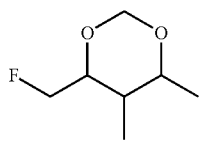 | I-135 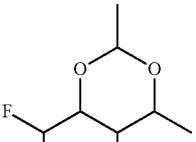 |
| I-127 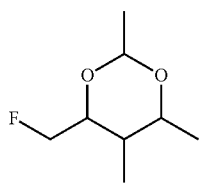 | I-136 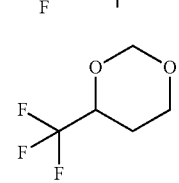 |
| I-128 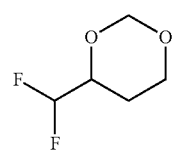 | I-137 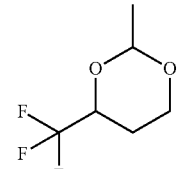 |
| I-129 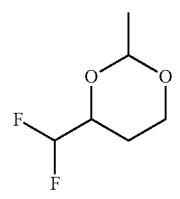 | I-138 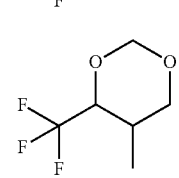 |
| I-130 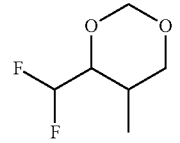 | I-139 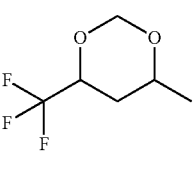 |
| I-131 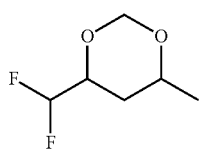 | I-140 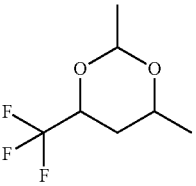 |
| I-132 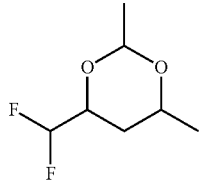 | I-141 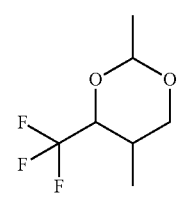 |

I-142 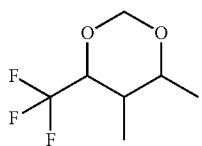
I-143 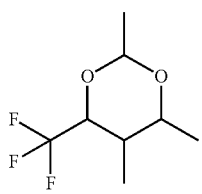
I-144 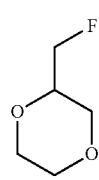
I-145 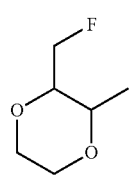
I-146 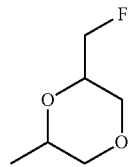
I-147 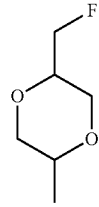
I-148 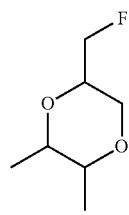
I-149 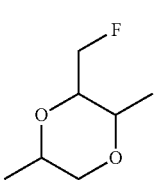
I-150 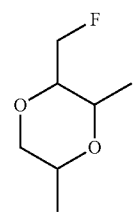
I-151 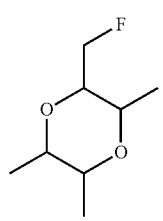
I-152 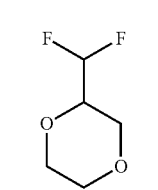
I-153 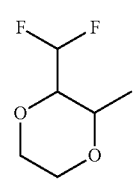
I-154 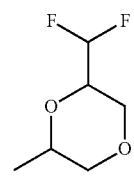
I-155 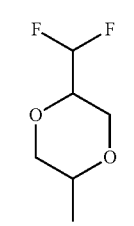
I-156 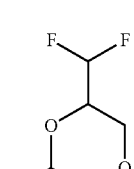
I-157 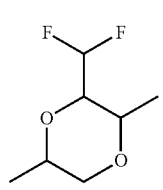

I-158 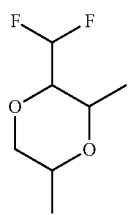
I-159 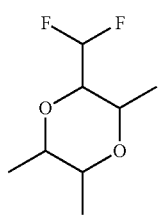
I-160 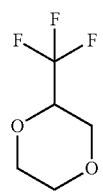
I-161 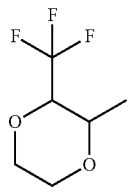
I-162 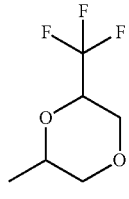
I-163 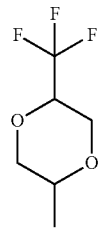
I-164 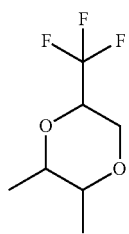
I-165 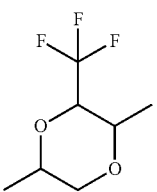
I-166 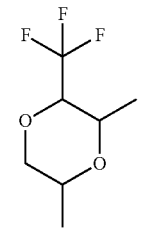
I-167 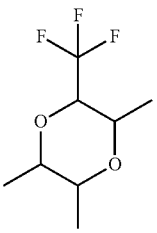
I-168 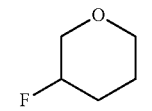
I-169 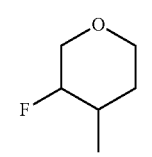
I-170 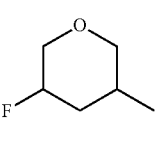
I-171 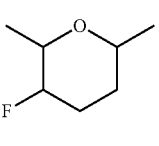
I-172 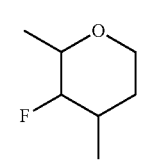
I-173
I-174

I-175 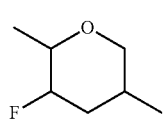
I-176 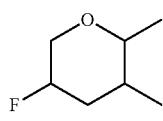
I-177 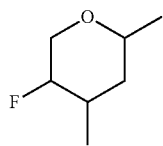
I-178 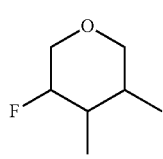
I-179 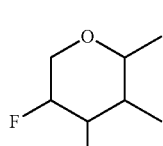
I-180 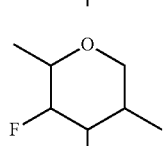
I-181 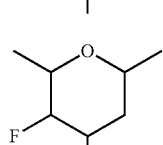
I-182 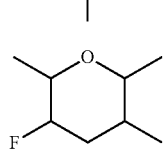
I-183 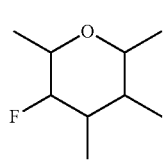
I-184 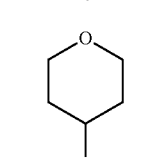
I-185 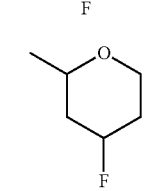
I-186 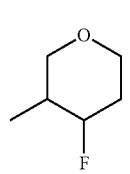
I-187 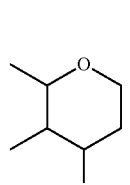
I-188 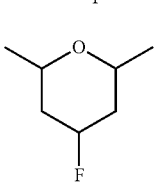
I-189 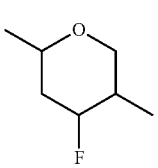
I-190 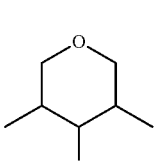
I-191 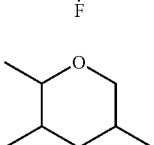
I-192 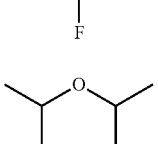
I-193 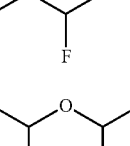
I-194 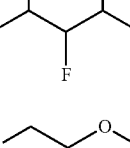
I-195 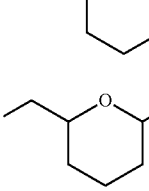

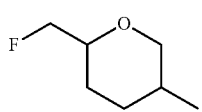
I-196
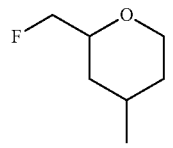
I-197
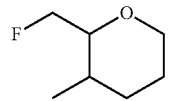
I-198
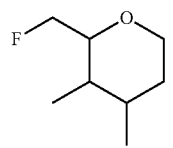
I-199
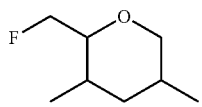
I-200
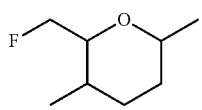
I-201
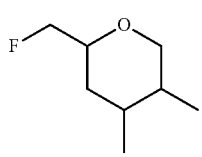
I-202
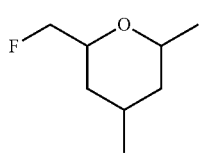
I-203
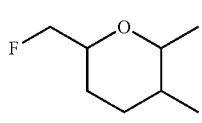
I-204
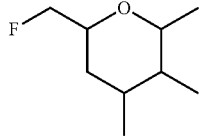
I-205
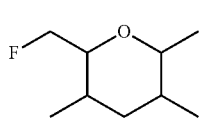
I-206
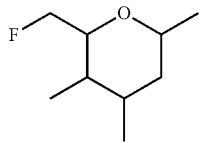
I-207
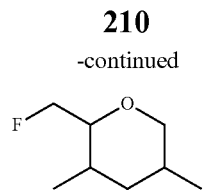
I-208
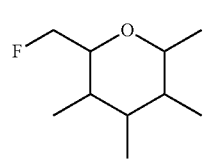
I-209
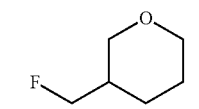
I-210
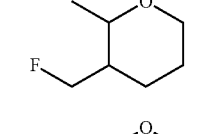
I-211
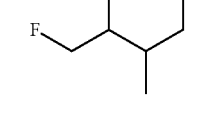
I-212
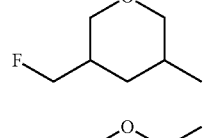
I-213
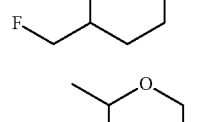
I-214
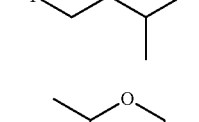
I-215
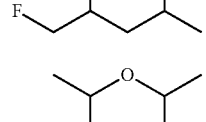
I-216
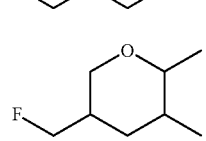
I-217
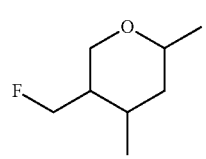
I-218
I-219

-continued

| I-220 | I-230 |
| I-221 | I-231 |
| I-222 | I-232 |
| I-223 | I-233 |
| I-224 | I-234 |
| I-225 | I-235 |
| I-226 | I-236 |
| I-227 | I-237 |
| I-228 | I-238 |
| I-229 | |

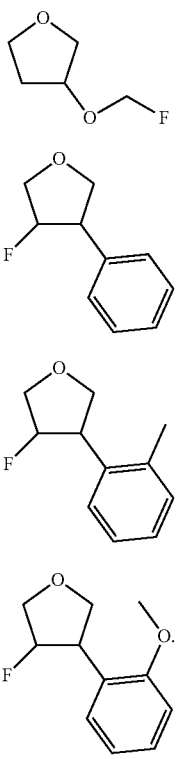

I-239

I-240

I-241

I-242

6. The nonaqueous electrolyte solution according to claim 1, wherein a mass ratio of the compound A to the compound B in the nonaqueous electrolyte solution ranges from 0.20 to 6.00.

7. The nonaqueous electrolyte solution according to claim 1, wherein the nonaqueous electrolyte solution further comprises one or more lithium salts; further optionally, the lithium salt comprises one or more of lithium bis(fluorosulfonyl)imide, lithium hexafluorophosphate, lithium tetrafluoroborate, lithium hexafluoroarsenate, lithium bis(trifluoromethanesulfonyl)imide, lithium trifluoromethanesulfonate, lithium difluorophosphate, lithium dioxalatoborate, lithium difluoro(oxalato)borate, lithium difluorobis(oxalato)phosphate, lithium tetrafluoro (oxalato)phosphate, or a combination thereof.

8. The nonaqueous electrolyte solution according to claim 7, wherein a concentration range of the lithium salt in the nonaqueous electrolyte solution is 0.3 to 6 mol/L.

9. The nonaqueous electrolyte solution according to claim 1, wherein the nonaqueous electrolyte solution further comprises an additive C containing a phosphate ester group and an alkoxy chain, and a total number of carbon atoms in each alkoxy chain falls within a range of 1 to 20.

10. The nonaqueous electrolyte solution according to claim 9, wherein a molecule of the additive C comprises a phosphate ester group and at least one of the following groups: a $C_1$ to $C_4$ alkyl, a $C_1$ to $C_4$ fluoroalkyl, a $C_1$ to $C_4$ ethoxyalkyl ether, a $C_1$ to $C_4$ ethoxy ethoxyalkyl ether, a $C_1$ to $C_4$ ethoxy fluoroalkyl ether, or a $C_1$ to $C_4$ ethoxy-ethoxy fluoroalkyl ether, wherein the fluoro in the $C_1$ to $C_4$ fluoroalkyl means monofluoro, difluoro, or trifluoro substitution by one, two, or three fluorine atoms, respectively, located at a terminal of a molecule of the additive C and not attached to a carbon atom directly adjacent to an oxygen atom.

11. The nonaqueous electrolyte solution according to claim 10, wherein the additive C is represented by a chemical formula III:

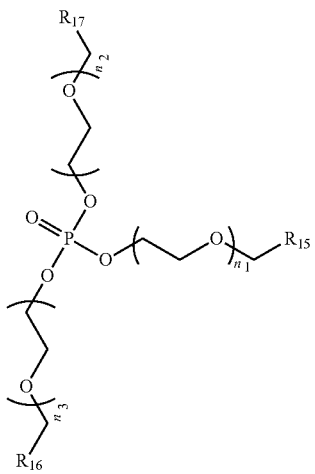

Formula III wherein, $n_1$, $n_2$, and $n_3$ represent 0, 1, and 2 respectively, and $n_1$, $n_2$, and $n_3$ are not all 0;

$R_{16}$, $R_{17}$ and $R_{18}$ each independently represent hydrogen, $C_1$ to $C_4$ alkyl, $C_1$ to $C_4$ monofluoroalkyl, $C_1$ to $C_4$ difluoroalkyl, or $C_1$ to $C_4$ trifluoroalkyl, wherein the fluoro in the $C_1$ to $C_4$ monofluoroalkyl, the $C_1$ to $C_4$ difluoroalkyl, or the $C_1$ to $C_4$ trifluoroalkyl means fluorine substitution by one, two, or three fluorine atoms, respectively, located at a terminal of a molecule of the additive C.

12. The nonaqueous electrolyte solution according to claim 11, wherein the additive C comprises one of the following compounds:

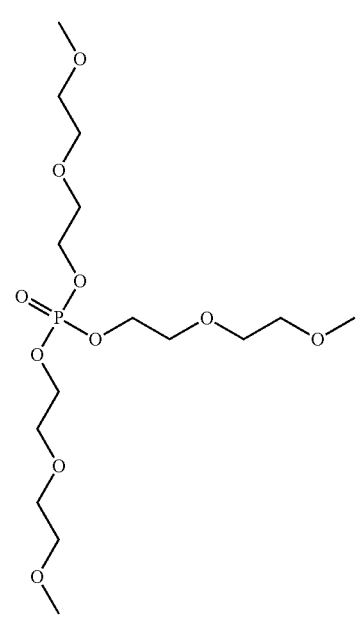

III-1

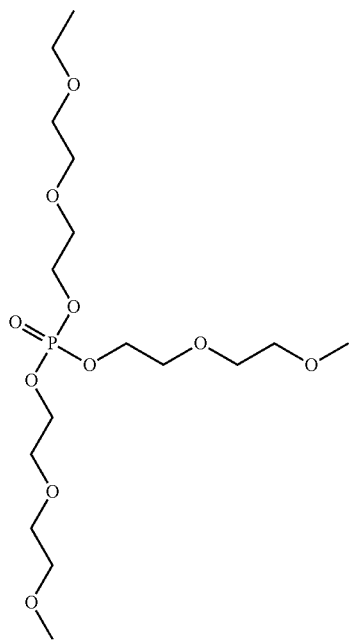
III-2
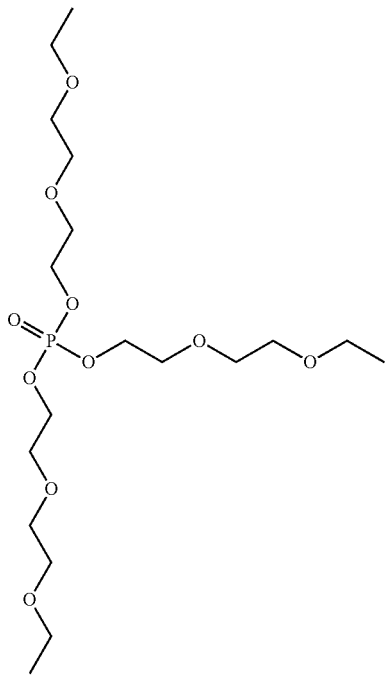
III-4
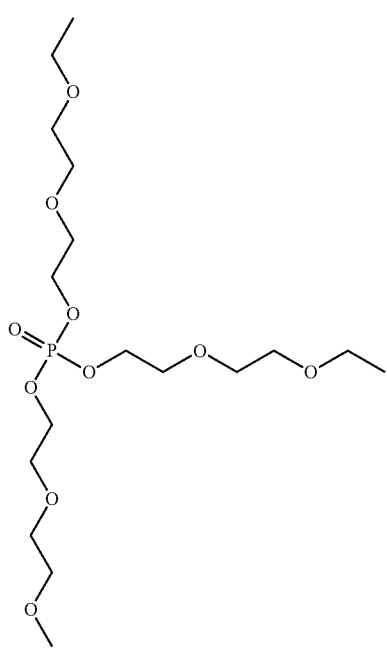
III-3
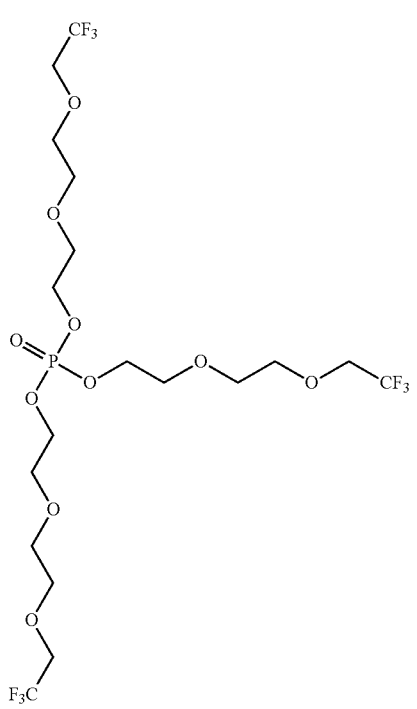
III-5

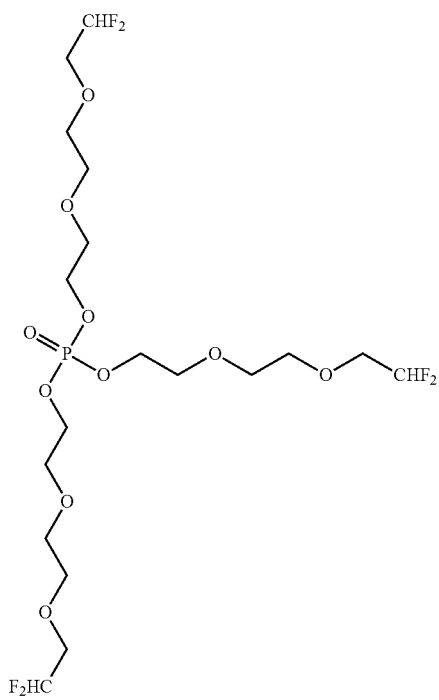
III-6
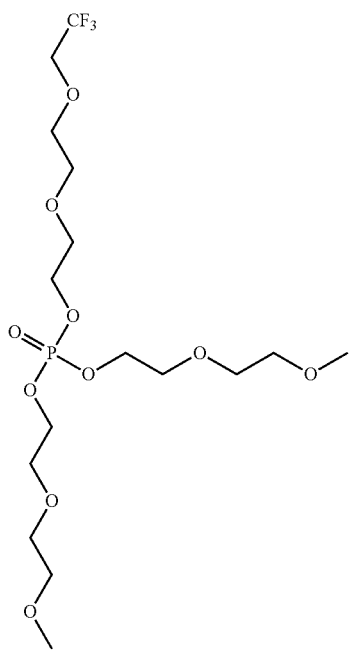
III-8
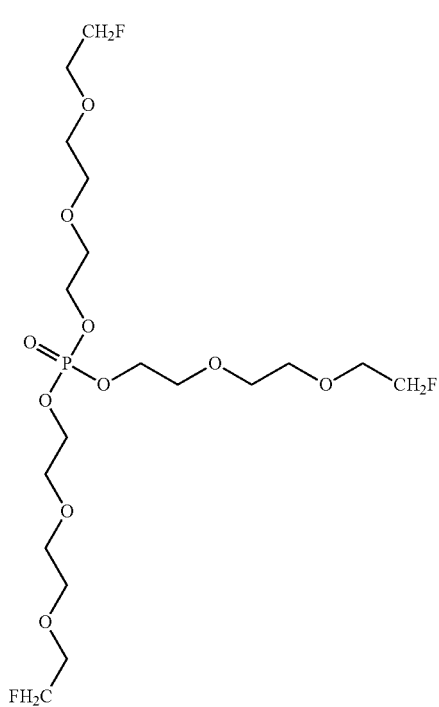
III-7
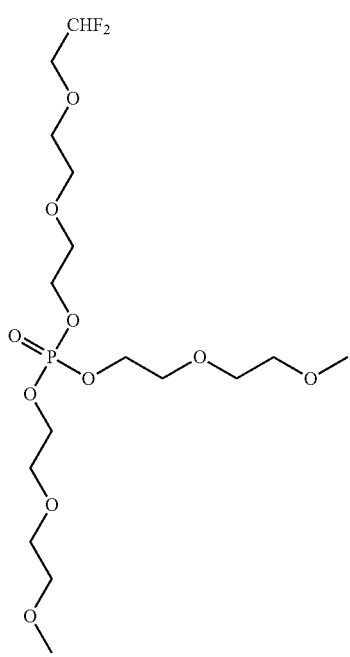
III-9

III-10
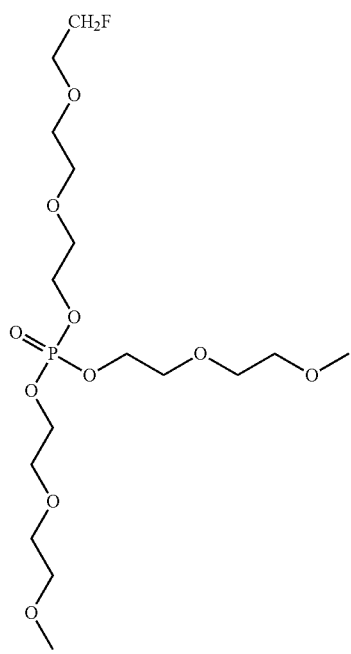
III-12
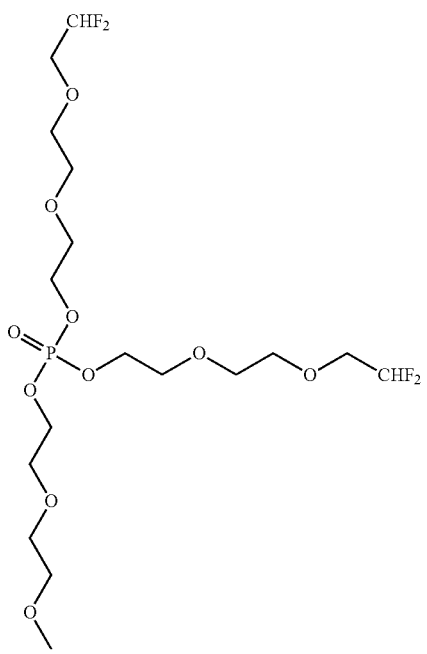
III-11
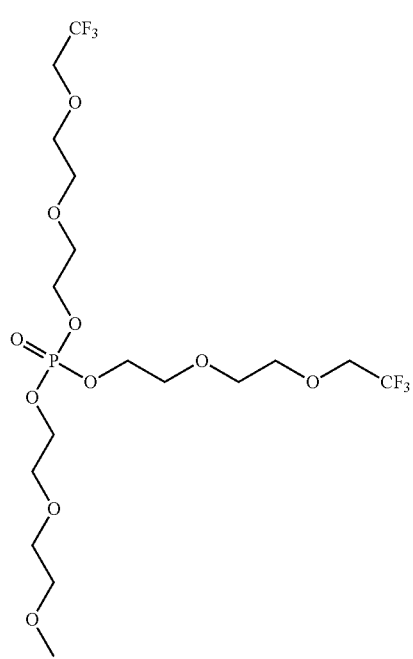
III-13
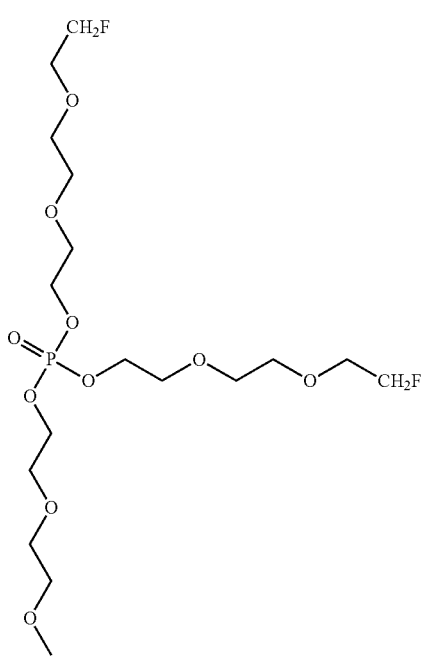

-continued
III-14
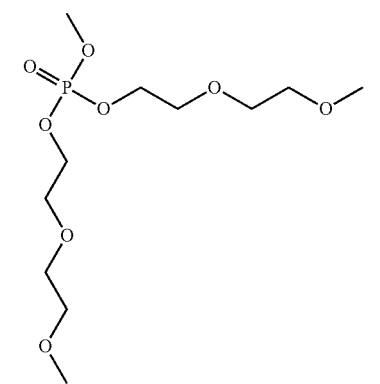
III-15
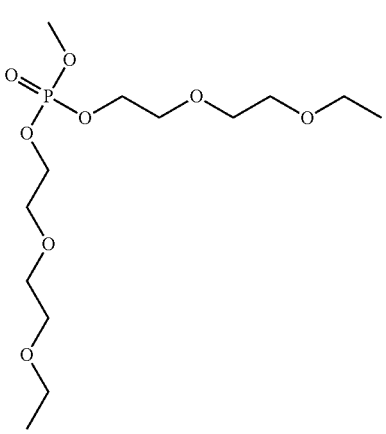
III-16
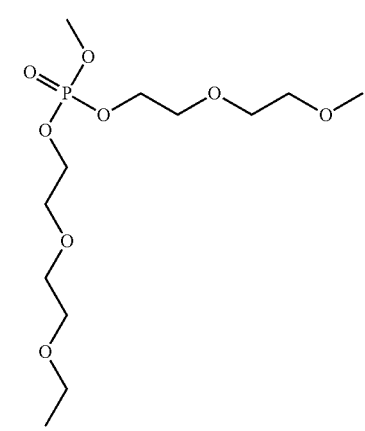
III-17
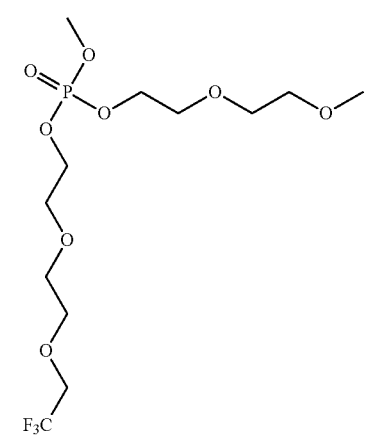
-continued
III-18
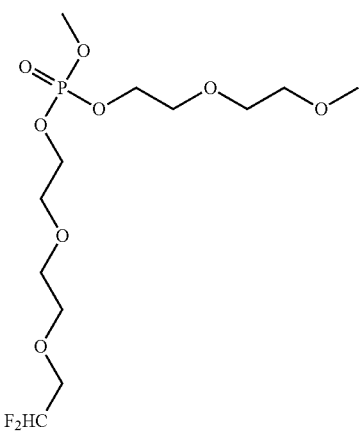
III-19
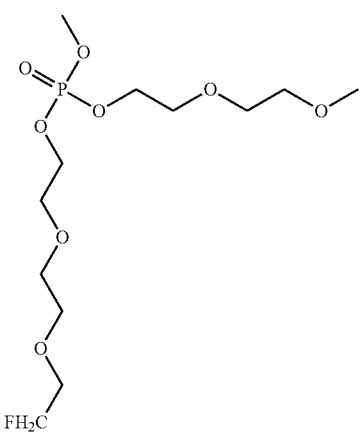
III-20
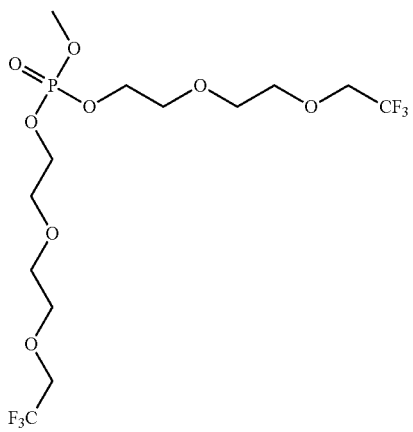

III-21
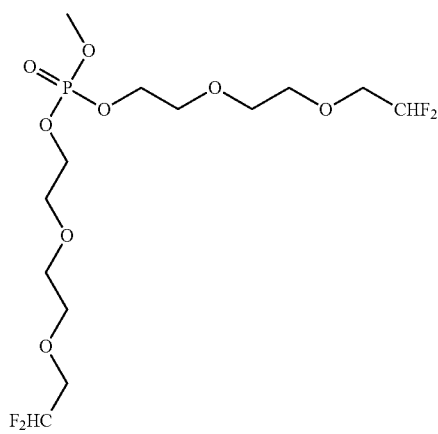
III-22
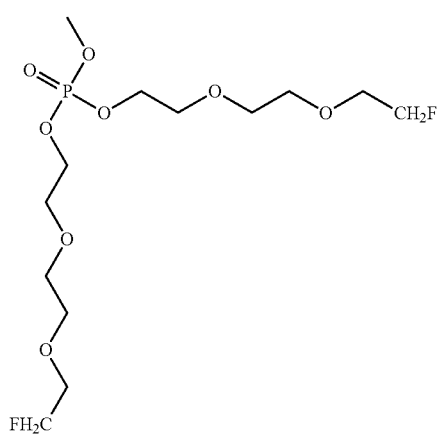
III-23
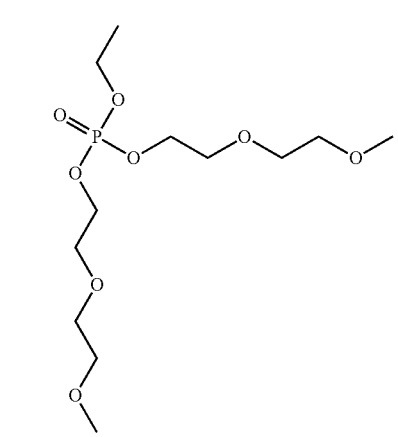
III-24
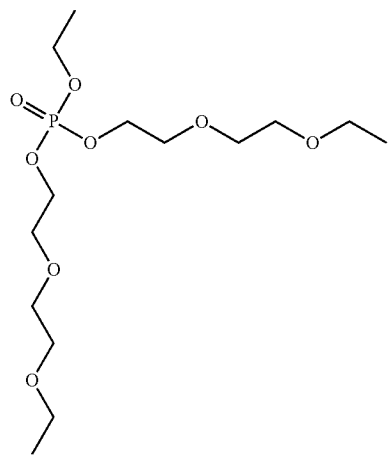
III-25
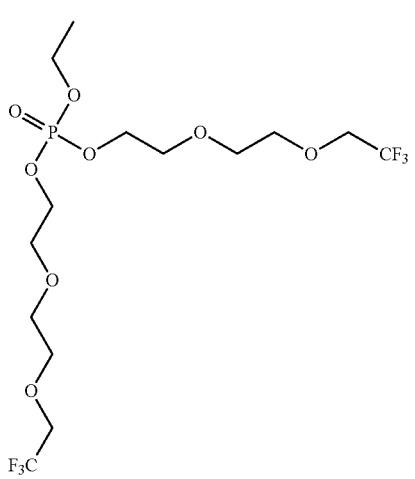
III-26
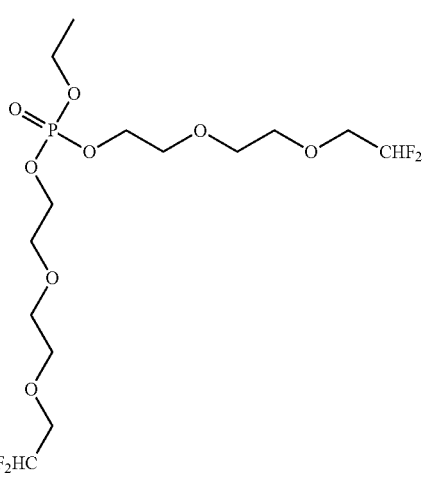

III-27
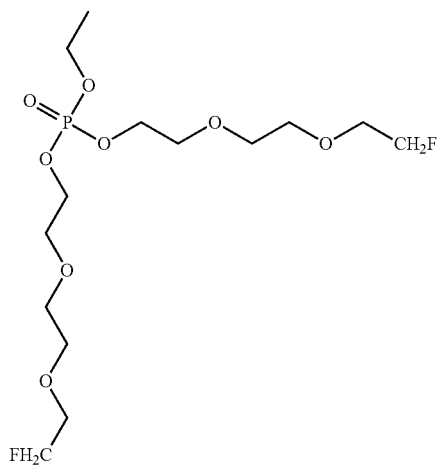
III-28
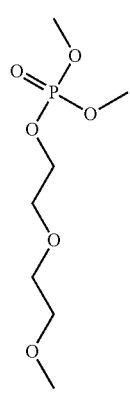
III-29
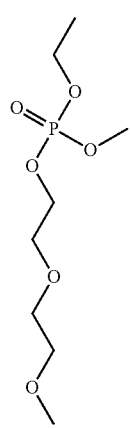
III-30
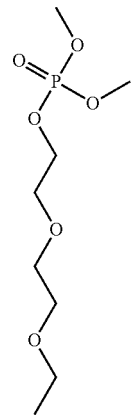
III-31
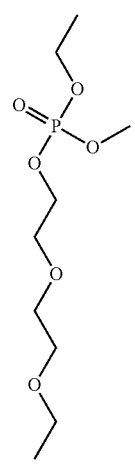
III-32
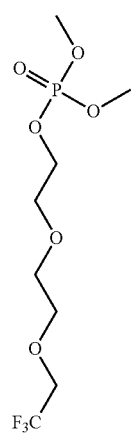

-continued
III-33
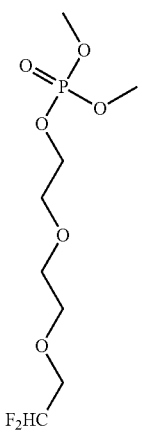
III-34
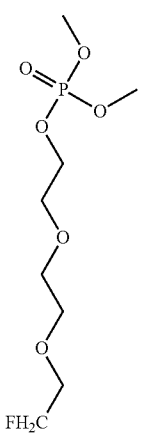
III-35
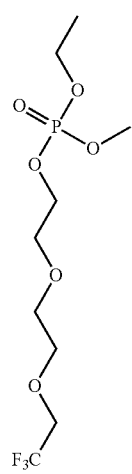
-continued
III-36
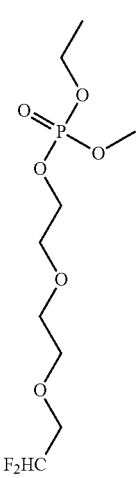
III-37
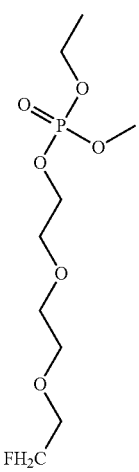
III-38
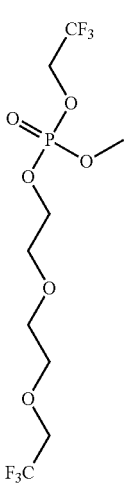

III-39
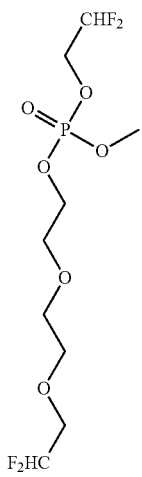
III-40
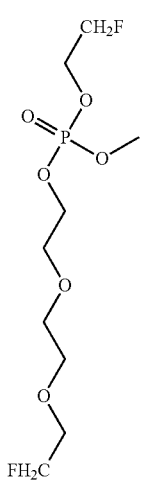
III-41
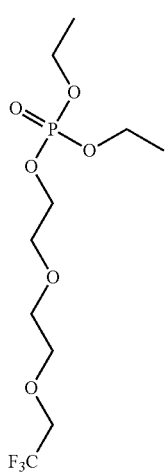
III-42
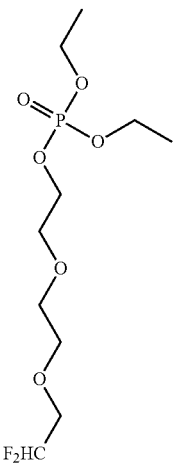
III-43
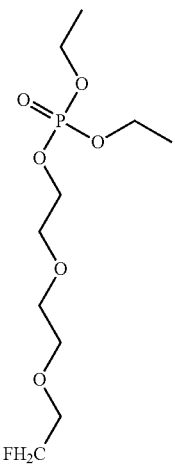
III-44
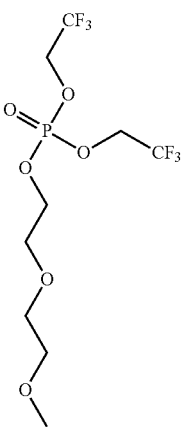

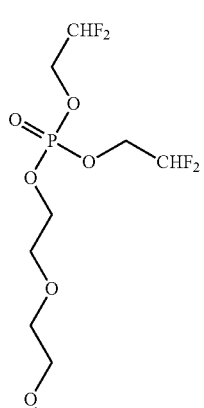
III-45
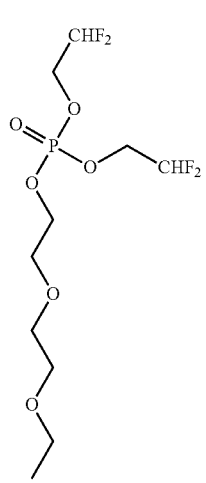
III-48
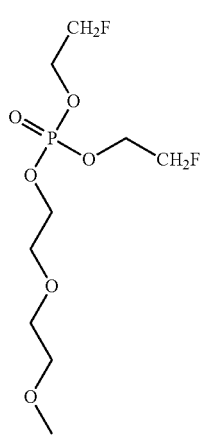
III-46
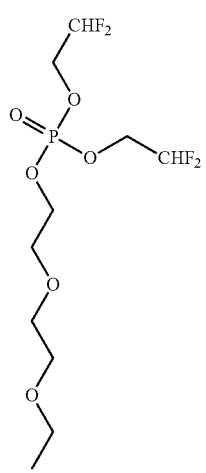
III-49
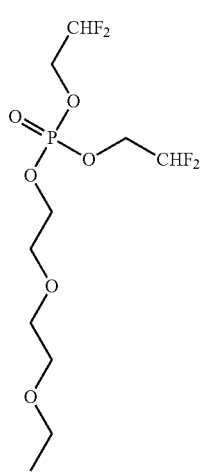
III-47
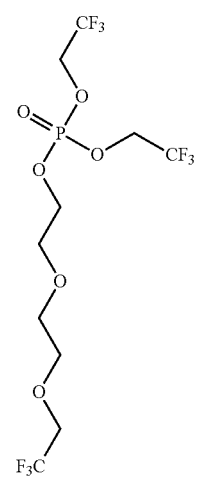
III-50

III-51
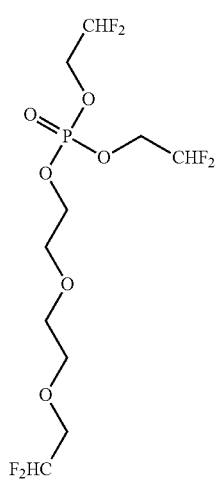
III-52
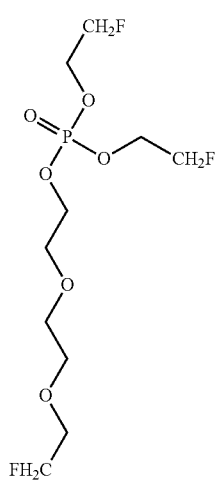
III-53
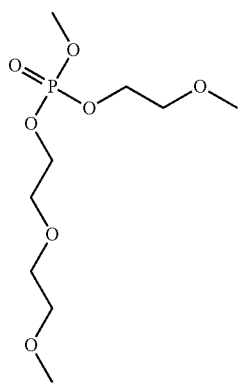
III-54
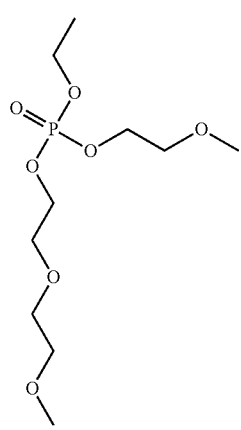
III-55
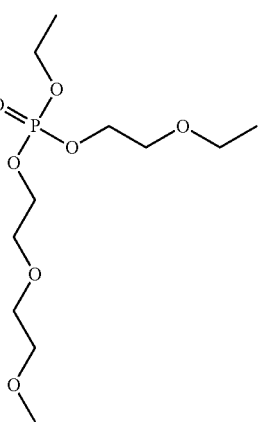
III-56
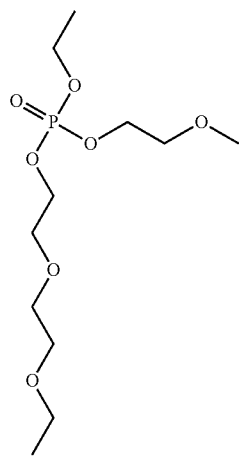

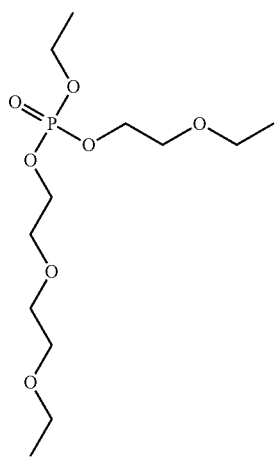 III-57
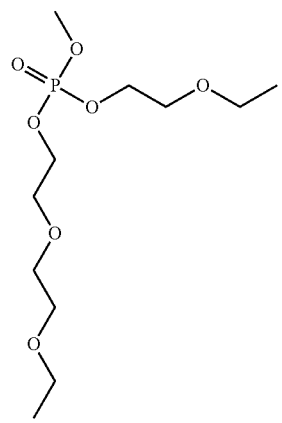 III-60
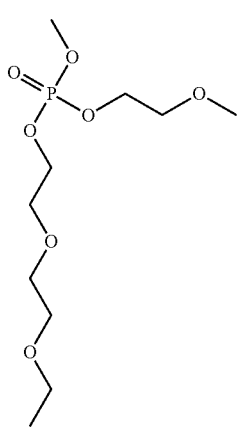 III-58
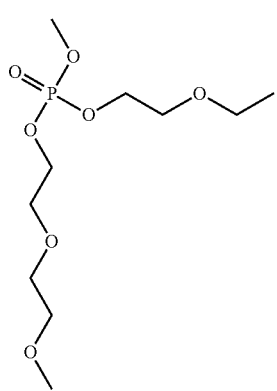 III-59
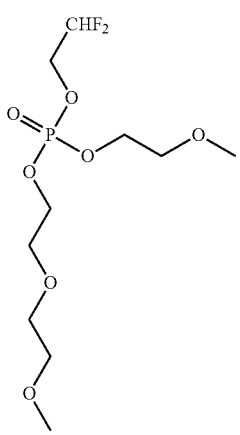 III-61
III-62

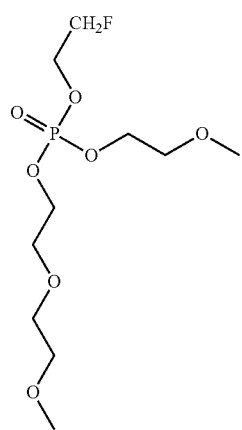
III-63
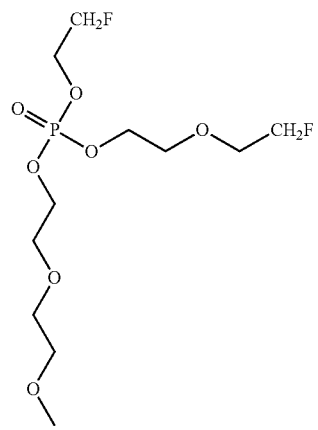
III-66
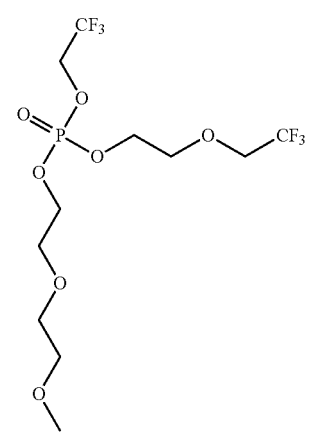
III-64
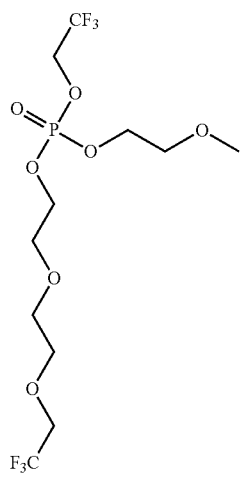
III-67
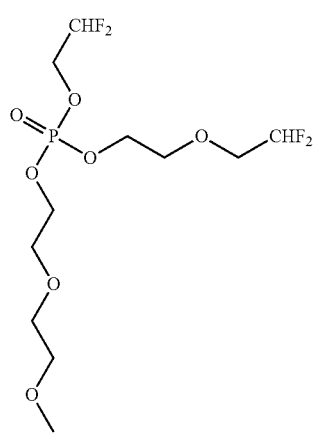
III-65
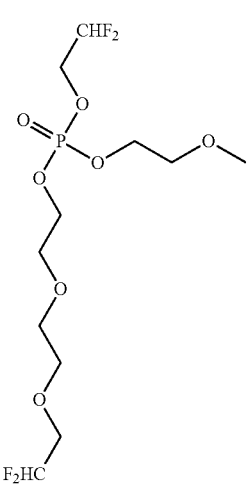
III-68

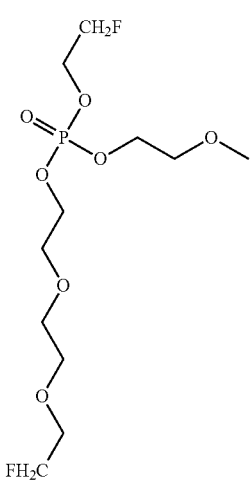
III-69
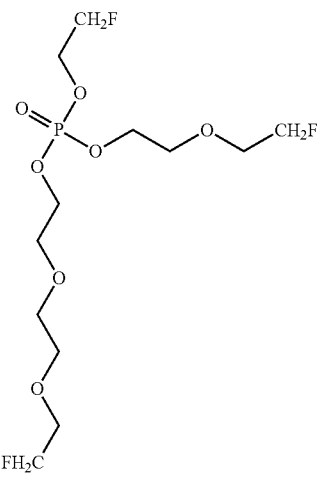
III-72
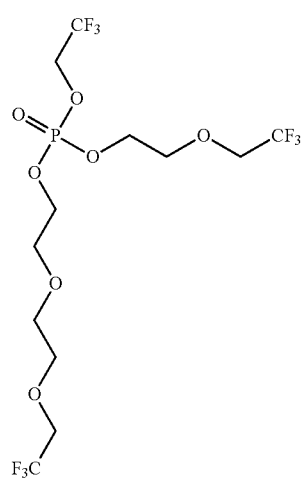
III-70
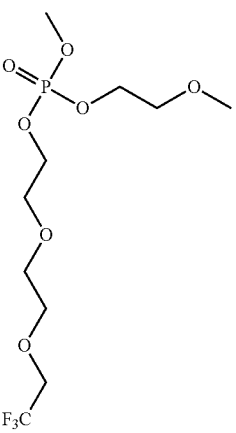
III-73
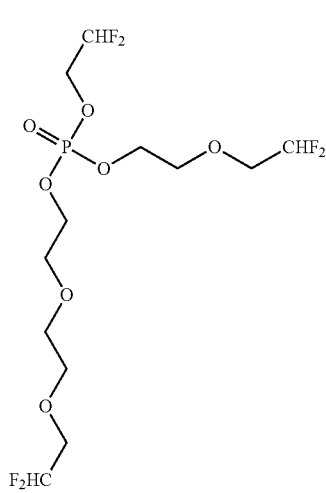
III-71
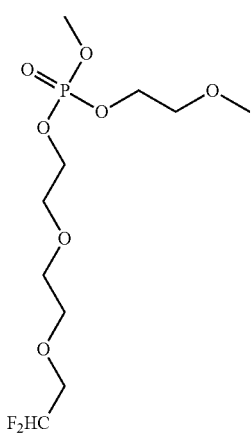
III-74

III-75
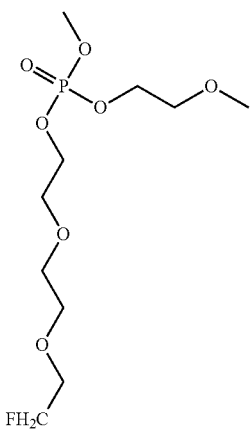
III-76
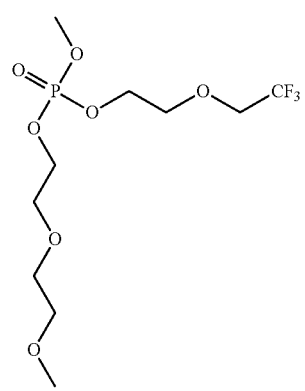
III-77
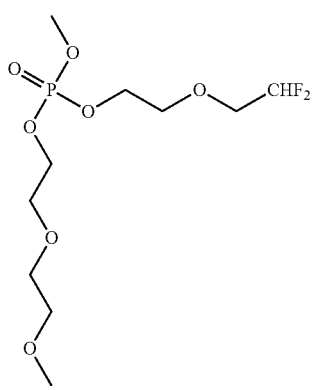
III-78
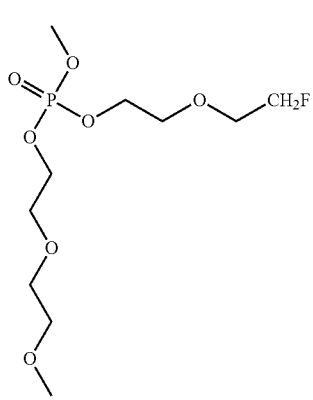
III-79
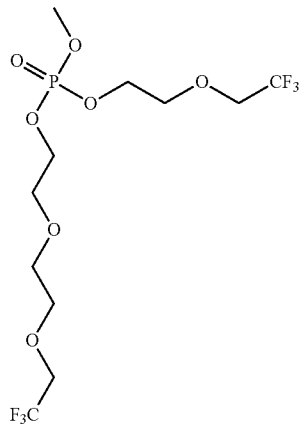
III-80
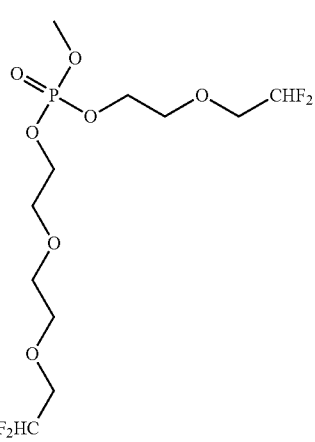
III-81
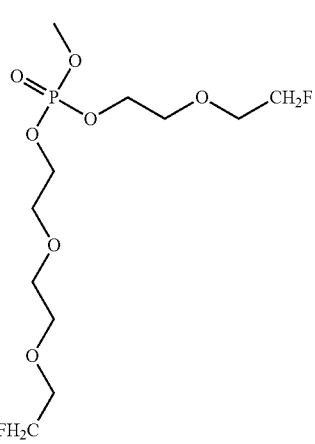

III-82
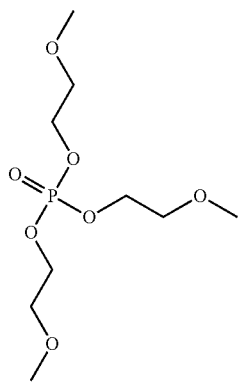
III-83
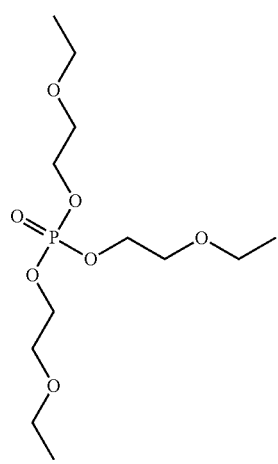
III-84
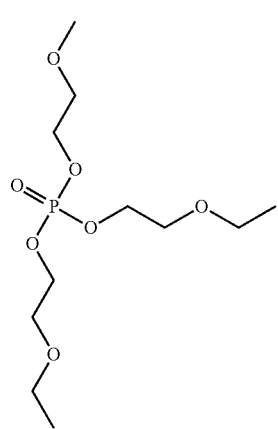
III-85
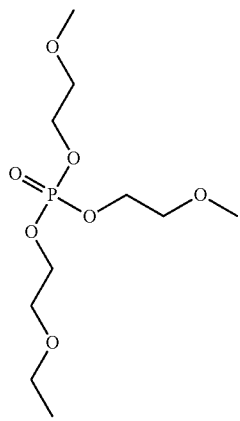
III-86
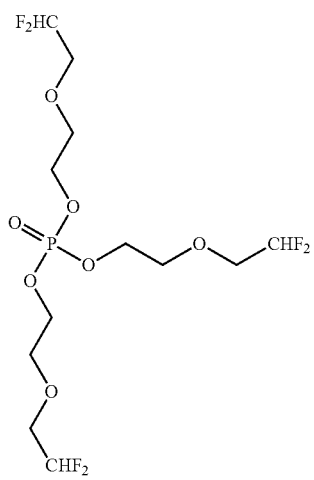
III-87
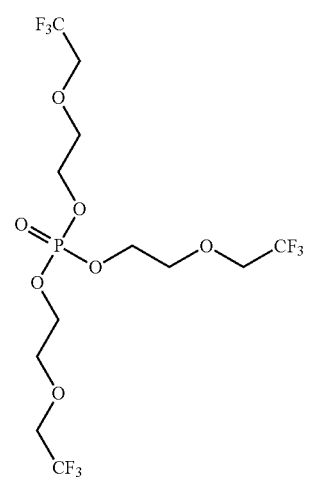

III-88
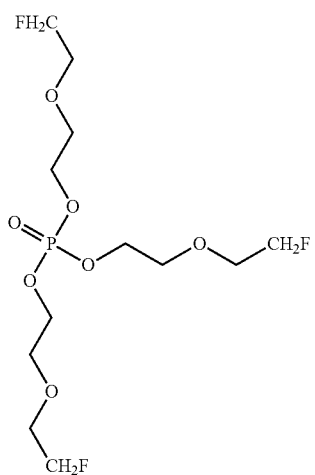
III-89
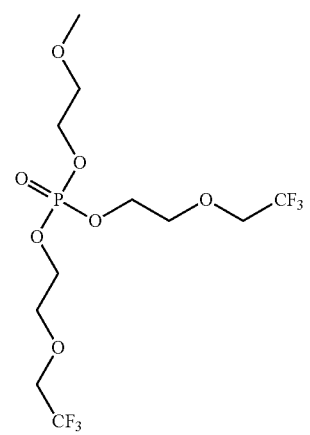
III-90
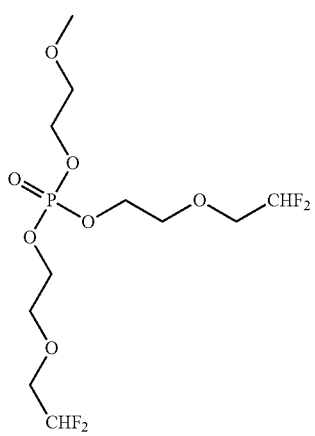
III-91
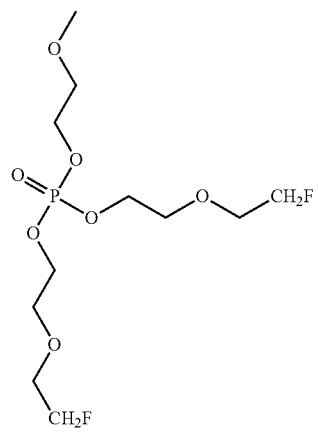
III-92
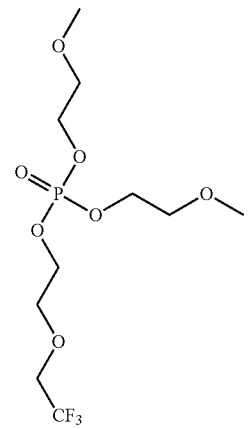
III-93
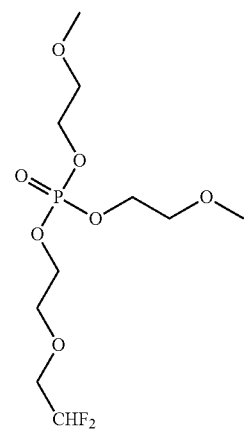

III-94
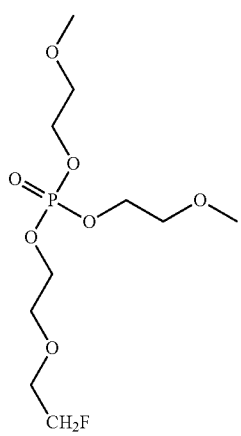
III-95
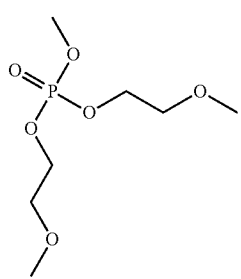
III-96
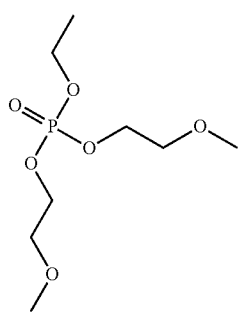
III-97
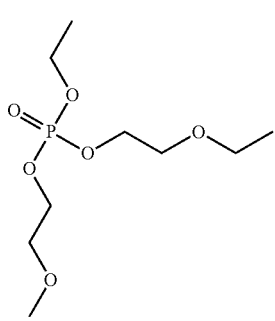
III-98
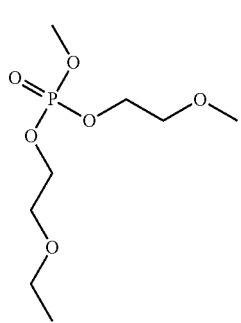
III-99
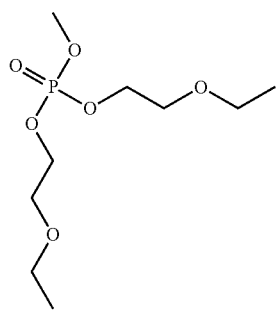
III-100
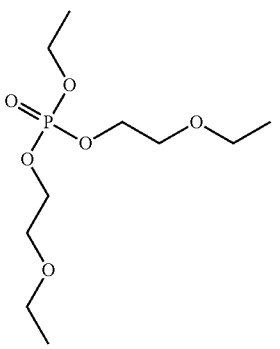
III-101
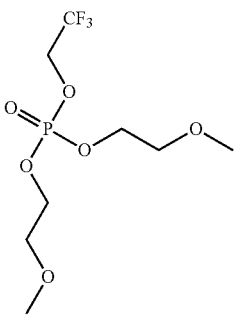
III-102
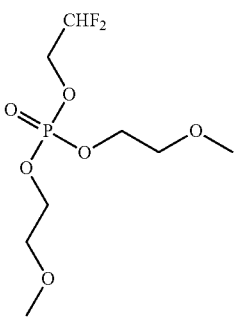

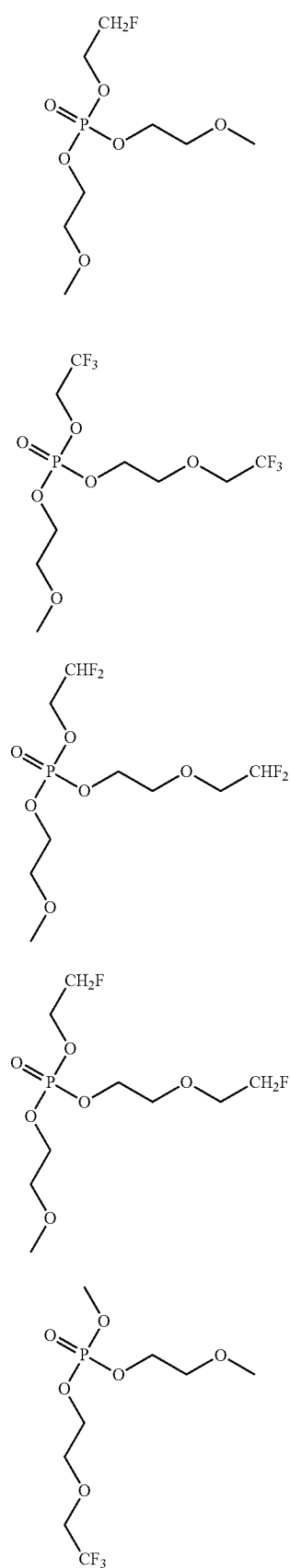

III-113
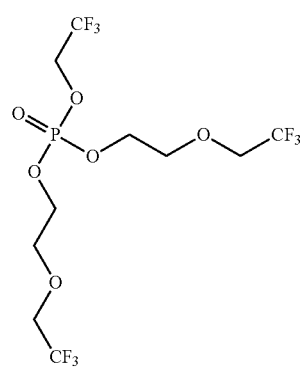
III-114
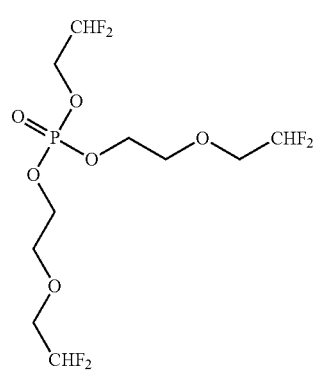
III-115
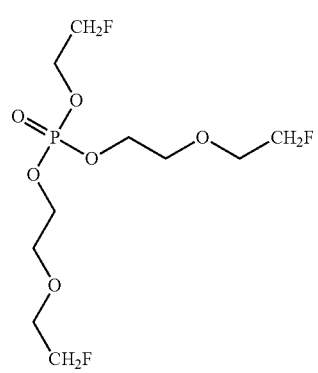
III-116
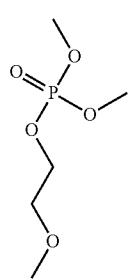
III-117
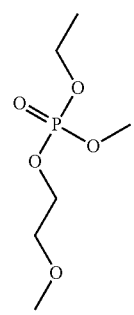
III-118
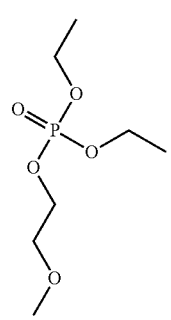
III-119
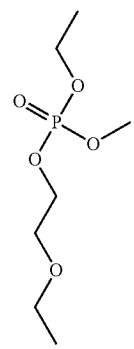
III-120
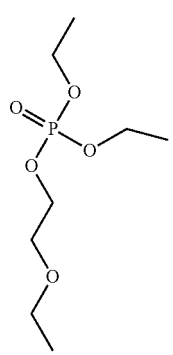
III-121
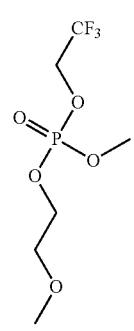

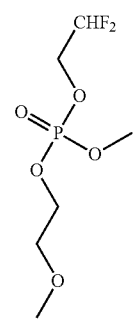 III-122
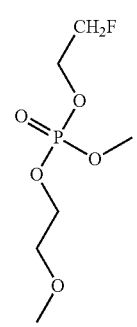 III-123
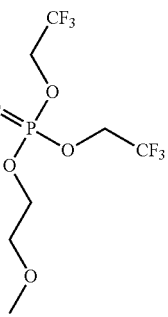 III-124
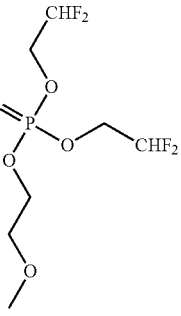 III-125
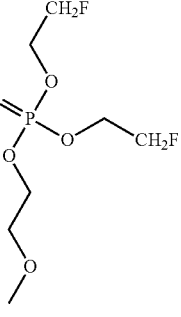 III-126
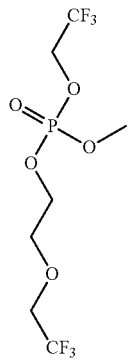 III-127
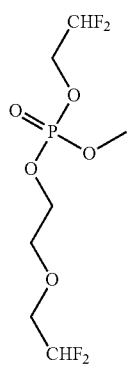 III-128
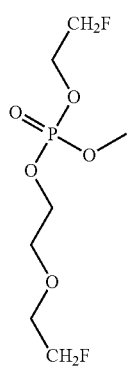 III-129
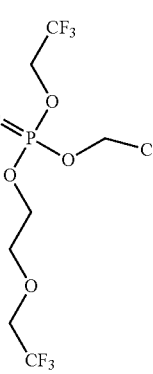 III-130

-continued

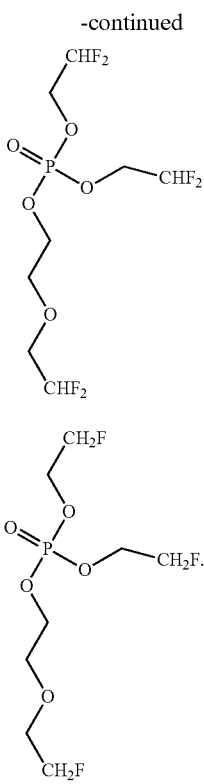

III-131

III-132

13. The nonaqueous electrolyte solution according to claim 12, wherein a mass fraction of the additive C is 0.5% to 30% based on a total mass of the compound A, the compound B, and the lithium salt existent in the nonaqueous electrolyte solution.

14. The nonaqueous electrolyte solution according to claim 13, wherein, in a molecule of the additive C, when a terminal of the molecule contains fluorine, the mass fraction of the additive C in the nonaqueous electrolyte solution is 15% to 30%, based on the total mass of the compound A, the compound B, and the lithium salt existent in the nonaqueous electrolyte solution.

15. A secondary battery, comprising the nonaqueous electrolyte solution according to claim 1,
wherein the secondary battery comprises no negative active material, and
the secondary battery comprises no graphite negative electrode or silicon negative electrode.

16. The secondary battery according to claim 15, wherein the secondary battery comprises a negative electrode plate, and the negative electrode plate contains no lithium ions.

17. The secondary battery according to claim 15, wherein the secondary battery comprises a negative electrode plate, the negative electrode plate comprises a negative current collector and a metal layer or an oxide layer located on the negative current collector, and optionally, a thickness of the metal layer or oxide layer is 0 to 200 nm; optionally, the metal layer comprises one or more of tin, zinc, aluminum, magnesium, silver, gold, gallium, indium, or platinum; and optionally, the oxide layer comprises one or more of zinc oxide, aluminum oxide, or titanium oxide; or
the secondary battery comprises a negative electrode plate, the negative electrode plate comprises a negative current collector, the negative current collector is a copper foil; or
the secondary battery comprises a negative electrode plate, the negative electrode plate comprises a copper foil current collector and a lithium metal foil, and optionally, the lithium metal foil is 5 to 100 μm thick.

18. An electrical device, comprising the nonaqueous electrolyte solution according to claim 1.

* * * * *